US010112870B2

(12) United States Patent
White et al.

(10) Patent No.: US 10,112,870 B2
(45) Date of Patent: Oct. 30, 2018

(54) SELF-DESICCATING, DIMENSIONALLY-STABLE HYDRAULIC CEMENT COMPOSITIONS WITH ENHANCED WORKABILITY

(71) Applicant: UNITED STATES GYPSUM COMPANY, Chicago, IL (US)

(72) Inventors: Paul White, Round Lake, IL (US); Ashish Dubey, Grayslake, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/825,366

(22) Filed: Nov. 29, 2017

(65) Prior Publication Data

US 2018/0162777 A1    Jun. 14, 2018

Related U.S. Application Data

(60) Provisional application No. 62/432,960, filed on Dec. 12, 2016.

(51) Int. Cl.

| | | |
|---|---|---|
| C04B 28/06 | (2006.01) | |
| C04B 28/04 | (2006.01) | |
| C04B 22/14 | (2006.01) | |
| C04B 18/08 | (2006.01) | |
| C04B 14/28 | (2006.01) | |
| C04B 14/14 | (2006.01) | |
| C04B 28/14 | (2006.01) | |
| C04B 103/54 | (2006.01) | |
| C04B 103/00 | (2006.01) | |
| C04B 103/22 | (2006.01) | |
| C04B 103/32 | (2006.01) | |
| C04B 103/44 | (2006.01) | |
| C04B 103/50 | (2006.01) | |
| C04B 111/00 | (2006.01) | |
| C04B 111/34 | (2006.01) | |
| C04B 111/60 | (2006.01) | |
| C04B 111/62 | (2006.01) | |
| C04B 111/70 | (2006.01) | |
| C04B 111/72 | (2006.01) | |

(52) U.S. Cl.
CPC ............ *C04B 28/065* (2013.01); *C04B 14/14* (2013.01); *C04B 14/28* (2013.01); *C04B 18/08* (2013.01); *C04B 22/143* (2013.01); *C04B 28/04* (2013.01); *C04B 28/06* (2013.01); *C04B 28/14* (2013.01); *C04B 2103/0066* (2013.01); *C04B 2103/0088* (2013.01); *C04B 2103/22* (2013.01); *C04B 2103/32* (2013.01); *C04B 2103/44* (2013.01); *C04B 2103/50* (2013.01); *C04B 2103/54* (2013.01); *C04B 2111/00482* (2013.01); *C04B 2111/00612* (2013.01); *C04B 2111/00637* (2013.01); *C04B 2111/00715* (2013.01); *C04B 2111/34* (2013.01); *C04B 2111/60* (2013.01); *C04B 2111/62* (2013.01); *C04B 2111/70* (2013.01); *C04B 2111/72* (2013.01)

(58) Field of Classification Search
CPC ....... C04B 28/065; C04B 28/04; C04B 28/06; C04B 28/14; C04B 22/143; C04B 18/08; C04B 14/28; C04B 14/14; C04B 2103/54; C04B 2103/0088; C04B 2103/22; C04B 2103/32; C04B 2103/44; C04B 2103/50; C04B 2103/0066; C04B 2111/00482; C04B 2111/00612; C04B 2111/00637; C04B 2111/34; C04B 2111/60; C04B 2111/62; C04B 2111/70; C04B 2111/72
See application file for complete search history.

(56) References Cited

U.S. PATENT DOCUMENTS

| | | |
|---|---|---|
| 3,997,353 A | 12/1976 | Chervenka, Jr. et al. |
| 4,357,166 A | 11/1982 | Babcock |
| 4,488,909 A | 12/1984 | Galer et al. |
| 4,655,979 A | 4/1987 | Nakano et al. |
| 5,643,510 A | 7/1997 | Sucech |
| 6,641,658 B1 | 11/2003 | Dubey |
| 6,730,162 B1 | 5/2004 | Li et al. |
| 7,618,490 B2 | 11/2009 | Nakashima et al. |
| 8,226,762 B2 | 7/2012 | Le Rolland et al. |
| 8,864,901 B2 | 10/2014 | Lloyd et al. |
| 9,708,220 B2 | 7/2017 | Lettkeman et al. |
| 2007/0079733 A1 | 4/2007 | Crocker |
| 2008/0134943 A1 | 6/2008 | Godfrey et al. |
| 2008/0141907 A1 | 6/2008 | Campbell |

(Continued)

FOREIGN PATENT DOCUMENTS

| | | |
|---|---|---|
| CN | 101921548 A | 12/2010 |
| EP | 0228595 B1 | 7/1987 |

(Continued)

OTHER PUBLICATIONS

Construction Polymers, Technical Data Sheet, Starvis® 3003 F, BASF Corporation, Oct. 2011 Rev 1, pp. 1-2.

(Continued)

*Primary Examiner* — Anthony J Green
(74) *Attorney, Agent, or Firm* — Vorys, Sater, Seymour and Pease LLP; Pradip Sahu; Philip T. Petti

(57) ABSTRACT

Cementitious binder compositions for cementitious products including a hydraulic cement-based reactive powder blend, an inorganic flow control agent, and a metal-based dimensional movement stabilizing agent including at least one member of the group of lithium salt and lithium base, and methods for making the cementitious binder compositions.

22 Claims, 14 Drawing Sheets

(56) References Cited

U.S. PATENT DOCUMENTS

| | | | |
|---|---|---|---|
| 2010/0071597 A1 | 3/2010 | Perez-Pena | |
| 2013/0284069 A1* | 10/2013 | Dubey | C04B 7/32 106/695 |
| 2016/0194247 A1 | 7/2016 | Dubey | |
| 2016/0214892 A1 | 7/2016 | Bullerjahn et al. | |
| 2016/0214897 A1 | 7/2016 | Dubey | |
| 2016/0340251 A1 | 11/2016 | Lettkeman et al. | |
| 2017/0029333 A1 | 2/2017 | Motzet et al. | |
| 2017/0114231 A1 | 4/2017 | Morris et al. | |
| 2017/0204007 A1 | 7/2017 | Raz et al. | |

FOREIGN PATENT DOCUMENTS

| | | |
|---|---|---|
| GB | 2033367 A | 5/1980 |
| KR | 549958 B1 | 2/2006 |
| KR | 2009025683 A | 3/2009 |
| KR | 20090085451 A | 8/2009 |
| KR | 20100129104 A | 12/2010 |
| WO | 2011151608 A1 | 12/2011 |
| WO | 2015150319 A1 | 10/2015 |

OTHER PUBLICATIONS

Product Bulletin, Building and Construction, Axilat™ Redispersible Powders, Dispersions and Additives, Momentive Specialty Chemicals Inc., 2012.

A Guide to Understanding and Mixing Thickeners, Charles Ross & Son Company, URL: <https://www.mixers.com/wp_download.asp?wpid=3>, retrieved from the Internet, Dec. 13, 2016.

Lansco Colors / Technical Data, Lanox Iron Oxide, URL: <www.pigments.com>, retrieved from the Internet, Dec. 8, 2016.

International Search Report and Written Opinion dated Apr. 5, 2018 for PCT/US2017/065503 to United States Gypsum Company filed Dec. 11, 2017.

* cited by examiner

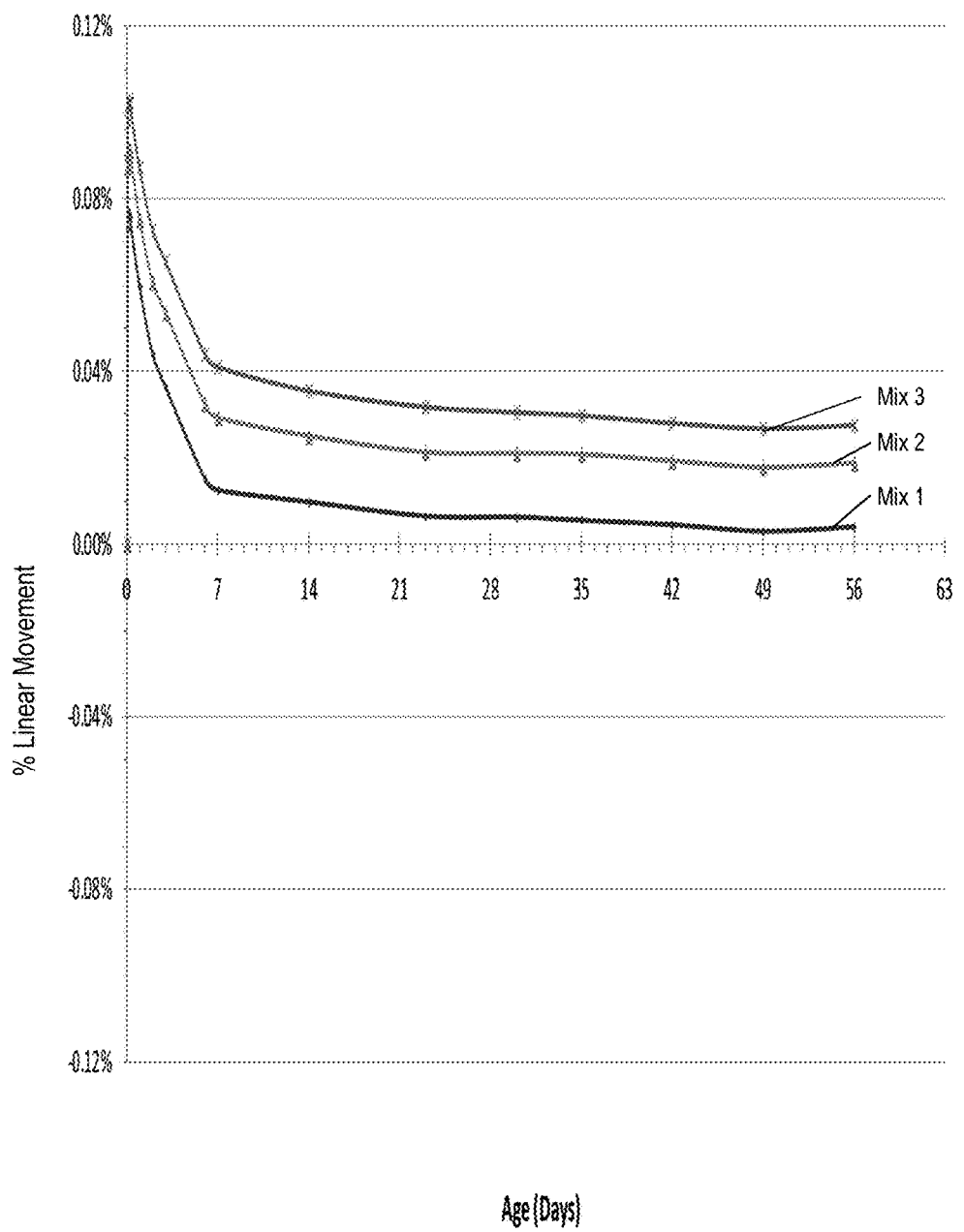

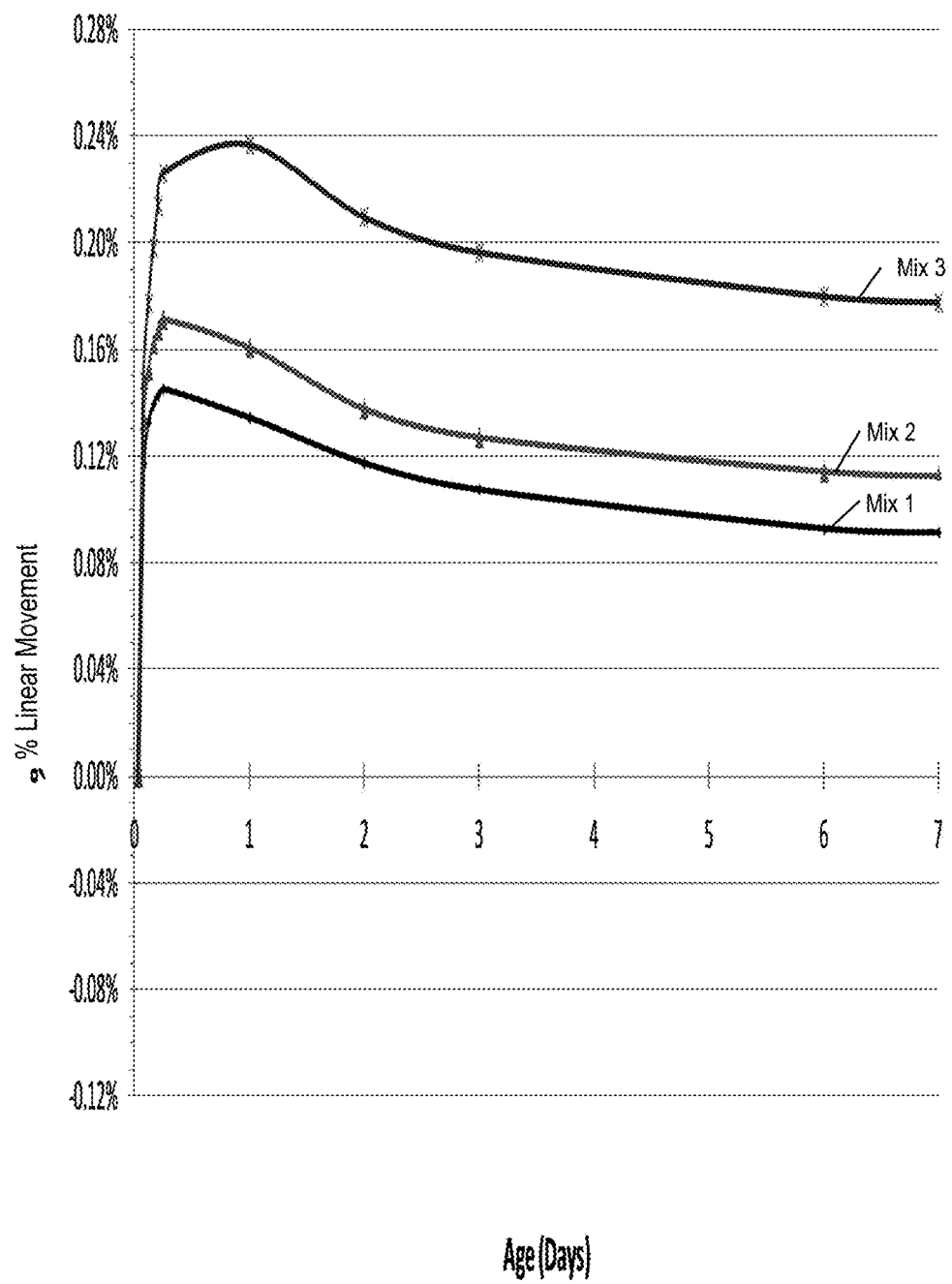

FIG. 8A
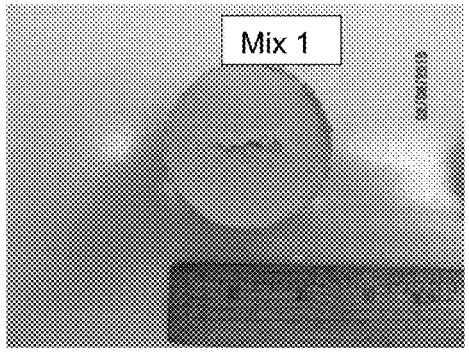
FIG. 8B
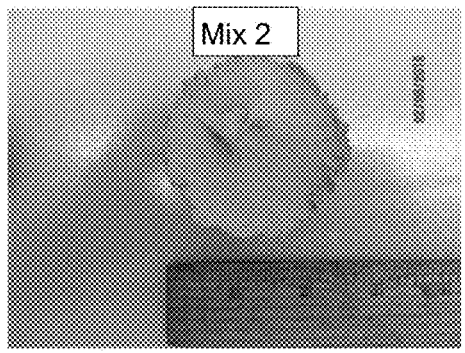
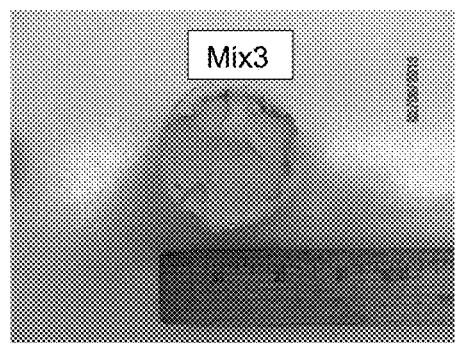
FIG. 8C
FIG. 8D
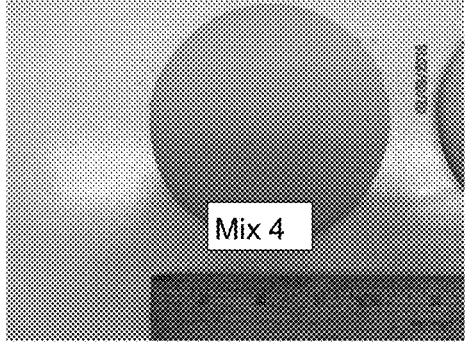
FIG. 8E
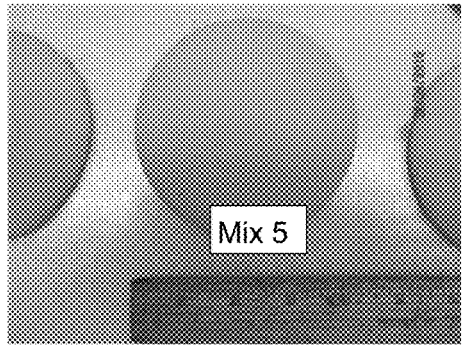
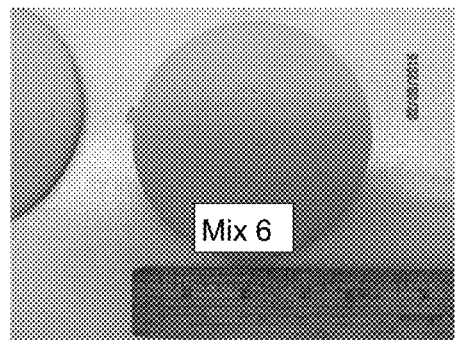
FIG. 8F

US 10,112,870 B2

SELF-DESICCATING, DIMENSIONALLY-STABLE HYDRAULIC CEMENT COMPOSITIONS WITH ENHANCED WORKABILITY

FIELD OF THE INVENTION

This invention relates generally to novel self-desiccating, rapid-hardening, dimensionally stable hydraulic cement compositions comprising a hydraulic cement-based reactive powder blend, an inorganic flow control agent, and a metal-based dimensional movement stabilizing agent. In particular, the invention generally relates to such cementitious compositions which offer properties the following important unique characteristics: extremely rapid surface drying, extremely rapid setting and early age strength development, excellent workability and flow properties, extremely rapid surface drying, very low dimensional movement and shrinkage upon drying, and ability to incorporate high amounts of water.

BACKGROUND OF THE INVENTION

US Patent Application Publication No. 2010-0071597 to Perez-Pena discloses a method of making a rapid setting lightweight cementitious composition with improved compressive strength for products such as boards is disclosed. The method mixes fly ash, alkali metal salt of citric acid and lightweight aggregate with water. Compositions which include fly ash, alkali metal salts of citric acid and lightweight aggregate are also disclosed.

U.S. Pat. No. 4,488,909 to Galer et al discusses cementitious compositions including Portland cement, high alumina cement, calcium sulfate and lime. The cementitious composition includes Portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement.

US Patent Application Publication No. 2010-0071597 A1 to Perez-Pena discloses formulations using fly ash and alkali metal salts of citric acid such as sodium citrate to form concrete mixes. Hydraulic cement and gypsum can be used up to 25 wt % of the formulation, although their use is not preferred. The activated fly ash binders described in this application may interact with the traditional foaming systems used to entrain air and thereby make lightweight boards.

US Patent Application Publication No. 2016-0214897 A1 to Dubey discloses a method for making geopolymer cementitious binder compositions for cementitious products such as concrete, precast construction elements and panels, mortar, patching materials for road repairs and other repair materials, and the like is disclosed. The geopolymer cementitious compositions of some embodiments are made by mixing a synergistic mixture of thermally activated aluminosilicate mineral, calcium sulfoaluminate cement, a calcium sulfate and a chemical activator with water.

US Patent Application Publication No. 2016-0194247 A1 to Dubey discloses a method for making geopolymer cementitious binder compositions for cementitious products such as concrete, precast construction elements and panels, mortar and repair materials, and the like is disclosed. The geopolymer cementitious compositions of some embodiments are made by mixing a synergistic mixture of thermally activated aluminosilicate mineral, calcium aluminate cement, a calcium sulfate and a chemical activator with water.

U.S. Pat. No. 6,641,658 to Dubey discloses a Portland cement-based cementitious composition which contains 35-90% Portland cement, 0-55% of a pozzolan, 5-15% of high alumina cement and 1 to 8% of insoluble anhydrite form of calcium sulfate in place of the soluble conventional landplaster/gypsum to increase the release of heat and decrease setting time despite the use of high amounts of pozzolan, e.g., fly ash. The cementitious composition can include lightweight aggregates and fillers, superplasticizers and additives such as sodium citrate as a reaction retarder.

U.S. Pat. No. 7,618,490 B2 to Nakashima et al. discloses a spraying material comprising one or more of calcium sulfoaluminate, calcium aluminosilicate, calcium hydroxide, a source of fluorine and Portland cement concrete. Calcium sulfate may be added as anhydrous or hemihydrate gypsum.

U.S. Pat. No. 4,655,979 to Nakano et al. discloses a process for making a cellular concrete using calcium silicate based cement, alkali metal retarder, calcium sulfoaluminate (CSA) cement and an optional calcium sulfate that can be added to the concrete composition.

US Patent Application Publication No. 2008-0134943 A1 to Godfrey et al. discloses a waste encapsulation material composed of at least one sulphoaluminate salt of an alkaline earth metal with calcium sulphate, and optional inorganic filler such as blast furnace slag, pulverized fuel ash, finely divided silica, limestone, and organic and inorganic fluidizing agents. Preferably at least one sulphoaluminate salt of an alkaline earth metal comprises calcium sulphoaluminate (CSA). A suitable composition may, for example, comprise at least one sulphoaluminate salt of an alkaline earth metal in combination with gypsum and pulverized fuel ash (PFA), wherein about 86% of the gypsum particles have a particle size of less than 76 μm, and roughly 88% of the PFA particles have a particle size below 45 μm. One example comprises 75% (70:30CSA:$CaSO_4 2H_2O$); 25% Pulverized Fuel Ash; water/solids ratio 0.65.

U.S. Pat. No. 6,730,162 to Li et al. discloses dual cementitious compositions including a first hydraulic composition having 2.5 to 95 wt. % $C_4A_3S$ which is chemical notation wherein C=CaO, S=$SiO_2$, A=$Al_2O_3$ (in other words calcium sulfo-alumina) and 2.5 to 95 wt. % a hemihydrate and/or an anhydrite of calcium sulfate. Sulfoalumina cements or ferroalumina cements are examples of cements that contain $C_4A_3S$. It may also include mineral filler additives selected from the group consisting of slag, fly ash, pozzolan, silica soot, limestone fines, lime industrial by-products and wastes.

Chinese Published Application CN 101921548 A to Deng et al. discloses a composition of sulfoaluminate cement made from 90-95 wt % sulfoaluminate clinker and anhydrous gypsum, quartz sand, fly ash from waste incineration, hydroxypropyl methylcellulose ether, redispersible glue powder and fiber. The sulfoaluminate clinker and anhydrous gypsum meets the standard of sulfoaluminate cement, i.e. GB20472-2006.

Korean Published Application KR 549958 B1 to Jung et al. discloses a composition of alumina cement, CSA, gypsum, calcium citrate, and hydroxyl carboxylic acid.

Korean Published Application KR 2009085451 A to Noh, discloses a composition of powdered blast furnace slag, gypsum and CSA. The gypsum can have an average particle size of 4 micron or less.

Korean Published Application KR 2009025683 A discloses powder type waterproof material used for concrete and mortar, is obtained by pulverizing cement, anhydrous gypsum, silica powder, waterproof powder, fly ash, calcium sulfoaluminate type expansion material and inorganic binder.

Korean Published Application KR 2010129104 A to Gyu et al. discloses composition for blending shotcrete, comprises (in wt. %): metakaolin (5-20), calcium sulfoaluminate (5-20), anhydrous gypsum (20-45), and fly ash (30-50).

There is a need for improved cementitious compositions which offer improved rapid setting and early age strength development, workability and flow properties, rapid surface drying, and low dimensional movement and shrinkage upon drying.

SUMMARY OF THE INVENTION

The present invention provides an ultra-rapid setting and self-desiccating cementitious composition comprising a reaction product of a mixture of:
  a hydraulic cement-based reactive powder comprising:
    an aluminate cement selected from at least one member of the group consisting of calcium aluminate cement and calcium sulfoaluminate cement in an amount of 25-80 parts by weight per 100 parts by weight of the hydraulic cement-based reactive powder;
    Portland cement in an amount of 2.5-45 parts by weight per 100 parts by weight of the hydraulic cement-based reactive powder;
  a calcium sulfate selected from the group consisting of calcium sulfate dihydrate, calcium sulfate hemihydrate, anhydrous calcium sulfate and mixtures thereof, the calcium sulfate in an amount of 15 to 45 parts by weight per 100 parts by weight of the hydraulic cement-based reactive powder;
  an inorganic flow control agent in an amount equal to 0.25-3.00 parts by weight per 1.00 part by weight of hydraulic cement-based reactive powder, wherein the inorganic flow control comprises at least one member selected from the group consisting of fly ash and calcium carbonate, and wherein average particle size of the calcium carbonate ranges from about 10 to 150 microns;
  a metal-based dimensional movement stabilizing agent in an amount equal to 0.50 to 5.00 weight percent of the hydraulic cement-based reactive powder, wherein the metal-based dimensional movement stabilizing agent comprises a lithium compound selected from at least one member of the group of lithium salt and lithium base, wherein the lithium salt is at least one member of the group of lithium carbonate, lithium sulfate, lithium nitrate, lithium nitrite, and lithium silicate, wherein the base is lithium hydroxide;
  a filler in a weight ratio of filler to hydraulic cement-based reactive powder of 0:1 to 5.0:1; and
  water in a weight ratio of water to hydraulic cement-based reactive powder of 0.50 to 1.4:1.

Preferably the mixture has an absence of alkali metal hydroxide and has an absence of alkali metal salt other than lithium salt and lithium base.

If desired, other additives not considered hydraulic cement-based reactive powder, inorganic flow control agent, metal-based dimensional movement stabilizing agent, or filler may be incorporated into the slurry and overall cementitious composition of the invention. Such other additives may be, for example, water reducing agents such as superplasticizers, set accelerating agents, set retarding agents, air-entraining agents, foaming agents, wetting agents, shrinkage control agents, viscosity modifying agents (thickeners), film-forming redispersible polymer powders, film-forming polymer dispersions, pigments, corrosion control agents, alkali-silica reaction reducing admixtures, discrete reinforcing fibers, and internal curing agents.

Self-desiccation behavior, for the purposes of this invention, refers to the ability of the material to substantially consume the added water via chemical reactions to achieve a surface that is sufficiently dry and ready for application of adhesives and coverings. Self-desiccation and surface drying characteristics of a material is measured by pouring approximately ¼" thick layer of slurry in a shallow plastic tray. Self-desiccation time is then characterized as the time when the top surface of the poured slab changes its observable wet surface appearance to a hardened surface that is sufficiently dry to permit application of organic or inorganic adhesives and finish coverings (such as carpet and other resilient floor coverings) without negatively affecting the short- and long-term bond between the finish covering material and the poured slab. Self-desiccation time generally occurs soon after the final setting time is achieved, typically about 30 to 45 minutes after the final setting time.

Ultra-rapid setting characteristic of a material, for the purposes of this invention, refers to a final setting time of material preferably less than 180 minutes, more preferably less than 120 minutes, and most preferably less than 60 minutes, when measured in accordance to the ASTM C191-13 test procedure.

The ultra-rapid setting and self-desiccating cementitious compositions of this invention may include different fillers and additives including air entraining agents and foaming agents for adding air in specific proportions to make lightweight cementitious products. Typical compositions may contain air, e.g., 0-25 vol. % or 2-25 vol. %.

It has unexpectedly been found that a metal salt such as lithium carbonate when used beyond a critical amount in the compositions of invention has a positive impact on reducing and stabilizing both short- and long-term dimensional movement of the material. The compositions of present invention have a maximum drying shrinkage of preferably less than 0.10%, more preferably less than 0.05%, and most preferably equal to or less than 0.00%. When the maximum drying shrinkage or linear dimensional movement of material is less than 0.00%, signifies that the material undergoes a net positive expansion rather than a net shrinkage upon drying. The most preferred compositions of the present invention display a net positive expansion upon drying rather than a net shrinkage. The drying shrinkage or linear dimensional movement of the material is typically measured in accordance to the ASTM C1708-13 standard.

Another important feature of the compositions of the invention is that they are self-desiccating, consuming large amount of water in cement hydration reactions thus leading to a material that surface dries extremely rapidly, as early as, in one hour after material mixing and placement. This feature is significant, for example in flooring applications, where it allows application of flooring adhesives and floor coverings on the hardened and dried material within a short duration after material placement.

Yet another important and unique feature of the compositions of the present invention is that they are capable of utilizing and incorporating a large amount of water in chemical reactions without unduly affecting the setting time, drying time, early age compressive strengths, and dimensional movement behavior during the physical and chemical processes of material drying, setting and hardening. This is an unexpected finding since the state-of-the-art hydraulic cement compositions are well known to have a negative impact of excess water amount on setting behavior, drying characteristics, early age compressive strengths, and dimensional movement behavior.

The hydraulic cement reactive powder compositions of the present invention comprise aluminate-based hydraulic cement/s, Portland cement, and calcium sulfate. The self-desiccating hydraulic compositions of the present invention are achieved with the use of an inorganic flow control agent, which facilitates material workability and flow properties in material fresh state. Furthermore, the self-desiccating hydraulic compositions of the present invention are achieved with the use of a metal-based dimensional movement stabilizing agent that has a positive influence on reducing and stabilizing both short- and long-term dimensional movement of the material.

The compositions of this invention are advantageously used for a number of applications, including but not limited to self-leveling underlayment, floor topping, decorative floor topping, isolation screed, trowelable patch, pourable patch, repair mortars, road repair patch, vertical and overhead repair material, cementitious basecoat and plaster, tile setting adhesives, tile grouts, anchoring cements and grouts, synthetic tiles and stones, statuary products, and pre-cast or poured in-place panel products and construction elements.

As used herein, "cementitious materials" is defined as the aluminate cement, Portland cement, and calcium sulfate and any additional cement which may be added to the reactive mixture. The amount of water depends on the needs of the individual materials present in the cementitious composition as well as the workability requirements for application in consideration.

Setting of compositions of this invention is characterized by initial and final setting times, as measured using Vicat specified in the ASTM C191-13 test procedure. The final setting time also corresponds to the time when a concrete product, e.g., a concrete panel, has sufficiently hardened so it can be handled.

As used herein, early age strength of the composition is characterized by measuring the compressive strength after 2 to 5 hours of mixing. In many applications, relatively higher early age compressive strength can be advantageous for a cementitious material because it can withstand higher stresses without excessive deformation or failure. Typically, chemical reactions providing strength development in such compositions will continue for extended periods after the final setting time has been reached.

The compositions of the invention have an absence of alkali metal salt other than lithium salts. Preferably the compositions of the invention have an absence of alkali metal salt other than lithium carbonate. The compositions of the invention have an absence of alkali metal hydroxide other than lithium hydroxide. Preferably the compositions of the invention have an absence of alkali metal hydroxide. The compositions of the invention have an absence of an alkali metal citrate. The compositions of the invention have an absence of alkali metal silicate other than lithium silicate. Preferably the compositions of the invention have an absence of alkali metal silicate.

The compositions of US Patent Application Publication Nos. 2016-0214897 A1 and 2016-0194247 A1 were made by a chemical reaction reacting chemical activator, e.g., alkali metal hydroxides, alkali metal silicates, or alkali metal citrates, with fly ash. In the present invention the fly ash, if present, is a filler and flow control agent. In the present invention the fly ash does not react to form a geopolymer because there is no chemical activator as in US Patent Application Publication Nos. 2016-0214897 A1 and 2016-0194247 A1.

The composition of US Patent Application Publication No. 2010-0071597 A1 to Perez-Pena employed alkali metal salt of citric acid for chemical activation of fly ash. The present invention does not.

The present invention also provides a method for mixing the composition of the invention, reacting the mixture, and allowing the mixture to set. Thus, the invention provides a method comprising:

making a mixture by mixing the composition of the invention comprising:
        the hydraulic cement-based reactive powder comprising:
            the aluminate cement,
            the Portland cement,
            the calcium sulfate,
        the inorganic flow control agent;
        the metal-based dimensional movement stabilizing agent;
        the filler; and
        the water;
    reacting the mixture; and
    allowing the mixture to set and harden.

Other advantages, benefits and aspects of various embodiment of the invention are discussed below, are illustrated in the accompanying figures, and will be understood by those of skill in the art from the more detailed disclosure below. All percentages, ratios and proportions herein are by weight, unless otherwise specified.

BRIEF DESCRIPTION OF THE DRAWINGS

FIG. 6C shows a plot of linear movement (drying shrinkage) of mixture compositions investigated in Example 6.

FIG. 7C shows a plot of linear movement (drying shrinkage) of mixture compositions investigated in Example 7.

FIGS. 8A-F shows photographs of slump patties for Mixes 1-6, respectively, for the compositions investigated in Example 8.

DETAILED DESCRIPTION OF THE INVENTION

Figure 1:
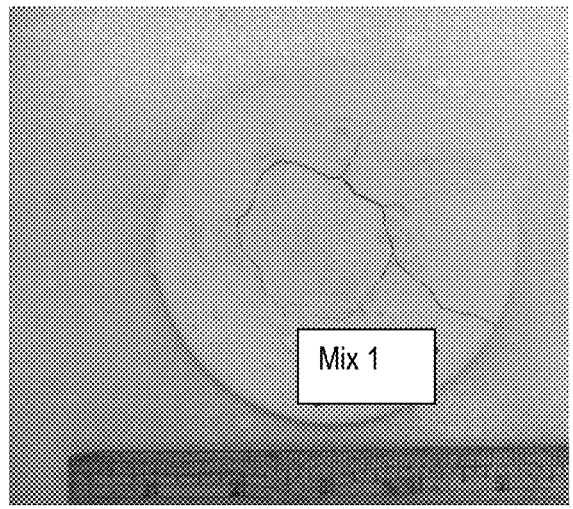
FIG. 1 shows a photograph of a slump patty for the Mix 1 composition investigated in Example 1.

The hydraulic cement reactive powder compositions of the present invention comprise aluminate-based hydraulic cement/s, Portland cement, and calcium sulfate. The self-desiccating hydraulic compositions of the present invention are achieved with the use of an inorganic flow control agent, which facilitates material workability and flow properties in material fresh state. Furthermore, the self-desiccating hydraulic compositions of the present invention are achieved with the use of a metal-based dimensional movement stabilizing agent that has a positive influence on reducing and stabilizing both short- and long-term dimensional movement of the material.

Key raw materials of the present invention and amounts of these raw materials in compositions of the present invention are described below.

Compositions of the Present Invention

The cementitious reactive mixtures of the present invention comprise aluminate-based cement/s, Portland cement, calcium sulfate, inorganic flow control agent, metal-based dimensional movement stabilizing agent, water, and other optional additives.

TABLES 1, 2, and 3 describe the self-desiccating, rapid-hardening, dimensionally stable hydraulic cement-based compositions of the present invention comprising aluminate-based cement/s, Portland cement, calcium sulfate, inorganic flow control agent, metal-based dimensional movement stabilizing agent, water, and other optional additives. TABLES 1, 2, and 3 show the composition expressed in parts by weight (pbw) of individual or aggregated components. The hydraulic cement-based reactive powder comprises aluminate-based cement/s, Portland cement, and calcium sulfate.

In these tables and elsewhere in the specification when a component is represented as component/Hydraulic Cement Reactive Powder Weight Ratio, for example Inorganic Flow Control Agent/Hydraulic Cement Reactive Powder Weight Ratio, this means the weight of the component is calculated as a ratio relative to the weight of Hydraulic Cement-Based Reactive Powder. Thus, a value of Inorganic Flow Control Agent/Hydraulic Cement-Based Reactive Powder Weight Ratio of 3.00 means there are 300 pbw Inorganic Flow Control Agent for every 100 pbw Hydraulic Cement Reactive Powder for a total of 400 pbw.

In these tables and elsewhere in the specification when a component is represented as component/Hydraulic Cement Reactive Powder, weight %, for example a value of Metal-Based Dimensional Movement Stabilizing Agent/Hydraulic Cement Reactive Powder, weight % of 5.00 means the amount of Metal-Based Dimensional Movement Stabilizing Agent equals 5% by weight of the amount of Hydraulic Cement Reactive Powder. In other words, there is 5 pbw Metal-Based Dimensional Movement Stabilizing Agent for every 100 pbw Hydraulic Cement Reactive Powder for a total of 105 pbw. Hydraulic Cement Reactive Powder is also alternatively termed as Hydraulic Cement-Based Reactive Powder or simply Cementitious Reactive Powder in this application.

TABLE 1

Self-Desiccating, Rapid-Hardening, Dimensionally Stable Hydraulic Cement-Based Compositions of Present Invention Comprising Aluminate-Based Cement, Portland Cement, Calcium Sulfate, Inorganic Flow Control Agent, and Metal-Based Dimensional Movement Stabilizing Agent

| Raw Material | Broad Range | Preferred Range | Most Preferred Range |
|---|---|---|---|
| Hydraulic Cement-Based Reactive Powder (100 pbw) | | | |
| Aluminate-Based Cement, pbw* | 25-80 | 30-75 | 35-70 |
| Portland Cement, pbw | 2.5-45 | 5-35 | 7.5-25 |
| Calcium Sulfate, pbw | 15-45 | 20-40 | 25-35 |
| Inorganic Flow Control Agent/Hydraulic Cement-Based Reactive Powder Weight Ratio | 0.25 to 3.0 | 0.5 to 2.0 | 0.75 to 1.5 |
| Metal-Based Dimensional Movement Stabilizing Agent/Hydraulic Cement-Based Reactive Powder, weight % | 0.5 to 5.0 | 1.0 to 4.0 | 1.5 to 3.5 |
| Filler/Hydraulic Cement-Based Reactive Powder Weight Ratio | 0 to 5.0 | 0.5 to 3.5 | 1.0 to 2.5 |
| Water/Hydraulic Cement-Based Reactive Powder Weight Ratio | 0.5 to 1.4 | 0.6 to 1.3 | 0.7 to 1.2 |

*Aluminate cement selected from at least one member of the group consisting of calcium aluminate cement and calcium sulfoaluminate cement.

TABLE 2

Self-Desiccating, Rapid-Hardening, Dimensionally Stable Hydraulic Cement-Based Compositions of Present Invention Comprising Calcium Sulfoaluminate Cement, Calcium Aluminate Cement, Portland Cement, Calcium Sulfate, Inorganic Flow Control Agent and Metal-Based Dimensional Movement Stabilizing Agent

| Raw Material | Broad Range | Preferred Range | Most Preferred Range |
|---|---|---|---|
| Hydraulic Cement-Based Reactive Powder (100 pbw) | | | |
| Calcium Sulfoaluminate Cement, pbw | 25-75 | 30-70 | 35-65 |
| Calcium Aluminate Cement, pbw | 2.5-45 | 5-40 | 10-35 |
| Portland Cement, pbw | 2.5-45 | 5-35 | 7.5-25 |
| Calcium Sulfate, pbw | 15-45 | 20-40 | 25-35 |
| Inorganic Flow Control Agent/Hydraulic Cement-Based Reactive Powder Weight Ratio | 0.25 to 3.00 | 0.50 to 2.00 | 0.75 to 1.50 |

TABLE 2-continued

Self-Desiccating, Rapid-Hardening, Dimensionally Stable Hydraulic
Cement-Based Compositions of Present Invention Comprising Calcium
Sulfoaluminate Cement, Calcium Aluminate Cement, Portland Cement, Calcium
Sulfate, Inorganic Flow Control Agent and Metal-Based Dimensional Movement
Stabilizing Agent

| Raw Material | Broad Range | Preferred Range | Most Preferred Range |
|---|---|---|---|
| Metal-Based Dimensional Movement Stabilizing Agent/Hydraulic Cement-Based Reactive Powder, weight % | 0.50 to 5.00 | 1.00 to 4.00 | 1.50 to 3.50 |
| Filler/Hydraulic Cement-Based Reactive Powder Weight Ratio | 0 to 5.0 | 0.5 to 3.5 | 1.0 to 2.5 |
| Water/Hydraulic Cement-Based Reactive Powder Weight Ratio | 0.50 to 1.40 | 0.60 to 1.30 | 0.70 to 1.20 |

TABLE 3

Self-Desiccating, Rapid-Hardening, Dimensionally Stable Hydraulic
Cement-Based Compositions of Present Invention Comprising Calcium
Sulfoaluminate Cement, Calcium Aluminate Cement, Portland Cement, Calcium
Sulfate, Inorganic Flow Control Agent and Metal-Based Dimensional Movement
Stabilizing Agent with ranges for additional additives

| Raw Material | Broad Range | Preferred Range | Most Preferred Range |
|---|---|---|---|
| Hydraulic Cement-Based Reactive Powder (100 pbw) | | | |
| Aluminate Cement, pbw* | 25-80 | 30-75 | 35-70 |
| Portland Cement, pbw | 2.5-45 | 5-35 | 7.5-25 |
| Calcium Sulfate, pbw | 15-45 | 20-40 | 25-35 |
| Inorganic Flow Control Agent/Hydraulic Cement-Based Reactive Powder Weight Ratio | 0.25 to 3.0 | 0.5 to 2.0 | 0.75 to 1.5 |
| Metal-Based Dimensional Movement Stabilizing Agent/Hydraulic Cement-Based Reactive Powder, weight % | 0.50 to 5.0 | 1.0 to 4.0 | 1.50 to 3.5 |
| Filler/Hydraulic Cement-Based Reactive Powder Weight Ratio** | 0 to 5.0 | 0.5 to 3.5 | 1.0 to 2.5 |
| Organic Rheology Modifier/Hydraulic Cement-Based Reactive Powder, weight %** | 0.02 to 1 | 0.04 to 0.75 | 0.06 to 0.5 |
| Inorganic Viscosity Enhancing Agents/Hydraulic Cement-Based Reactive Powder, weight %** | 0 to 1 | 0 to 0.75 | 0 to 0.5 |
| Superplasticizer/Hydraulic Cement-Based Reactive Powder, weight % | 0.3 to 3.5 | 0.4 to 2.5 | 0.5 to 1.5 |
| Defoamer/Hydraulic Cement-Based Reactive Powder, weight %** | 0 to 2.0 | 0.25 to 1.5 | 0.5 to 1.0 |
| Set Retarding Agent/Hydraulic Cement-Based Reactive Powder, weight %** | 0 to 2.0 | 0.10 to 1.5 | 0.2 to 1.0 |
| Color Pigment/Hydraulic Cement-Based Reactive Powder, weight %** | 0 to 8.0 | 0 to 6.0 | 0 to 4.0 |
| Air Entraining Agent/Hydraulic Cement-Based Reactive Powder, weight %** | 0 to 1.0 | 0 to 0.5 | 0 to 0.25 |
| Organic Film Forming Polymer/Hydraulic Cement-Based Reactive Powder, weight %** | 0 to 15.0 | 0 to 10.0 | 0 to 5.0 |
| Pozzolans other than fly ash/Hydraulic Cement Reactive Powder Weight Ratio** | 0 to 1 | 0 to 1 | 0 to 1 |
| Water/Hydraulic Cement-Based Reactive Powder Weight Ratio | 0.50 to 1.40 | 0.60 to 1.30 | 0.70 to 1.20 |

*Aluminate cement selected from at least one of calcium aluminate cement and calcium sulfoaluminate cement, most preferably both calcium aluminate cement and calcium sulfoaluminate cement.
**Ranges for additional additives preferably also apply to compositions of TABLE 2.

To form the binder composition, the Cementitious Reactive Powder (aluminate cement, Portland cement, and calcium sulfate), Inorganic Flow Control Agent, Metal-Based Dimensional Movement Stabilizing Agent, filler, and water are mixed to form a cementitious slurry at an initial temperature (temperature during the first minute the ingredients are first all present in the mixture) of about 0° C. to about 50° C.

Hydraulic Cements

Hydraulic cements for purposes of this invention is a cement that undergoes a chemical setting reaction when it comes in contact with water (hydration) and which will not only set (cure) under water but also forms a water-resistant product.

Hydraulic cements include, but are not limited to, aluminum silicate cements like Portland cement, calcium sulfoaluminate cement, and calcium aluminate based cement.

For purposes of the present specification calcium sulfate is not considered a hydraulic cement. However, for purposes of this application a hydraulic cement-based reactive powder includes hydraulic cement and calcium sulfate. Pozzolans if included in the overall composition are not part of the hydraulic cement-based reactive powder. Pozzolans if included in the overall composition are in addition to the hydraulic cement-based reactive powder.

Aluminate-Based Cements

Calcium sulfoaluminate cements and calcium aluminate cements are the preferred aluminate-based cements of the present invention. Calcium aluminate cements with the phase dodeca calcium hepta aluminate ($C_{12}A_7$) as the predominant phase in the cement are the most preferred calcium aluminate cements of the present invention. Different classes of calcium aluminate cements may either be used individually or they may be combined in specified amounts in accordance to this invention to achieve desirable end results. In a preferred embodiment, a combination of calcium sulfoaluminate cement and calcium aluminate cement is utilized to obtain extremely rapid-hardening and rapid-drying behavior.

Generally, in the hydraulic cement-based reactive powder of compositions of the present invention the aluminate-based cement comprises an aluminate cement selected from at least one member of the group of calcium aluminate cement and calcium sulfoaluminate cement in an amount of 25-80 parts by weight per 100 parts by weight of the hydraulic cement-based reactive powder. Preferably there is 30-75 parts by weight of this aluminate cement per 100 parts by weight of the hydraulic cement-based reactive powder. More preferably there is 30-70 parts by weight of this aluminate cement per 100 parts by weight of the hydraulic cement-based reactive powder.

When the hydraulic cement-based reactive powder comprises calcium sulfoaluminate cement and calcium aluminate cement, generally there is 25-75 parts by weight calcium sulfoaluminate cement per 100 parts by weight of the hydraulic cement-based reactive powder and 2.5-45 parts by weight calcium aluminate cement per 100 parts by weight of the hydraulic cement-based reactive powder; preferably there is 30-70 parts by weight calcium sulfoaluminate cement per 100 parts by weight of the hydraulic cement-based reactive powder and 5-40 parts by weight calcium aluminate cement per 100 parts by weight of the hydraulic cement-based reactive powder; more preferably there is 35-65 parts by weight calcium sulfoaluminate cement per 100 parts by weight of the hydraulic cement-based reactive powder and 10-35 parts by weight calcium aluminate cement per 100 parts by weight of the hydraulic cement-based reactive powder.

Calcium Sulfoaluminate (CSA) Cement

Calcium sulfoaluminate cement forms an ingredient of the compositions of the present invention. Calcium sulfoaluminate (CSA) cements are a different class of cements from calcium aluminate cement (CAC) or calcium silicate based hydraulic cements, for example, Portland cement. CSA cements are hydraulic cements based on calcium sulfoaluminate, rather than calcium aluminates which are the basis of CAC cement or calcium silicates which are the basis of Portland cement. Calcium sulfoaluminate cements are made from clinkers that include Ye'elimite ($Ca_4(AlO_2)_6SO_4$ or $C_4A_3\check{S}$) as a primary phase.

Other major phases present in the preferred calcium sulfoaluminate cement may include one or more of the following: dicalcium silicate ($C_2S$), tetracalcium aluminoferrite ($C_4AF$), and calcium sulfate ($C\check{S}$). The relatively low lime requirement of calcium sulfoaluminate cements compared to Portland cement reduces energy consumption and emission of greenhouse gases from cement production. In fact, calcium sulfoaluminate cements can be manufactured at temperatures approximately 200° C. lower than Portland cement, thus further reducing energy and greenhouse gas emissions. The amount of Ye'elimite phase ($Ca_4(AlO_2)_6SO_4$ or $C_4A_3\check{S}$) present in the calcium sulfoaluminate cements is preferably about 20 to about 90 wt. %, more preferably about 30 to about 75 wt. %, and most preferably about 40 to about 60 wt. %.

The amount of calcium sulfoaluminate cement in the compositions of the invention is adjustable based on the amount of active Ye'elimite phase ($Ca_4(AlO_2)_6SO_4$ or $C_4A_3\check{S}$) present in the CSA cement.

Calcium Aluminate Cement

Calcium aluminate cement (CAC) is another type of hydraulic cement that may form a component of the reactive powder blend of compositions of the invention when particularly higher compressive strength is not required with low water content slurries containing substantial amounts of fly ash.

Calcium aluminate cement (CAC) is also commonly referred to as aluminous cement or high alumina cement. Calcium aluminate cements have a high alumina content, about 30-45 wt. % is preferable. Higher purity calcium aluminate cements are also commercially available in which the alumina content can range as high as about 80 wt. %. These higher purity calcium aluminate cements tend to be very expensive relative to other cements. The calcium aluminate cements used in compositions of the invention are finely ground to facilitate entry of the aluminates into the aqueous phase so that rapid formation of ettringite and other calcium aluminate hydrates can take place. The surface area of the calcium aluminate cement will typically be greater than 3,000 cm$^2$/gram and preferably about 4,000 to about 6,000 cm$^2$/gram as measured by the Blaine surface area method (ASTM C 204-11).

Several manufacturing methods have emerged to produce calcium aluminate cement worldwide. Preferably, the main raw materials used in the manufacturing of calcium aluminate cement are bauxite and limestone. One manufacturing method for producing calcium aluminate cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement.

Typically, several calcium aluminate compounds may be formed during the manufacturing process of calcium aluminate cement. The predominant compound formed often is monocalcium aluminate ($CaO.Al_2O_3$, also referred to as CA). The other calcium aluminate and calcium silicate compounds that are formed can include $12CaO.7Al_2O_3$ also referred to as $C_{12}A_7$, $CaO.2Al_2O_3$ also referred as $CA_2$, dicalcium silicate ($2CaO.SiO_2$, called $C_2S$), dicalcium alumina silicate ($2CaO.Al_2O_3.SiO_2$, called $C_2AS$). Several other compounds containing relatively high proportion of iron oxides also can be formed. These include calcium ferrites such as $CaO.Fe_2O_3$ or CF and $2CaO.Fe_2O_3$ or $C_2F$, and calcium alumino-ferrites such as tetracalcium aluminoferrite (4CaO.Al$_2$O$_3$.Fe$_2$O$_3$ or C$_4$AF), 6CaO.Al$_2$O$_3$.2Fe$_2$O$_3$ or C$_6$AF$_2$) and 6CaO.2Al$_2$O$_3$.Fe$_2$O$_3$ or C$_6$A$_2$F). Other minor constituents often present in the calcium aluminate cement include magnesia (MgO), titania (TiO$_2$), sulfates and alkalis.

The calcium aluminate cements can have one or more of the aforementioned phases. Calcium aluminate cements having monocalcium aluminate (CaO.Al$_2$O$_3$ or CA) and/or dodeca calcium hepta aluminate (12CaO.7Al$_2$O$_3$ or C$_{12}$A$_7$) as predominant phases are preferred in the present invention. Further, the calcium aluminate phases can be available in crystalline form and/or amorphous form. Ciment Fondu (or HAC Fondu), SECAR 51, and SECAR 71 are some examples of commercially available calcium aluminate cements that have the monocalcium aluminate (CA) as the primary cement phase. TERNAL EV and TERNAL EP are examples of commercially available calcium aluminate cement that have the dodeca calcium hepta aluminate (12CaO.7Al$_2$O$_3$ or C$_{12}$A$_7$) as the predominant cement phase. Both TERNAL EV and TERNAL EP, having the dodeca calcium hepta aluminate (12CaO.7Al$_2$O$_3$ or C$_{12}$A$_7$) as the predominant cement phase, are the particularly preferred calcium aluminate cement in the present invention.

When calcium aluminate (CAC) cements are used in the present invention, they may partially substitute calcium sulfoaluminate cement. The amount of calcium aluminate cement substitution in compositions of the invention is typically up to about 49 wt. % of the aggregated weight of calcium sulfoaluminate cement and calcium aluminate cement.

Portland Cement

Portland cement, in the amounts specified herein, is a critical ingredient of the present invention. Its use is crucial in developing rapid early age compressive strength and reducing shrinkage behavior of the material. As used herein, "Portland cement" is a calcium silicate-based hydraulic cement. ASTM C 150-12 defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an interground addition." As used herein, "clinkers" are nodules (diameters, about 0.2—about 1.0 inch [5-25 mm]) of a sintered material that are produced when a raw mixture of predetermined composition is heated to high temperature. Different types of Portland cements and other Portland cement-based hydraulic cements as classified in ASTM C150-12, ASTM C595-13 and ASTM C1600-11 may be usefully employed in the present invention. Oil well cements represents yet another class of hydraulic cements, which can be used in lieu of Portland cements in the self-desiccating, rapid-hardening hydraulic cement compositions of the present invention.

Generally, the hydraulic cement-based reactive powder of compositions of the present invention comprises Portland cement in an amount of 2.5-45 parts by weight per 100 parts by weight of the hydraulic cement-based reactive powder; preferably 5-35 parts by weight Portland cement per 100 parts by weight of the hydraulic cement-based reactive powder; more preferably 7.5-25 parts by weight Portland cement per 100 parts by weight of the hydraulic cement-based reactive powder.

Calcium Sulfate

Calcium sulfate forms yet another critical ingredient of the self-desiccating, rapid-hardening compositions of the present invention. Although calcium sulfate, e.g., calcium sulfate dihydrate will react with water, it does not form a water-resistant product and it is not considered to be hydraulic cement for purposes of this invention. Calcium sulfate types that are useful in compositions of the invention include calcium sulfate dihydrate, calcium sulfate hemihydrate and anhydrous calcium sulfate (anhydrite). These calcium sulfates may be available naturally or produced industrially. Calcium sulfates synergistically interact with the other fundamental components, particularly aluminate cements, of the cementitious compositions of the invention and impart several useful properties to the final material including rapid set, dimensional stability, and compressive strength.

Different morphological forms of calcium sulfate can be usefully employed in the present invention. The properties of the compositions and composites of the present invention have been found to depend significantly on the type of calcium sulfate used based on its chemical composition, particle size, crystal morphology, and chemical and thermal treatment. Amongst other properties, the setting behavior, rate of strength development, ultimate compressive strength, shrinkage behavior, and cracking resistance of the compositions of the invention can be tailored by selecting a proper source of calcium sulfate in the formulation. Thus, the selection of the type of calcium sulfate used in compositions of the invention is based on the balance of properties sought in the end application.

Particle size and morphology of calcium sulfate have been found to significantly influence the development of early age and ultimate strengths of the cementitious compositions of the invention. In general, a smaller particle size of calcium sulfate has been found to provide a more rapid development in early age strength. When it is desirable to have an extremely rapid rate of strength development, the preferred average particle size of calcium sulfate ranges is about 1 to about 100 microns, more preferably about 1 to about 50 microns, and still more preferably about 1 to about 25 microns. Furthermore, calcium sulfates with finer particle size have also been found to result in lower material shrinkage.

All three forms of calcium sulfate (primarily hemihydrate, dihydrate and anhydrite) are useful. The most soluble form of calcium sulfate is the hemihydrate, followed by the relatively lower solubility form of the dihydrate, and then followed by the relatively insoluble form of the anhydrite. All three forms are themselves known to set (form matrices of the dihydrate chemical form) in aqueous media under appropriate conditions, and the setting times and compressive strengths of the set forms are known to follow their order of solubility. For example, all other things being equal, employed alone as the sole setting material, the hemihydrate usually has the shortest set times and the anhydrite typically has the longest set times.

Generally the hydraulic cement-based reactive powder of compositions of the present invention comprises a calcium sulfate selected from the group consisting of calcium sulfate dihydrate, calcium sulfate hemihydrate, anhydrous calcium sulfate and mixtures thereof, the calcium sulfate in an amount of 15 to 45 parts by weight per 100 parts by weight of the hydraulic cement-based reactive powder; preferably 20 to 40 parts by weight calcium sulfate per 100 parts by weight of the hydraulic cement-based reactive powder; more preferably 25 to 35 parts by weight calcium sulfate per 100 parts by weight of the hydraulic cement-based reactive powder.

Inorganic Flow Control Agent

The inorganic flow control agents of the present invention are inorganic materials that facilitate good workability and flow properties when mixed with other cementitious components of the invention and water. The inorganic flow control agents of the present invention include at least one member of the group consisting of fly ash and calcium carbonate mineral materials having optimal particle size distribution. The optimal average particle size of calcium carbonate employed in the present invention ranges from about 10 to 150 microns, more preferably from about 15 to 100 microns, and most preferably from about 25 to 75 microns. Fly ash is obtained as a byproduct of coal combustion process. In this invention, the fly ash is a pozzolanic material but does not react with chemical activators to form a geopolymer. Geopolymer reactions start rapidly. In contrast, pozzolanic reactions start slowly and are long-term chemical reactions. Thus, in the invention, the fly ash does not contribute significantly to the strength of the material for the first few weeks after mixing, unlike geopolymers.

Both Class C fly ash and Class F fly ash, per ASTM C618 (2008) may be usefully employed in the present invention. Fly ashes containing high calcium oxide and calcium aluminate content (such as Class C fly ashes of ASTM C618 (2008) standard are preferred in the present invention as explained below.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 (2008) standard recognizes two major classes of fly ashes for use in concrete—Class C and Class F. These two classes of fly ashes are generally derived from different kinds of coals that are a result of differences in the coal formation processes occurring over geological time periods. Class F fly ash is normally produced from burning anthracite or bituminous coal. Class C fly ash is normally produced from lignite or sub-bituminous coal.

The ASTM C618 (2008) standard differentiates Class F and Class C fly ashes primarily according to their pozzolanic properties. Accordingly, in the ASTM C618 (2008) standard, the major specification difference between the Class F fly ash and Class C fly ash is the minimum limit of $SiO_2$+$Al_2O_3$+$Fe_2O_3$ in the composition. The minimum limit of $SiO_2$+$Al_2O_3$+$Fe_2O_3$ for Class F fly ash is 70% and for Class C fly ash is 50%. Thus, Class F fly ashes are more pozzolanic than the Class C fly ashes. Although not explicitly recognized in the ASTM C618 (2008) standard, Class C fly ashes preferably have high calcium oxide (lime) content.

If desired the Class C fly ash usually has cementitious properties in addition to pozzolanic properties due to free lime (calcium oxide). Class F is rarely cementitious when mixed with water alone. Presence of high calcium oxide content provides Class C fly ashes with cementitious properties leading to the formation of calcium silicate and calcium aluminate hydrates when mixed with water.

Typically, the fly ash comprises Class C fly ash, for example about 50 to about 100 parts Class C fly ash per 100 parts by weight fly ash, or about 75 parts to about 100 parts Class C fly ash per 100 parts fly ash.

Generally, the compositions of the present invention comprise the inorganic flow control agent in a weight ratio of inorganic flow control agent to hydraulic cement-based reactive powder of 0.25:1 to 3.0:1, wherein the inorganic flow control comprises at least one member selected from the group consisting of fly ash and calcium carbonate and wherein average particle size of the calcium carbonate ranges from about 10 to 150 microns; preferably the weight ratio of the inorganic flow control agent to the hydraulic cement-based reactive powder equals 0.5:1 to 2.0:1; more preferably the weight ratio of the inorganic flow control agent to the hydraulic cement-based reactive powder equals 0.75:1 to 1.5:1.

Pozzolanic Materials other than Fly Ash

The invention optionally comprises a pozzolanic material other than fly ash selected from a group consisting of blast furnace slag, thermally activated clays, shales, metakaolin, zeolites, marl red mud, ground rock, and ground clay bricks. Preferably, pozzolanic material has $Al_2O_3$ content greater than about 5% by weight. Typically clay or marl is used after thermal activation by heat treatment at temperatures of from about 600° to about 850° C.

ASTM C618 (2008) defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties."

The invention optionally comprises a silicate and aluminosilicate mineral, other than fly ash, which is a pozzolan possessing substantial, little or no cementing properties on their own in an aqueous media can be included as optional mineral additives in the compositions of the invention. Various natural and man-made materials have been referred to as pozzolanic materials possessing pozzolanic properties. Some examples of pozzolanic materials include silica fume, pumice, perlite, diatomaceous earth, finely ground clay, finely ground shale, finely ground slate, finely ground glass, volcanic tuff, trass, and rice husk. All of these pozzolanic materials can be used either singly or in combination. However, preferably there is an absence of glass.

Generally present invention compositions comprise the pozzolan other than fly ash in a weight ratio of pozzolan to hydraulic cement-based reactive powder of 0:1 to 1:1. However, the invention may have an absence of pozzolan or aluminosilicate material other than fly ash.

Metal-Based Dimensional Movement Stabilizing Agent

The metal-based dimensional movement stabilizing agent of the present invention comprises a lithium compound selected from at least one member of the group of lithium salt and lithium base, wherein the lithium salt is at least one member of the group of lithium carbonate, lithium sulfate, lithium nitrate, lithium nitrite, and lithium silicate, wherein the base is lithium hydroxide. Preferably the metal-based dimensional movement stabilizing agent of the present invention comprises lithium carbonate. Most preferably the metal-based dimensional movement stabilizing agent of the present invention is 100% lithium carbonate. It has been found that lithium compound, particularly lithium carbonate, when incorporated beyond a critical amount in the compositions of the present invention has an unexpected positive influence on stabilizing both short- and long-term dimensional movement of the aluminous cementitious composition of this invention.

Generally the compositions of the present invention comprise the metal-based dimensional movement stabilizing agent in an amount equal to 0 to 5.0 weight percent of the hydraulic cement-based reactive powder, wherein the metal-based dimensional movement stabilizing agent comprises a lithium compound selected from at least of lithium salt and lithium base, wherein the lithium salt is at least one of lithium carbonate, lithium sulfate, lithium nitrate, lithium nitrite, and lithium silicate, the base is lithium hydroxide. Preferably the amount of the metal-based dimensional movement stabilizing agent equals 1.0 to 4.0 weight percent of the hydraulic cement-based reactive powder. More preferably the amount of the metal-based dimensional movement stabilizing agent equals 1.5 to 3.5 weight percent of the hydraulic cement-based reactive powder. The invention also contemplates wherein the mixture has an absence of alkali metal hydroxide and has an absence of alkali metal salt other than lithium compounds. The invention preferably also contemplates wherein the mixture has an absence of alkali metal hydroxide and has an absence of alkali metal salt other than lithium carbonate. The invention also contemplates wherein the mixture has an absence of alkali metal citrate. The invention also contemplates wherein the mixture has an absence of alkali metal hydroxide other than lithium hydroxide. The invention also contemplates wherein preferably the mixture has an absence of alkali metal hydroxide.

Optional Set-Control Agents

Other optional set control chemical additives include a sodium carbonate, potassium carbonate, calcium nitrate, calcium nitrite, calcium formate, calcium acetate, calcium chloride, aluminum sulfate, sodium aluminate, alkanolamines, polyphosphates, and the like. These additives when included as a part of the formulation may also influence rheology of the compositions of the invention in addition to affecting setting behavior. The invention also contemplates an absence of these set control agents.

Water

Another important feature of the compositions of present invention is that they are capable of incorporating very high amount of water without negatively impacting the critical material properties such as setting time, rapid drying, early age strength, ultimate strength, and dimensional movement due to drying. Even at such high water levels, the preferred compositions of the present invention display setting times of less than 1 hour, rapid drying behavior in about 1-hour after material mixing and installation, early age (2-hour) compressive strengths in excess of 1500 psi, and extremely low dimensional movement due to material drying. Thus, the invention advantageously can use a broad range of water without negatively impacting the critical properties such as setting time, rapid drying, early age strength, and dimensional movement due to drying. For use in the field this is especially advantage because a user can vary the amount of water but get substantially the same properties of setting time, rapid drying, early age strength, ultimate strength, and dimensional movement due to drying. Because of the rapid surface drying characteristics achieved through rapid cement hydration reactions that incorporate a large amount of chemically bound water, the compositions of this invention are termed here as self-desiccating. In contrast, the conventional Portland cement based cementitious compositions are extremely slow setting and take several hours to set and to achieve surface drying characteristics akin to that of the present invention.

Generally in compositions of the present invention the weight ratio of water to hydraulic cement-based reactive powder of 0.5:1 to 1.4:1; preferably the weight ratio of water to hydraulic cement-based reactive powder is 0.6:1 to 1.3:1; more preferably the weight ratio of water to hydraulic cement-based reactive powder is 0.7:1 to 1.2:1, and most preferably the weight ratio of water to hydraulic cement-based reactive powder is 0.8:1 to 1.1:1.

Fillers

While the disclosed cementitious reactive powder blend defines the rapid setting component of the cementitious composition of the invention, it will be understood by those skilled in the art that other materials may be included in the composition depending on its intended use and application.

One or more fillers such as fine aggregate, coarse aggregate, inorganic mineral fillers, and lightweight fillers may be used as a component in compositions of the invention.

These fillers are not inorganic flow control agents as described above.

These fillers are not pozzolans.

Fine aggregates can be added to the compositions in the invention without affecting the properties to increase the yield of the material. An example of fine aggregate is sand such as siliceous sand or alumina sand. Sand is defined as an inorganic rock material with an average particle size of less than about 4.75 mm (0.195 inches) and has a crystalline structure. Herein, sand does not include ground or recycled glass. Ground or recycled glass has an amorphous structure. Preferably the compositions of the present invention have an absence of ground glass particles. Preferably the compositions of the present invention have an absence of recycled glass particles. Preferably the compositions of the present invention have an absence of glass particles.

The sand used in this invention preferably meet the standard specifications of the ASTM C33-13 standard. Preferably the sand has a mean particle size of 0.1 mm to about 3 mm. More preferably the sand has a mean particle size of 0.2 mm to about 2 mm. Most preferably the sand has a mean particle size about 0.3 to about 1 mm. Examples of preferable fine sand used in this invention include QUIKRETE FINE No. 1961 and UNIMIN 5030 having a predominant size range of US sieve number #70-#30 (0.2-0.6 mm). The fine aggregate used in this invention meets the ASTM C33-13 standard.

Inorganic mineral fillers such as ground clay, shale, slate, mica and talc may also be used in the present invention.

Lightweight fillers have a specific gravity of less than about 1.5, preferably less than about 1, more preferably less than about 0.75, and still more preferably less than about 0.5. In some other preferred compositions of the invention the specific gravity of lightweight fillers is less than about 0.3, more preferably less than about 0.2 and most preferably less than about 0.1. In contrast, inorganic mineral fillers preferably have a specific gravity above about 2.0. Examples of useful lightweight fillers include pumice, vermiculite, expanded forms of clay, shale, slate and perlite, scoria, expanded slag, cinders, glass microspheres, synthetic ceramic microspheres, hollow ceramic microspheres, lightweight polystyrene beads, plastic hollow microspheres, expanded plastic beads, and the like. Expanded plastic beads and hollow plastic spheres when used in the compositions of the invention are employed in very small quantity on a weight basis owing to their extremely low specific gravity. When lightweight fillers are utilized to reduce the weight of the material, they may be employed at lightweight filler to cementitious materials (cementitious reactive powder) weight ratio of about 0:1 to about 2:1, preferably about 0.01:1 to about 1:1, preferably about 0.02:1 to about 0.75:1. One or more types of lightweight fillers may be employed in the compositions of the invention.

Coarse aggregates can also be added to the compositions of this invention. Coarse aggregate is defined as an inorganic rock material with an average particle size at least 4.75 mm (0.195 inches), for example ¼" to 1-½ in." (0.64 to 3.81 cm). Aggregate with size larger than 1-½" (3.81 cm) may also be used in some applications for example concrete pavement. The particle shape and texture of the coarse aggregate used can be angular, rough-textured, elongated, rounded or smooth or a combination of these. Preferably coarse aggregate are made of minerals such as granite, basalt, quartz, riolite, andesite, tuff, pumice, limestone, dolomite, sandstone, marble, chert, flint, greywacke, slate, and/or gneiss.

If desired compositions of the invention may contain only sand as the added filler. If desired the invention contains sand and inorganic mineral fillers and/or lightweight filler as the added fillers. If desired the invention utilizes inorganic mineral filler and lightweight fillers as the added fillers. If desired the invention incorporates sand, inorganic mineral filler and lightweight filler as added fillers. If desired the invention contains only inorganic mineral fillers or lightweight fillers and no sand, fine aggregate or coarse aggregate. Compositions of the invention containing coarse aggregate, in addition, may include or exclude one of more of the following fillers—sand, lightweight filler, and inorganic mineral filler. Yet other compositions are substantially free of any added fillers.

Generally compositions of the present invention comprise the filler at a weight ratio to the hydraulic cement-based reactive powder equal to 0:1 to 5.0:1; preferably the weight ratio of the filler to the hydraulic cement-based reactive powder equals 0.5:1 to 3.5:1; more preferably the weight ratio of the filler to the hydraulic cement-based reactive powder equals 1.0:1 to 2.5:1.

Organic Rheology Modifier

The Organic Rheology Modifiers are bio-polymers or Organic Rheology Control Agents from synthetic sources. Some Organic Rheology Modifiers also act as particle suspension agents in aqueous systems.

Generally compositions of the present invention comprise the Organic Rheology Modifier in an amount equal to 0.02 to 1 wt. % of the hydraulic cement-based reactive powder; preferably the Organic Rheology Modifier in an amount equal to 0.04 to 0.75 wt. % of the hydraulic cement-based reactive powder; more preferably the Organic Rheology Modifier in an amount equal to 0.06 to 0.50 wt. % of the hydraulic cement-based reactive powder.

Bio-polymers

Some of these biopolymers are also known as Thickeners or Viscosity Modifiers. Some, such as methyl cellulose also function as an emulsifier. Naturally occurring biopolymers comprise polysaccharide or amino acid building blocks, and are generally water-soluble. Common examples are starch, cellulose, alginate, egg yolk, agar, arrowroot, carrageenan, collagen, gelatin, guar gum, pectin and xanthan gum. Preferred Bio-polymers include cellulosic ethers and gum-based organic polymers.

Succinoglycans, diutan gum, guar gum, wellan gum, xanthan gums and cellulose ether based organic compounds, are bio-polymers that act as hydrocolloids and rheology control agents. Gum based polymers are selected from the group consisting of galactomannan gums, glucomannan gums, guar gum, locust bean gum, cara gum, hydroxyethyl guar, hydroxypropyl guar, cellulose, hydroxypropyl cellulose, hydroxymethyl cellulose, hydroxyethyl cellulose, and combinations thereof.

Examples of preferred cellulose based organic polymers useful for rheology control in the compositions of the present invention include hydroxyethyl-cellulose (HEC), hydroxypropyl-cellulose (HPC), hydroxypropylmethyl-cellulose (HPMC), methyl-cellulose (MC), ethyl-cellulose (EC), methylethyl-cellulose (MEC), carboxymethyl-cellulose (CMC), carboxymethylethyl-cellulose (CMEC), and carboxymethylhydroxyethyl-cellulose (CMHEC).

The biopolymers mentioned above are typically soluble both in cold and/or hot water. These additives also act as water retention agents and thereby minimize material segregation and bleeding in addition to controlling the material rheology.

Organic Rheology Control Agents

As opposed to biopolymers which may be able to control or modify rheology, for purposes of the present specification, Organic Rheology Control Agents are defined as those coming from synthetic sources. Some of these Organic Rheology Control Agents are also known as Thickeners. Acrylic-based polymers for Organic Rheology Control Agents are grouped into three general classes: alkali-swellable (or soluble) emulsions (ASE's), hydrophobically modified alkali-swellable emulsions (HASE's), and hydrophobically modified, ethoxylated urethane resins (HEUR's). HASE polymers are modifications of ASE polymers following an addition of hydrophobic functional groups. These are commonly known as associative thickeners. In its simplest form, an associative thickener is a water-soluble polymer containing several relatively hydrophobic groups. HEUR polymers also belong to the category of associative thickeners. But unlike HASE's, HEUR's are nonionic substances and are not dependent on alkali for activation of the thickening mechanism.

For example, ACULYN 22 rheology modifier is an anionic hydrophobically modified alkali-soluble acrylic polymer emulsion (HASE) available from Dow Chemical. HASE polymers are synthesized from an acid/acrylate copolymer backbone and a monomer that connects the hydrophobic groups as side chains. The polymer is made through emulsion polymerization. ACULYN 22 is synthesized from acrylic acid, acrylate esters and a steareth-20 methacrylate ester.

Both associative and non-associative types of organic rheology control agents and thickeners can be usefully employed in the compositions of the invention.

The organic rheology control agents and thickeners mentioned above are soluble both in cold and/or hot water. These additives also act as water retention agents and thereby minimize material segregation and bleeding in addition to controlling the material rheology.

Organic Film-forming Polymer Additives

Organic film forming polymers are polymers which produce a physical, continuous and flexible film. They are available as polymer dispersions or as redispersible powders. Preferred film forming polymer dispersions are latex dispersions. Preferred film forming redispersible polymer powders are latex powders. These polymer powders are water-redispersible and produced by spray-drying of aqueous polymer dispersions (latex). The polymer powders are typically made by spray drying latex dispersions (emulsions). In the field, film forming redispersible polymer powders are preferred for ease of use.

Latex is an emulsion polymer. Latex is a water based polymer dispersion, widely used in industrial applications. Latex is a stable dispersion (colloidal emulsion) of polymer microparticles in an aqueous medium. Thus, it is a suspension/dispersion of rubber or plastic polymer microparticles in water. Latexes may be natural or synthetic.

The latex is preferably made from a pure acrylic, a styrene rubber, a styrene butadiene rubber, a styrene acrylic, a vinyl acrylic or an acrylated ethylene vinyl acetate copolymer, and is more preferably a pure acrylic. Preferably latex polymer is derived from at least one acrylic monomer selected from the group consisting of acrylic acid, acrylic acid esters, methacrylic acid, and methacrylic acid esters. For example, the monomers preferably employed in emulsion polymerization include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g., vinyl versatate, acrylonitrile, acrylamide, butadiene, ethylene, vinyl chloride and the like, and mixtures thereof. For example, a latex polymer can be a butyl acrylate/methyl methacrylate copolymer or a 2-ethylhexyl acrylate/methyl methacrylate copolymer. Preferably, the latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

Vinyl acetate ethylene (VAE) emulsions are based on the copolymerization of vinyl acetate and ethylene, in which the vinyl acetate content can range between 60 and 95 percent, and the ethylene content ranges between 5 and 40 percent of the total formulation. This product should not be confused with the ethylene vinyl acetate (EVA) copolymers, in which the vinyl acetate generally ranges in composition from 10 to 40 percent, and ethylene can vary between 60 and 90 percent of the formulation. VAEs are water-based emulsions and these emulsions can be dried to form redispersible powders, whereas EVAs are solid materials used for hot-melt and plastic molding applications.

The film-forming polymer can be chosen from dispersions of polymer particles which may include: (meth)acrylics; vinyls; oil-modified polymers; polyesters; polyurethanes; polyamides; chlorinated polyolefins; and, mixtures or copolymers thereof, for example, vinyl acetate ethylene. Further, the polymers should typically have a glass transition temperature (Tg) of from −40° to 70° C. The Tg of a polymer is most commonly determined by differential scanning calorimetry (DSC). The Tg is the temperature at which there is a sudden increase in the specific heat (Cp). This is manifested by a shift in the baseline of the DSC curve. The International Confederation of Thermal Analysis proposes an evaluation procedure to be used to determine the Tg. According to this procedure two regression lines R1 and R2 are applied to the DSC curve: the regression line before the event (R1) and the regression line at the inflection point (R2). These two lines define the glass transition temperature (Tg) as the intersection between R1 and R2. It should be noted that the values for the Tg obtained by DSC are dependent on the heating rate chosen during the experiment. Generally the heating rate used by DSC measurements is 5° C./min.

As preferred polymers may be mentioned: i) pure acrylate copolymers obtainable as the polymerization product of a plurality of acrylic monomers such as (meth)acrylic acid, (meth)acrylic monomers containing a hydroxyl group, (meth)acrylic acid esters and (meth)acrylonitrile; ii) styrene-acrylate copolymers obtainable as the polymerization product of a monomer mixture comprising styrene and/or substituted styrene in an amount of up to 100 wt. %, preferably of from 30 to 90 wt. % and more preferably of from 40 to 80 wt. %, based on total monomers, and one or more acrylic monomers; and, such as (meth)acrylic acid, (meth)acrylic monomers containing a hydroxyl group, (meth)acrylic acid esters and (meth)acrylonitrile; and, iii) ethylene vinyl acetate copolymers obtainable as the polymerization product of vinyl acetate, ethylene, and optionally other co-monomers.

The polymers can be prepared and used in bulk, powdered form: such powders would be re-dispersed in the water during the formation of the second component. ACRONAL S 430 P and ACRONAL S 695 P (BASF Aktiengesellschaft) are examples of a suitable commercial, re-dispersible styrene-acrylate copolymer powder.

In the alternative the polymers are directly provided as a dispersion in the water based medium, which dispersion is then mixed with additional water and other additives. Such dispersions may be provided using known commercial products such as: STYROPOR P555 (styrene homopolymer available from BASF Aktiengesellschaft); for styrene butadiene copolymers, LIPATON SB 3040, LIPATON SB 2740 (Polymer Latex GmbH), STYROLUX 684 D (BASF Aktiengesellschaft) and, SYNTHOMER 20W20 (Synthomer Chemie); SYNTHOMER VL 10286 and SYNTHOMER 9024 (styrene/butadiene/acrylonitrile terpolymer, Synthomer Chemie); for styrene acrylate copolymers, ALBERDINGK H 595, ALBERDINGK AS 6002 (both Alberdingk Boley), RHODOPAS DS 913 (Rhodia, now Solvay), ACRONAL 290D, ACRONAL S 400, ACRONAL DS 5011 (BASF Aktiengesellschaft), VINNAPAS SAF 54 (Wacker Polymer Systems), MOWILITH LDM 6159 (Celanese) and LIPATON AE 4620 (Polymer Latex GmBH); and, B60A (pure acrylate dispersion available from Rohm & Haas). Other exemplary commercially available latex polymers include: AIRFLEX EF811 (available from Air Products); EPS 2505 (available from EPS/CCA); and, NEOCAR 2300, NEOCAR 820 and NEOCAR 2535 (available from Dow Chemical Co.).

Alternatively, the aqueous dispersions may be provided by polymerizing appropriate monomer mixtures as described by P. A. Lovell, M. S. El-Aasser (Editors), "Emulsion Polymerization and Emulsion Polymers", John Wiley and Sons, Chichester, UK, 1997 is herein incorporated by reference. The monomer mixture should generally comprise at least one unsaturated monomer selected from the group consisting of: (meth)acrylonitrile; alkyl (meth)acrylate esters; (meth)acrylic acids; vinyl esters; and, vinyl monomers.

Suitable alkyl esters of acrylic acid and methacrylic acid are those derived from C1 to C14 alcohols and thereby include as non-limiting examples: methyl (meth)acrylate; ethyl (meth)acrylate; isopropyl (meth)acrylate; butyl (meth) acrylate; isobutyl (meth)acrylate; n-pentyl (meth)acrylate; neopentyl (meth)acrylate; cyclohexyl (meth)acrylate; 2-hexyl (meth)acrylate; 2-ethylhexyl (meth)acrylate; isobornyl (meth)acrylate; 2-hydroxyethyl (meth)acrylate, 3-hydroxypropyl (meth)acrylate, 4-hydroxybutyl (meth)acrylate, and epsilon-caprolactone adducts thereof; and, di(meth) acrylate esters of alkane diols such as 1,6-hexane diol diacrylate.

Suitable vinyl esters include vinyl acetate, vinyl propionate, vinyl versatate and vinyl laurate. Suitable vinyl comonomers include: ethylene; propene; butene; iso-butene; 1,3-butadiene; isoprene; styrene; alpha-methyl styrene; t-butyl styrene; vinyl toluene; divinyl benzene; heterocyclic vinyl compounds; and, vinyl halides such as chloroprene. Preferably the vinyl comonomers include ethylene, styrene, butadiene and isoprene.

The monomer mixture may comprise a carbonyl monomer that is a mono-olefinically unsaturated monomer having an aldehyde group or a ketone group. The mono-olefinic unsaturation in the carbonyl monomers of this invention is typically provided by (meth)acrylate, (meth)acrylamide, styryl or vinyl functionalities. Preferably the carbonyl monomer is selected from the group consisting of: acrolein;

methacrolein; vinyl methyl ketone; vinyl ethyl ketone; vinyl isobutyl ketone; vinyl amyl ketone; acetoacetoxy esters of hydroxyalkyl (meth)acrylates; diacetoneacrylamide (DAAM); diacetone(meth)acrylamide; formylstyrol; diacetone (meth)acrylate; acetonyl acrylate; 2-hydroxypropyl acrylate-acetyl acetate; 1,4-butanediol acrylate acetylacetate; and, mixtures thereof.

Examples of suitable film forming homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styrene-acrylic ester copolymers, styrene-1,3-butadiene copolymers. Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having from 1 to 15 carbon atoms in the carboxylic acid radical, e.g. vinyl propionate, vinyl laurate, vinyl esters of alpha-branched carboxylic acids having from 9 to 13 carbon atoms; copolymers of vinyl acetate, from 1 to 40% by weight of ethylene and preferably 1 to 60% by weight of acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or the vinyl ester of an alpha-branched carboxylic acid having from 9 to 13 carbon atoms, and from 1 to 30% by weight of acrylic esters of unbranched or branched alcohols having from 1 to 15 carbon atoms, in particular n-butyl acrylate or 2-ethylhexyl acrylate, and further comprising from 1 to 40% by weight of ethylene; copolymers comprising vinyl acetate, from 1 to 40% by weight of ethylene and from 1 to 60% by weight of vinyl chloride; where the polymers may further comprise the above-mentioned auxiliary monomers in the amounts specified and the percentages by weight in each case add up to 100% by weight.

Generally compositions of the present invention comprise the organic film forming polymer in an amount equal to 0 to 15.0 wt. % of the hydraulic cement-based reactive powder; preferably the organic film forming polymer in an amount equal to 0 to 10.00 wt. % of the hydraulic cement-based reactive powder; more preferably the organic film forming polymer in an amount equal to 0 to 5.00 wt. % of the hydraulic cement-based reactive powder.

Inorganic Viscosity Enhancing Agents

The cementitious compositions of the invention may optionally include inorganic rheology enhancing agents belonging to the family of phyllosilicates. Examples of useful inorganic rheology enhancing agents may include palygorskite, sepiolite, smectites, kaolinites, and illite. Particularly useful smectite clays are hectorite, saponite, and montmorillonite. Different varieties of bentonite clays both natural and chemically treated may also be used to control rheology of those compositions. Such additives also act as water retention agents and thereby minimize material segregation and bleeding. The inorganic rheology enhancing agents may be added in the absence of or in combination with the Organic Rheology Modifier.

Generally compositions of the present invention comprise the inorganic viscosity enhancing agent in an amount equal to 0 to 1 wt. % of the hydraulic cement-based reactive powder; preferably the inorganic viscosity enhancing agent in an amount equal to 0 to 0.75 wt. % of the hydraulic cement-based reactive powder; most preferably the inorganic viscosity enhancing agent in an amount equal to 0 to 0.50 wt. % of the hydraulic cement-based reactive powder.

Air Entraining Agent

Air entraining agents (also known as foaming agents) may be added to the cementitious slurry of the invention to form air bubbles (foam) in situ. Air entraining agents are preferably surfactants used to purposely trap microscopic air bubbles in the concrete. Alternatively, air entraining agents are employed to externally produce foam which is introduced into the mixtures of the compositions of the invention during the mixing operation to reduce the density of the product. Preferably to externally produce foam the air entraining agent (also known as a liquid foaming agent), air and water are mixed to form foam in a suitable foam generating apparatus. A foam stabilizing agent such as polyvinyl alcohol can be added to the foam before the foam is added to the cementitious slurry.

Examples of air entraining/foaming agents include alkyl sulfonates, alkylbenzol sulfonates and alkyl ether sulfate oligomers among others. Details of the general formula for these foaming agents can be found in U.S. Pat. No. 5,643, 510 incorporated herein by reference.

An air entraining agent (foaming agent) such as that conforming to standards as set forth in ASTM C260-10a (2010) "Standard Specification for Air-Entraining Admixtures for Concrete" can be employed. Such air entraining agents are well known to those skilled in the art and are described in the Kosmatka et al, "Design and Control of Concrete Mixtures," Fourteenth Edition, Portland Cement Association, specifically Chapter 8 entitled, "Air Entrained Concrete," (cited in US Patent Application Publication No. 2007/0079733 A1).

Suitable air entraining (foaming) agents include water soluble salts (usually sodium) of wood resin, vinsol resin, wood rosin, tall oil rosin, or gum rosin; non-ionic surfactants (e.g., such as those commercially available from BASF under the trade name TRITON X-100); sulfonated hydrocarbons; proteinaceous materials; or fatty acids (e.g., tall oil fatty acid) and their esters.

Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents (surfactants), sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzene-sulfonates), alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Generally the present invention compositions comprise the air entraining agent in an amount equal to 0 to 1.0 wt. % of the hydraulic cement-based reactive powder; preferably the air entraining agent in an amount equal to 0 to 0.50 wt. % of the hydraulic cement-based reactive powder; more preferably the air entraining agent in an amount equal to 0 to 0.25 wt. % of the hydraulic cement-based reactive powder, most preferably 0-0.2 wt. %.

Air-entraining agent when present is in an amount of 0.01 to 1, preferably 0.01-0.5, more preferably 0.01-0.25, most preferably 0.05-0.2 weight % based upon the total weight of the hydraulic cement-based reactive powder.

Defoaming Agents

Defoaming agents can be added to the cementitious compositions of the invention to reduce the amount of entrapped air, increase material strength, increase material bond strength to other substrates, and to produce a defect free surface in applications where surface aesthetics is an important criteria. Examples of suitable defoaming agents useful in the compositions of the invention include polyethylene oxides, propoxylated amines, polyetheramine, polyethylene glycol, polypropylene glycol, alkoxylates, polyalkoxylate, fatty alcohol alkoxylates, hydrophobic esters, tributyl phosphate, alkyl polyacrylates, silanes, silicones, polysiloxanes, polyether siloxanes, acetylenic diols, tetramethyl decynediol, secondary alcohol ethoxylates, silicone oil, hydrophobic silica, oils (mineral oil, vegetable oil, white oil), waxes (paraffin waxes, ester waxes, fatty alcohol waxes), amides, fatty acids, polyether derivatives of fatty acids, etc., and mixtures thereof.

Generally compositions of the present invention comprise the defoamer in an amount equal to 0 to 2.0 wt. % of the hydraulic cement-based reactive powder; preferably defoamer in an amount equal to 0.25 to 1.50 wt. % of the hydraulic cement-based reactive powder; more preferably defoamer in an amount equal to 0.50 to 1.00 wt. % of the hydraulic cement-based reactive powder.

Set Retarders

Organic compounds such as hydroxylated carboxylic acids, carbohydrates, sugars, and starches are the preferred retarders of some compositions of the present invention. Organic acids such as citric acid, tartaric acid, malic acid, gluconic acid, succinic acid, glycolic acid, malonic acid, butyric acid, malic acid, fumaric acid, formic acid, glutamic acid, pentanoic acid, glutaric acid, gluconic acid, tartronic acid, mucic acid, tridydroxy benzoic acid, etc. are useful as set retarders in the dimensionally stable cementitious binder compositions of the invention.

Sodium gluconate also is useful as organic set retarder in compositions of the present invention. Cellulose based organic polymers such as hydroxyethyl-cellulose (HEC), hydroxypropyl-cellulose (HPC), hydroxypropylmethyl-cellulose (HPMC), ethyl-cellulose (EC), methylethyl-cellulose (MEC), carboxymethyl-cellulose (CMC), carboxymethylethyl-cellulose (CMEC), carboxymethylhydroxyethyl-cellulose (CMHEC) are additional useful retarders in some of the compositions of the present invention.

These cellulose based retarders when added to the composition of the invention significantly increase the viscosity of the mix in addition to causing retardation. Preferably, inorganic acid based retarders such as borates or boric acid are not employed or not employed in significant amounts because they hinder mix rheology, cause excessive efflorescence, and reduce material bond strength to other substrates.

Generally compositions of the present invention comprise the set retarding agent in an amount equal to 0 to 2.0 wt. % of the hydraulic cement-based reactive powder; preferably the set retarding agent in an amount equal to 0.10 to 1.50 wt. % of the hydraulic cement-based reactive powder; most preferably the set retarding agent in an amount equal to 0.20 to 1.00 wt. % of the hydraulic cement-based reactive powder.

Superplasticizers

Water reducing agents (superplasticizers), are preferably used in compositions of the invention. They may be added in the dry form or in the form of a solution. Superplasticizers can help to reduce water demand of the mixture. Examples of superplasticizers include polynaphthalene sulfonates, polyacrylates, polycarboxylates, polyether polycarboxylates, lignosulfonates, melamine sulfonates, caesins, and the like. Depending upon the type of superplasticizer used, the weight ratio of the superplasticizer (on dry powder basis) to the hydraulic cement-based reactive powder blend preferably will be 5 wt. % or less, preferably 2 wt. % or less, preferably about 0.1 to about 1 wt. %.

Superplasticizers based on polycarboxylate polyether chemistry are the most preferred water reducing chemical admixture for compositions of the invention. Polycarboxylate polyether superplasticizers are the most preferred since they facilitate accomplishment of the various objectives of this invention as mentioned earlier.

Generally compositions of the present invention comprise the superplasticizer in an amount equal to 0.3 to 3.5 wt. % of the hydraulic cement-based reactive powder; preferably superplasticizer in an amount equal to 0.40 to 2.50 wt. % of the hydraulic cement-based reactive powder; most preferably superplasticizer in an amount equal to 0.50 to 1.50 wt. % of the hydraulic cement-based reactive powder Optional Materials Other optional materials and additives may be included in compositions of the invention. These include at least one member selected from the group consisting of corrosion control agents, wetting agents, efflorescence control agents, discrete fibers, long and continuous fibers and reinforcement, textile reinforcement, polyvinyl alcohol fibers, glass fibers, and/or other discrete reinforcing fibers.

As efflorescence control agents, water repelling agents such as silanes, silicones, siloxanes, stearates can be added to the cementitious compositions of the invention to reduce efflorescence potential of the material. Selected examples of useful efflorescence suppression agents include octyltriethoxy silane, potassium methyl siliconate, calcium stearate, butyl stearate, polymer stearates. These efflorescence control agents reduce the transport of the water within the hardened material and thereby minimize migration of salts and other soluble chemicals that can potentially cause efflorescence. Excessive efflorescence can lead to poor aesthetics, material disruption and damage from expansive reactions occurring due to salt accumulation and salt hydration, and reduction in bond strength with other substrates and surface coatings.

Discrete reinforcing fibers of different types may also be included in the compositions of the invention. Scrims made of materials such as polymer-coated glass fibers and polymeric materials such as polypropylene, polyethylene and nylon can be used to reinforce cement-based precast products depending upon their function and application.

There may also be an absence of one or more of these optional materials.

Color Pigment

Any color pigment know in the cement art may be employed. Both inorganic and organic color pigments may be utilized in the compositions of present invention. Typical color pigments are include titanium dioxide, and/or black iron oxide ($Fe_3O_4$), chromium oxide, zinc oxide, zinc ferrite, and carbon black.

Generally compositions of the present invention comprise the color pigment in an amount equal to 0 to 8.0 wt. % of the hydraulic cement-based reactive powder; preferably the color pigment in an amount equal to 0 to 6.00 wt. % of the hydraulic cement-based reactive powder; most preferably the color pigment in an amount equal to 0 to 4.00 wt. % of the hydraulic cement-based reactive powder. There may also be an absence of pigment.

Initial Slurry Temperature

In some compositions of the present invention, it is preferred to form the slurry under conditions which provide a reduced initial binder mixture slurry temperature and more importantly, slower gelation and final setting times of from about 10 to about 240 minutes, more preferably about 60 to about 120 minutes and most preferably about 30 to about 60 minutes. A lower initial slurry temperature, allows for more controlled working time for commercial use of the binder compositions. The initial slurry temperature is preferably about room temperature.

The "initial temperature" is defined as the temperature of the overall mixture during the first minute after the cementitious reactive powder, and water are first all present in the mixture. Of course, the temperature of the overall mixture can vary during this first minute but, in order to achieve a preferred thermal stability, it will remain within an initial temperature range of about 0 to about 50° C., more preferably an initial temperature range of about 10 to about 35° C., even more preferably an initial temperature range of about 15 to about 25° C., preferably ambient temperature.

EXAMPLES

In the examples herein, as mentioned above, percentages of compositions or product formulae are in weight percentages, unless otherwise expressly stated. The reported measurements also in approximate amounts unless expressly stated, e.g. approximate percentages, weights, temperatures, distances or other properties.

The sulfoaluminate cement used in the examples is FASTROCK 500, available from CTS Cement Company. FASTROCK 500 calcium sulfoaluminate cement is employed as a component of cementitious reactive powder. FASTROCK 500 has an average particle size of about 5 microns with 95% of particles finer than about 25 microns. The measured Blaine fineness of FASTROCK 500 was about 6780 cm$^2$/g. The oxide composition of FASTROCK 500 was analyzed and is shown in TABLE A:

TABLE A

| Oxide | Weight % in FASTROCK 500 | Weight % in Class C fly Ash |
| --- | --- | --- |
| CaO | 43.78 | 24.14 |
| SiO$_2$ | 14.02 | 36.90 |
| Al$_2$O$_3$ | 25.23 | 20.12 |
| Fe$_2$O$_3$ | 1.05 | 5.96 |
| SO$_3$ | 8.67 | 1.19 |
| MgO | 3.23 | 5.44 |
| Na$_2$O | 1.81 | 1.73 |
| K$_2$O | 0.32 | 0.52 |
| TiO$_2$ | 0.76 | 1.42 |
| P$_2$O$_5$ | | 1.18 |
| Loss on Ignition | 1.58 | 0.52 |

The main phases present in the FASTROCK 500 calcium sulfoaluminate cement employed in the examples include $C_4A_3\bar{S}$, $C_2S$, $C_4AF$, and $C\bar{S}$.

In all the examples, unless otherwise indicated, the fly ash is Class C Fly Ash from Campbell Power Plant, West Olive, Mich. This fly ash has an average particle size of about 4 microns. The measured Blaine fineness of the fly ash is about 4300 cm$^2$/g. The oxide composition of the Class C fly ash employed in these examples is shown in TABLE A.

Unless otherwise indicated, the calcium aluminate cement used in some of the examples is TERNAL EV, available from Kerneos Inc. The primary calcium aluminate phase in TERNAL EV is $C_{12}A_7$. The other phases in TERNAL EV include CA, $C_3A$, $C_4AF$, and $C_2S$. The typical primary oxide composition of TERNAL EV is as follows: CaO—47.5 to 50.5 wt. %, Al$_2$O$_3$—33.5 to 37.5 wt. %, SiO$_2$—3.5 to 6.0 wt. %, and Fe$_2$O$_3$—6.5 to 9.0 wt. %. The typical fineness of TERNAL EV is as follows: particles finer than 2.6 microns are less than 10 wt. % and particles coarser than 90 microns are less than 4 wt. %.

Unless otherwise stated, the Portland cement used in some of the examples was ST MARYS PORTLAND CEMENT TYPE III from St Marys Cement. The typical oxide composition of this Portland cement is as follows: CaO—61.7 wt. %, SiO$_2$—19.9 wt. %, Al$_2$O$_3$—4.9 wt. %, Fe$_2$O$_3$—2.87 wt. %, MgO—3.7%, SO$_3$—3.49 wt. %, K$_2$O—1.21 wt. %, Na$_2$O—0.18 wt. %, TiO$_2$—0.27 wt. %, Free Lime—1.1 wt. %, and Loss on Ignition—1.7 wt. %. The Blaine Fineness of the cement was 640 m$^2$/kg.

Unless otherwise indicated, the calcium carbonate used in some of the examples is KISH KR-2 ground calcium carbonate available from KISH Company. The typical primary oxide composition of KISH KR-2 is CaCO$_3$—98.5 wt. %, MgCO$_3$—0.6 wt. %, SiO$_2$—0.6 wt. %, Al$_2$O$_3$—0.05 wt. %, Fe$_2$O$_3$, 0.04 wt. %. The typical particle size of KISH KR-2 ground calcium carbonate is as follows: particles finer than 250 microns are less than 99.5 wt. %, particles finer than 150 microns are less than 95 wt. %, particles finer than 75 microns are less than 75 wt. %, and particles finer than 45 microns are less than 60 wt. %. The median particle size of KISH KR-2 ground calcium carbonate is between 25 to 35 microns.

The calcium sulfate hemihydrate included in a number of the examples is USG HYDROCAL C-Base brand calcium sulfate hemihydrate available from the United States Gypsum Company. HYDROCAL C-Base is an alpha morphological form of calcium sulfate hemihydrate having blocky crystal microstructure and low water demand. The USG HYDROCAL C-Base has an average particle size of about 17 microns.

The fine-grained calcium sulfate dihydrate included in a number of the examples is USG TERRA ALBA F&P brand from the United States Gypsum Company. The USG TERRA ALBA F&P filler is a high-purity calcium sulfate dihydrate with an average particle size of about 13 microns.

The anhydrous calcium sulfate used in some of the examples is USG SNOW WHITE filler from the United States Gypsum Company. The USG SNOW WHITE filler is an insoluble form of calcium sulfate anhydrite produced by high temperature thermal treatment of calcium sulfate, preferably gypsum. It has a very low level of chemically combined moisture, preferably around 0.35%. The average particle size of the USG SNOW WHITE filler is about 7 microns.

The UNIMIN GRANUSIL 5030 Sand included in the examples has a particle size as shown in TABLE B:

TABLE B

| Sieve Size | Percent Passing (%) UNIMIN GRANUSIL 5030 Sand |
| --- | --- |
| 30 Mesh | |
| 40 Mesh | 100 |
| 50 Mesh | 73 |
| 70 Mesh | 22 |
| 100 Mesh | 4 |
| 140 Mesh | 0 |

BASF CASTAMENT FS 20 available from BASF is a dispersant which is a polymerization product based on polyethylene glycol by Construction Polymers Technical Data Sheet, CASTAMENT FS 20, BASF, October 2011 Rev 1. CASTAMENT FS 20 is a polycarboxylate ether. It is used in some of the examples as a superplasticizer.

MELFLUX 6681 F available from BASF is a free-flowing spray dried powder of a modified polycarboxylic ether. It is used in some of the examples as a superplasticizer.

MELFLUX 5581 F available from BASF is a free-flowing spray dried powder of a modified polycarboxylic ether. It is used in some of the examples as a superplasticizer.

AXILAT RH 100 XP is a succinoglycan hydro-colloid available from Momentive.

The color pigment when used in these examples was LANSCO 8330 Synthetic Black Iron Oxide from LANSCO COLORS.

STARVIS 3003 F is a powder based on a high-molecular weight synthetic copolymer from BASF. It is a high-performance viscosity enhancing agent for cementitious materials used as an Organic Rheology Modifier.

Unless otherwise indicated, the defoamer used in the examples was SURFYNOL 500S available from Evonik Corporation.

The time of initial setting and the time of final setting reported herein were measured using the ASTM C191-13 standard using the Vicat needles.

Compressive strength of materials as used herein is measured in accordance to the ASTM C109-13 test method by testing the 2 inch×2 inch×2 inch cubes to failure under compression. The cubes are demolded from the brass molds after hardening and cured in sealed plastic bags until the age of testing. The cubes are tested at the age of about 2-hours, 4-hours, about 24-hours, about 7-days and about 28-days after the cast. These cubes are tested in compression in the saturated condition immediately after taking them out of water and surface drying.

In the examples, slump testing to determine mix workability, was conducted using a 2 inch internal diameter×1 inch tall hollow plastic cylinder. The cylinder was placed on a horizontal smooth plastic plate and filled with slurry mixture obtained after material mixing. The top surface of the cylinder was screeded with a metal knife to obtain a flat surface. The cylinder was then lifted up allowing the slurry to come out from the bottom of the cylinder and spread out on the plastic plate to form a circular slurry patty. The diameter of the patty was then measured in two perpendicular directions and the average of the two readings was reported as the slump of the mixture.

Example 1

Compositions Free of Calcium Aluminate Cement and Portland Cement and Comprising Finer Grained Calcium Carbonate This example shows influence of particle size of calcium carbonate on fresh and hardened properties of aluminate cement compositions comprising calcium sulfoaluminate cement and calcium sulfate. TABLE 1.1 shows the two mixture compositions investigated in this example. Both mixture compositions were extended with calcium carbonate mineral filler, HUBERCARB M200, having a median particle size of 15 microns. Both compositions investigated were free of Portland cement. Lithium carbonate was added at a dosage of 0.20 wt. % of the cementitious reactive powder (Hydraulic Cement-Based Reactive Powder). Mix 1 was formulated with calcium sulfate dihydrate, while Mix 2 contained calcium sulfate hemihydrate. The superplasticizer used in both mixes was CASTAMENT FS20 from BASF.

TABLE 1.1

| Compositions investigated in Example 1 | | |
|---|---|---|
| Raw Material | Mix 1 | Mix 2 |
| Calcium Sulfoaluminate Cement, pbw | 66.7 | 66.7 |
| Calcium Aluminate Cement, pbw | 0.00 | 0.00 |
| Calcium Sulfate Dihydrate, pbw | 33.3 | 0.00 |
| Calcium Sulfate Hemihydrate, pbw | 0.00 | 33.3 |
| Portland Cement, pbw | 0.00 | 0.00 |
| Total Hydraulic Cement-Based Reactive Powder, pbw | 100 | 100 |
| Calcium Carbonate/Hydraulic Cement-Based Reactive Powder Wt. Ratio | 0.75 | 0.75 |
| Sand/Hydraulic Cement-Based Reactive Powder Wt. Ratio | 0.75 | 0.75 |
| Lithium Carbonate/Hydraulic Cement-Based Reactive Powder, wt. % | 0.20 | 0.20 |
| Citric Acid/Hydraulic Cement-Based Reactive Powder, wt. % | 0.50 | 0.50 |
| AXILAT RH100 XP/Hydraulic Cement-Based Reactive Powder, wt. % | 0.02 | 0.02 |
| Superplasticizer/Hydraulic Cement-Based Reactive Powder, wt. % | 0.50 | 0.50 |
| Defoamer/Hydraulic Cement-Based Reactive Powder, wt. % | 0.20 | 0.20 |
| Water/Hydraulic Cement-Based Powder Reactive Powder Wt. Ratio | 0.60 | 0.60 |

Slurry Slump and Setting Behavior

TABLE 1.2 shows slurry slump (demonstrating mix workability) and setting behavior of the two compositions investigated in Example 1. TABLE 1.2 shows the measured diameter of slump patties of this example. It can be observed the diameter of both patties was relatively small indicating that material was viscous and had poor workability and flow properties. It should be noted that materials with good workability and flow properties typically produce a slump patty with a diameter greater than 6 inches.

Figure 1A:
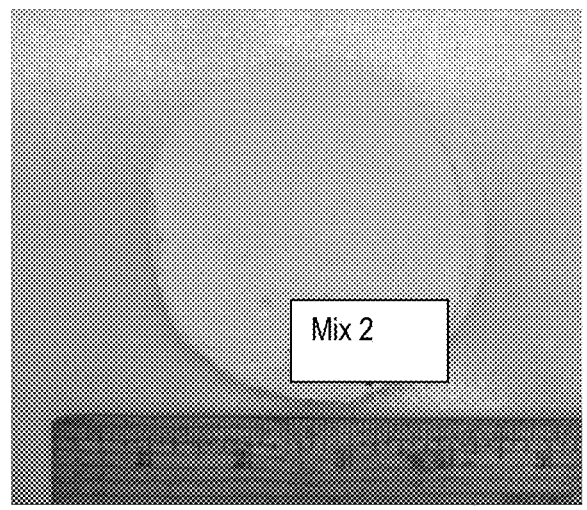
FIG. 1A shows a photograph of a slump patty for the Mix 2 composition investigated in Example 1.

FIGS. 1 and 1A show slump patties for the compositions investigated in Example 1. From the photographs of the slump patties it can be observed that both mixtures were quite viscous. Furthermore, the slump patty for Mix 1 developed significant cracking within the first few hours after it was poured.

TABLE 1.2

Workability (Slump - 2" Diameter × 1" tall cylinder) and Setting Time (Vicat)

| Mix # | Slump (inches) | Initial Set (mins) | Final Set (mins) |
|---|---|---|---|
| 1 | 4½" | 36 | 42 |
| 2 | 3⁷⁄₁₆" | 44 | 48 |

Self-Healing Behavior

Self-healing behavior of the two compositions was investigated using the ASTM C1708-13 standard. Both mixes displayed extremely poor self-healing behavior and failed at the very instant of initial pour.

Linear Movement

Figure 1B:
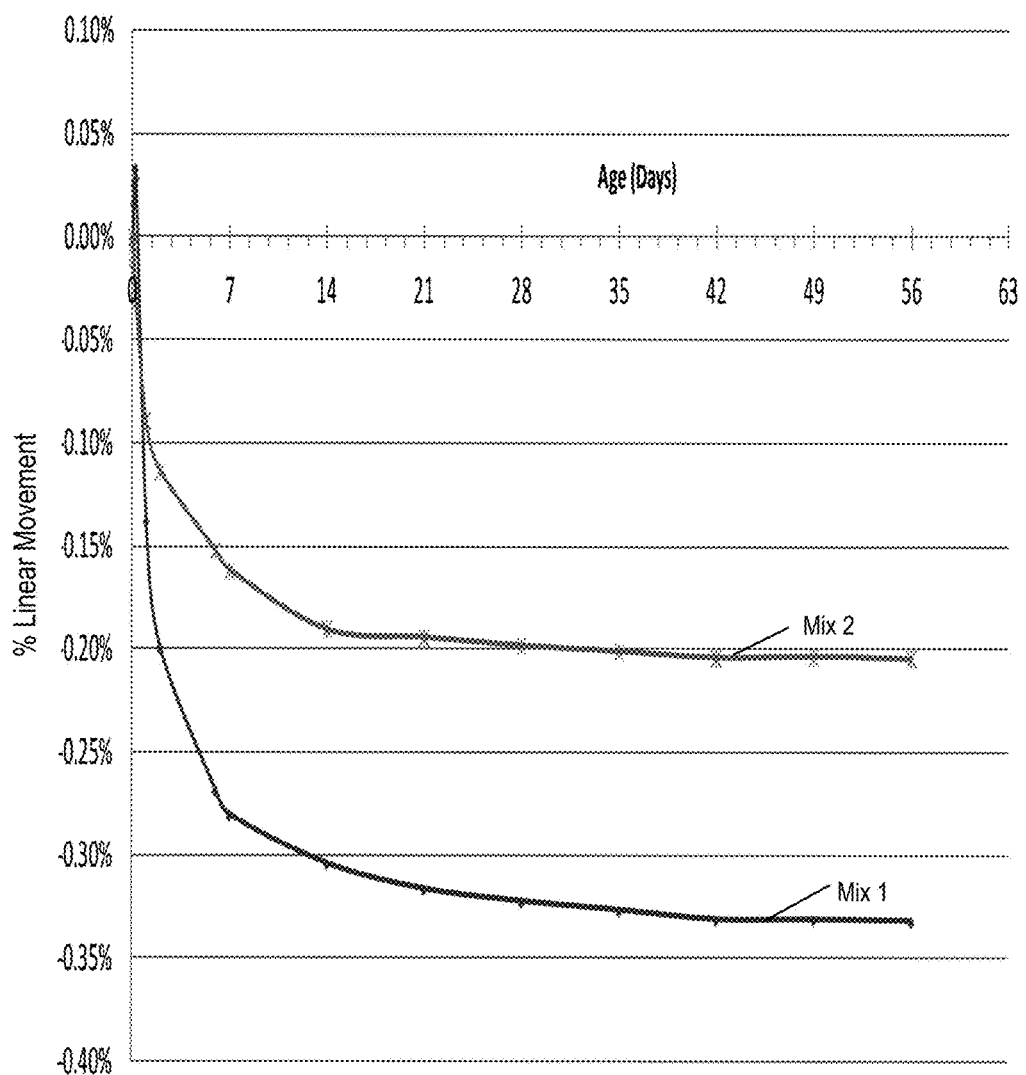
FIG. 1B shows the linear movement behavior (drying shrinkage) of compositions investigated in Example 1.

FIG. 1B shows the linear movement behavior of the compositions investigated in Example 1. The testing of linear movement behavior was conducted per ASTM C1708-13 with an exception that the prismatic samples were demolded at the time of initial set, wherein the initial specimen length measurement taken right after specimen demolding. The specimen length measurements were continued until the age of 56 days. This shows both compositions shrank very significantly over a span of 56 days. The ultimate shrinkage of Mix 1 was about 0.33% while the same for Mix was about 0.20%. This extent of shrinkage is not acceptable in practical applications, since it will lead to significant cracking and product failure.

Thus, absence of calcium aluminate cement and Portland cement in the formulation is detrimental.

Example 2

Influence of Portland Cement on Mixture Compositions Containing Calcium Sulfoaluminate Cement This example shows influence of Portland cement addition on fresh and hardened properties of aluminate cement compositions comprising calcium sulfoaluminate cement and calcium sulfate. TABLE 2.1 shows the mixture compositions investigated in this example. All mixture compositions were extended with fly ash. Lithium carbonate was added at small dosage rates of 0.31-0.33 wt. % of the hydraulic cement-based reactive powder. Mix 1 was free of Portland cement, while Mixes 2 through 4 contained increasing levels of Portland cement. None of the mixes contained calcium aluminate cement. The superplasticizer used in all four mixes was CASTAMENT FS20 from BASF.

TABLE 2.1

Compositions investigated in Example 2

| Raw Material | Mix 1 | Mix 2 | Mix 3 | Mix 4 |
|---|---|---|---|---|
| Calcium Sulfoaluminate Cement, pbw | 66.7 | 62.5 | 58.8 | 55.6 |
| Calcium Aluminate Cement, pbw | 0.00 | 0.00 | 0.00 | 0.00 |
| Calcium Sulfate Hemihydrate, pbw | 0.00 | 0.00 | 0.00 | 0.00 |
| Calcium Sulfate Dihydrate, pbw | 33.3 | 31.3 | 29.4 | 27.8 |
| Portland Cement, pbw | 0.00 | 6.3 | 11.8 | 16.7 |
| Total Hydraulic Cement-Based Reactive Powder, pbw | 100 | 100 | 100 | 100 |
| Fly Ash/Hydraulic Cement-Based Reactive Powder Wt. Ratio | 1.92 | 1.84 | 1.78 | 1.72 |
| Sand/Hydraulic Cement-Based Reactive Powder Wt. Ratio | 1.25 | 1.22 | 1.19 | 1.17 |
| Lithium Carbonate/Hydraulic Cement-Based Reactive Powder, wt. % | 0.33 | 0.33 | 0.32 | 0.31 |
| Citric Acid/Hydraulic Cement-Based Reactive Powder, wt. % | 0.25 | 0.24 | 0.24 | 0.23 |
| AXILAT RH100 XP/Hydraulic Cement-Based Reactive Powder, wt. % | 0.04 | 0.04 | 0.04 | 0.04 |
| Superplasticizer/Hydraulic Cement-Based Reactive Powder, wt. % | 0.83 | 0.81 | 0.79 | 0.78 |
| Defoamer/Hydraulic Cement-Based Reactive Powder, wt. % | 0.58 | 0.57 | 0.56 | 0.54 |
| Water/Hydraulic Cement-Based Powder Reactive Powder Wt. Ratio | 1.000 | 0.975 | 0.953 | 0.933 |

Slurry Slump and Setting Behavior

TABLE 2.2 shows slurry slump (demonstrating mix workability) and setting behavior of the compositions investigated in Example 2. TABLE 2.2 shows the measured diameter of slump patties of this example. It can be observed the measured slump of the mixes investigated in this example decreased with increase in Portland cement content. It should be noted that materials with good workability and flow properties typically produce a slump patty with a diameter greater than 6 inches. TABLE 2.2 also demonstrates that both initial and final setting times of the mixture compositions investigated in this example decreased with increase in Portland cement content.

TABLE 2.2

Workability (Slump - 2" Diameter × 1" tall cylinder) and Setting Time (Vicat)

| Mix # | Slump (inches) | Initial Set (mins) | Final Set (mins) |
|---|---|---|---|
| 1 | 7⁷⁄₁₆" | 40 | 52 |
| 2 | 6¹¹⁄₃₂" | 33 | 39 |

TABLE 2.2-continued

| | Workability (Slump - 2" Diameter × 1" tall cylinder) and Setting Time (Vicat) | | |
|---|---|---|---|
| Mix # | Slump (inches) | Initial Set (mins) | Final Set (mins) |
| 3 | 5⁵⁄₃₂" | 28 | 33 |
| 4 | 3⅝" | 26 | 29 |

Compressive Strength Behavior

Compressive strength when measured in this and other examples was measured according to ASTM C109-13. TABLE 2.3 shows the early age (4-hour) and ultimate (28-Day) compressive strength behavior of the cementitious compositions investigated in this example. The 4-hour compressive strength of the mixes investigated ranged between 1750 psi to 1950 psi. Similarly, the 28-Day compressive strength of the mixes investigated ranged between 4950 to 5650 psi. Both 4-hour compressive strength and 28-Day compressive strength increased with increase in Portland cement content.

TABLE 2.3

| | Compressive Strength (psi) | |
|---|---|---|
| Mix # | 4-Hour | 28-Day |
| 1 | 1764 | 4972 |
| 2 | 1882 | 5460 |
| 3 | 1871 | 5663 |
| 4 | 1921 | 5624 |

Self-Healing Behavior

Self-healing behavior of the compositions of this example was investigated using the ASTM C1708-13 standard. Mix 1 failed at 15 minutes, while Mixes 2 and 3 failed at 7.5 minutes from the start of material mixing. Mix 4 displayed extremely poor self-healing behavior and failed instantaneously at the time of material pour. These results demonstrate that the self-healing behavior diminishes with increase in Portland cement content.

Linear Movement

Figure 2:
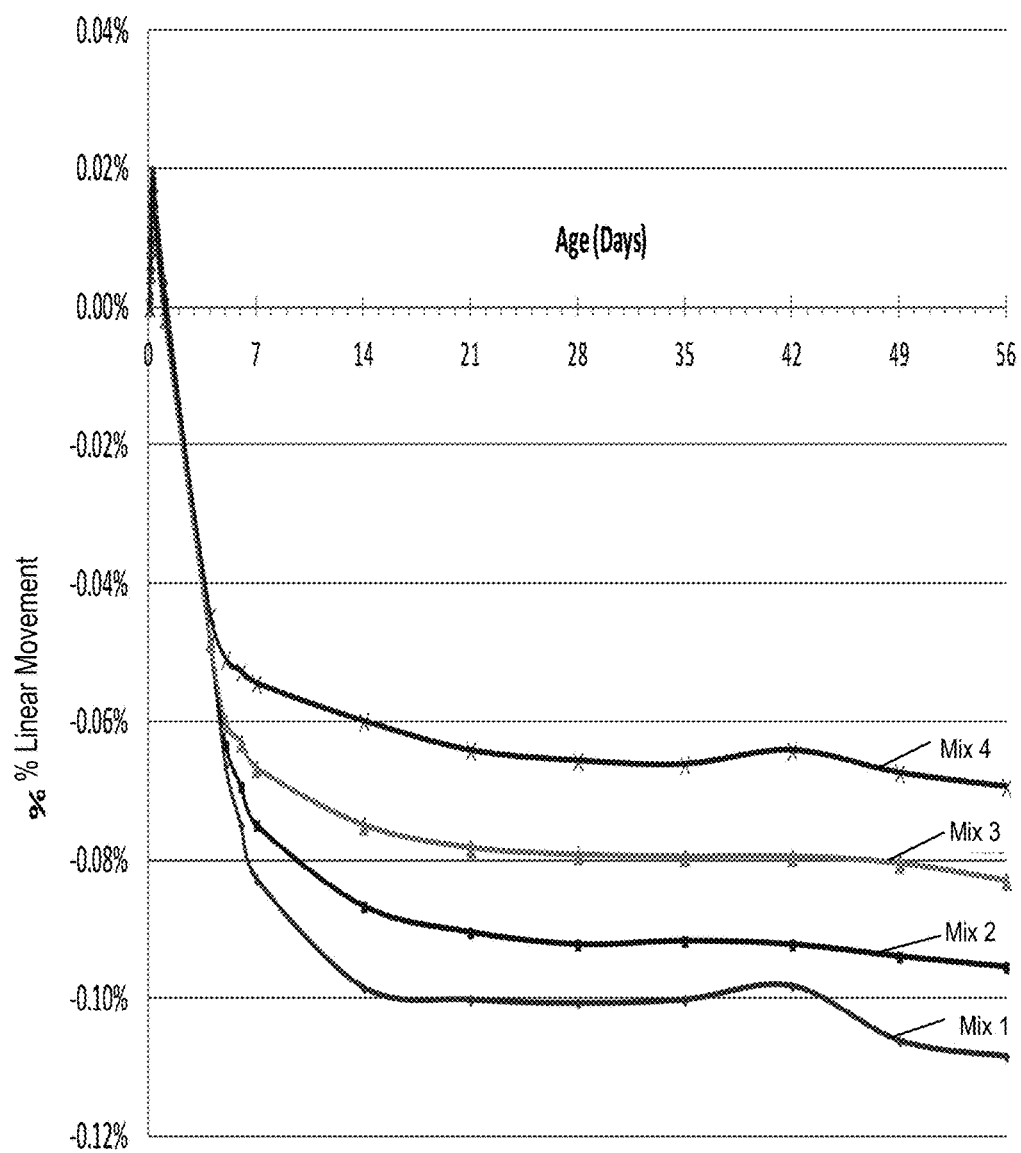
FIG. 2 shows linear movement (drying shrinkage) of mixture compositions investigated in Example 2.

FIG. 2 shows the linear movement behavior of the compositions investigated in this example. The testing was conducted per ASTM C1708-13 with an exception that the prismatic samples were demolded at the time of initial set, wherein the initial specimen length measurement taken right after specimen demolding. The specimen length measurements were continued until the age of 56 days. It can be observed that all four mixes shrank with ultimate shrinkage ranging between 0.07% and 0.11%. It is also noteworthy that the ultimate shrinkage decreased with increase in Portland cement content. For instance, for Mix 1 the ultimate shrinkage was about 0.11%, while for Mix 4 with highest amount of Portland cement, the ultimate shrinkage reduced to 0.07%. Thus, absence of Portland cement in the formulation is detrimental to performance.

Example 3

Influence of Calcium Aluminate Cement on Early Ate Strength

This example shows influence of calcium aluminate cement addition on fresh and hardened properties of aluminate cement compositions comprising calcium sulfoaluminate cement, Portland cement and calcium sulfate. TABLE 3.1 shows the mixture compositions investigated in this example. Both mixture compositions were extended with fly ash. Lithium carbonate was added at small dosage rates of less than 0.50 wt. % of the hydraulic cement-based reactive powder. Mix 1 was free of calcium aluminate cement, while Mix 2 contained calcium aluminate cement at a dosage rate of 12.8 wt. % of hydraulic cement-based reactive powder. The superplasticizer used in Mix 1 was MELFLUX 5581 F from BASF, while that in Mix 2 was MELFLUX 6681 F from BASF.

TABLE 3.1

| Compositions investigated in Example 3 | | |
|---|---|---|
| Raw Material | Mix 1 | Mix 2 |
| Calcium Sulfoaluminate Cement, pbw | 58.8 | 51.3 |
| Calcium Aluminate Cement, pbw | 0.00 | 12.8 |
| Calcium Sulfate Dihydrate, pbw | 29.4 | 25.6 |
| Portland Cement, pbw | 11.8 | 10.3 |
| Total Hydraulic Cement-Based Reactive Powder, pbw | 100 | 100 |
| Fly Ash/Hydraulic Cement-Based Reactive Powder Wt. Ratio | 1.22 | 1.12 |
| Sand/Hydraulic Cement-Based Reactive Powder Wt. Ratio | 1.19 | 1.14 |
| Lithium Carbonate/Hydraulic Cement-Based Reactive Powder, wt. % | 0.48 | 0.45 |
| Citric Acid/Hydraulic Cement-Based Reactive Powder, wt. % | 0.40 | 0.38 |
| AXILAT RH100 XP/Hydraulic Cement-Based Reactive Powder, wt. % | 0.08 | 0.11 |
| Superplasticizer, wt. % | 0.64 | 1.06 |
| Defoamer/Hydraulic Cement-Based Reactive Powder, wt. % | 0.79 | 0.76 |
| Water/Hydraulic Cement-Based Powder Reactive Powder Wt. Ratio | 0.953 | 0.983 |

Slurry Slump and Setting Behavior

TABLE 3.2 shows slurry slump (demonstrating mix workability) and setting behavior of the two compositions investigated in Example 3. TABLE 3.2 shows the measured diameter of slump patties of this example. It can be observed the addition of calcium aluminate cement to the remaining components of invention did not negatively impact the flow behavior of the material. It should be noted materials with good workability and flow properties typically produce a slump patty with a diameter greater than 6 inches.

TABLE 3.2 further demonstrates both initial and final setting times of the compositions of invention decrease with addition of calcium aluminate cement.

TABLE 3.2

| | Workability (Slump - 2" Diameter × 1" tall cylinder) and Setting Time (Vicat) | | |
|---|---|---|---|
| Mix # | Slump (inches) | Initial Set (mins) | Final Set (mins) |
| 1 | 8³⁄₃₂" | 29 | 38 |
| 2 | 7¹⁰⁄₃₂" | 26 | 30 |

Compressive Strength Behavior

TABLE 3.3 shows the early age (4-hour) compressive strength behavior of the cementitious compositions investigated in this example. This shows the early age compressive strength of the material increases with addition of calcium aluminate cement in the compositions of invention. For several applications it is desirable to have an early age compressive strength in excess of 2000 psi. This example demonstrated high early age strength can be achieved by adding calcium aluminate cement to the remainder raw material components of the invention.

TABLE 3.3

| Compressive Strength (psi) | |
|---|---|
| Mix # | 4-hour |
| 1 | 1531 |
| 2 | 2321 |

Example 4

Influence of Portland Cement addition in Presence of Calcium Sulfoaluminate Cement and Calcium Aluminate Cement This example shows influence of Portland cement addition on fresh and hardened properties of aluminate cement compositions comprising calcium sulfoaluminate cement, calcium aluminate cement and calcium sulfate. TABLE 4.1 shows the mixture compositions investigated in this example. All mixture compositions were extended with fly ash. Lithium carbonate was added at high dosage rates in excess of 2.00 wt. % of the hydraulic cement-based reactive powder. Mix 1 contained highest amount of Portland cement (10.3 wt. %), while Mix 4 had lowest amount of Portland cement (2.8 wt. %). The superplasticizer used in these mixes was MELFLUX 6681 F from BASF.

TABLE 4.1

| Compositions investigated in Example 4 | | | | |
|---|---|---|---|---|
| Raw Material | Mix 1 | Mix 2 | Mix 3 | Mix 4 |
| Calcium Sulfoaluminate Cement, pbw | 51.3 | 52.6 | 54.1 | 55.6 |
| Calcium Aluminate Cement, pbw | 12.8 | 13.2 | 13.5 | 13.9 |
| Calcium Sulfate Hemihydrate, pbw | 0.00 | 0.00 | 0.00 | 0.00 |
| Calcium Sulfate Dihydrate, pbw | 25.6 | 26.3 | 27.0 | 27.6 |
| Portland Cement, pbw | 10.3 | 7.9 | 5.4 | 2.8 |
| Total Hydraulic Cement-Based Reactive Powder, pbw | 100 | 100 | 100 | 100 |
| Fly Ash/Hydraulic Cement-Based Reactive Powder Wt. Ratio | 1.12 | 1.14 | 1.16 | 1.18 |
| Sand/Hydraulic Cement-Based Reactive Powder Wt. Ratio | 1.14 | 1.15 | 1.16 | 1.17 |
| Lithium Carbonate/Hydraulic Cement-Based Reactive Powder, wt. % | 2.27 | 2.29 | 2.31 | 2.33 |
| Citric Acid/Hydraulic Cement-Based Reactive Powder, wt. % | 0.38 | 0.38 | 0.39 | 0.39 |
| AXILAT RH100 XP/Hydraulic Cement-Based Reactive Powder, wt. % | 0.12 | 0.12 | 0.12 | 0.12 |
| Superplasticizer/Hydraulic Cement-Based Reactive Powder, wt. % | 1.06 | 1.07 | 1.08 | 1.09 |
| Defoamer/Hydraulic Cement-Based Reactive Powder, wt. % | 0.76 | 0.76 | 0.77 | 0.78 |
| Water/Hydraulic Cement-Based Powder Reactive Powder Wt. Ratio | 0.908 | 0.916 | 0.924 | 0.933 |

Slurry Slump and Setting Behavior

TABLE 4.2 shows slurry slump (demonstrating mix workability) and setting behavior of the compositions investigated in Example 4. TABLE 4.2 shows the measured diameter of slump patties of this example. It can be observed the measured slump of all mixes investigated in this example were greater than 6 inches (15.24 cm) thus demonstrating a good workability and flow properties.

TABLE 4.2 also shows the initial and final setting times of the mixture compositions investigated in this example. The setting times of the mixture compositions of invention decreased with increase in Portland cement content. Thus, Portland cement addition helps achieve a more rapid set in aluminous compositions of the present invention.

TABLE 4.2

| Workability (Slump - 2" Diameter × 1" tall cylinder) and Setting Time (Vicat) | | | |
|---|---|---|---|
| Mix # | Slump (inches) | Initial Set (mins) | Final Set (mins) |
| 1 | 6⅞" | 46 | 51 |
| 2 | 6¹³⁄₁₆" | 49 | 53 |
| 3 | 7⅛" | 57 | 62 |
| 4 | 7¼" | 61 | 70 |

Self-Healing Behavior

All mixes investigated in this example demonstrated excellent self-healing behavior as measured per ASTM C1708-13 standard. Mix 1 failed at 30 minutes, while Mixes 2 through 4 failed at 37.5 minutes from the start of material mixing. A longer self-healing time is useful in many practical applications since it allows users a longer time window to work with the material to achieve a desirable installation and finish.

Compressive Strength Behavior

TABLE 4.3 shows the early age (2-hour and 4-hour) and ultimate (28-Day) compressive strength behavior of the cementitious compositions investigated in this example. For the mixes investigated, the 2-hour compressive strength was in excess of 1500 psi and the 4-hour compressive strength was in excess of 2000 psi. Also, the 28-Day compressive strength of the mixes investigated was in excess of 4950 psi. For several practical applications it is desirable to have an early age compressive strength in excess of 1500 psi. Formulations of this invention that allow this feature to be achieved in 2-hours are preferred.

TABLE 4.3

| Compressive Strength (psi) | | | |
|---|---|---|---|
| Mix # | 2 hr | 4 hr | 28 Days |
| 1 | 1793 | 2524 | 4972 |
| 2 | 1720 | 2354 | 5460 |
| 3 | 1626 | 2250 | 5663 |
| 4 | 1503 | 2120 | 5624 |

Example 5

Influence of Lithium Carbonate Dosage on Dimensional Movement

This example shows influence of lithium carbonate addition rate on fresh and hardened properties of aluminate cement compositions comprising calcium sulfoaluminate cement, calcium aluminate cement, Portland cement, and calcium sulfate. TABLE 5.1 shows the mixture compositions investigated in this example. All mixture compositions were extended with fly ash. Lithium carbonate was added at dosage rates ranging between 0.68-2.27 wt. % of the hydraulic cement-based reactive powder. The superplasticizer used in these mixes was MELFLUX 6681 F from BASF. The viscosity enhancing admixture in these mixes was STARVIS 3003F from BASF.

TABLE 5.1

Compositions investigated in Example 5

| Raw Material | Mix 1 | Mix 2 | Mix 3 |
|---|---|---|---|
| Calcium Sulfoaluminate Cement, pbw | 51.3 | 51.3 | 51.3 |
| Calcium Aluminate Cement, pbw | 12.8 | 12.8 | 12.8 |
| Calcium Sulfate Dihydrate, pbw | 25.6 | 25.6 | 25.6 |
| Portland Cement, pbw | 10.3 | 10.3 | 10.3 |
| Total Hydraulic Cement-Based Reactive Powder, pbw | 100 | 100 | 100 |
| Fly Ash/Hydraulic Cement-Based Reactive Powder Wt. Ratio | 1.12 | 1.12 | 1.12 |
| Sand/Hydraulic Cement-Based Reactive Powder Wt. Ratio | 1.14 | 1.14 | 1.14 |
| Lithium Carbonate/Hydraulic Cement-Based Reactive Powder, wt. % | 0.68 | 1.36 | 2.27 |
| Citric Acid/Hydraulic Cement-Based Reactive Powder, wt. % | 0.38 | 0.38 | 0.27 |
| AXILAT RH100 XP/Hydraulic Cement-Based Reactive Powder, wt. % | 0.11 | 0.11 | 0.11 |
| Superplasticizer/Hydraulic Cement-Based Reactive Powder, wt. % | 1.06 | 1.06 | 1.06 |
| Viscosity Enhancing Admixture/Hydraulic Cement-Based Reactive Powder, wt. % | 0.00 | 0.00 | 0.30 |
| Defoamer/Hydraulic Cement-Based Reactive Powder, wt. % | 0.76 | 0.76 | 0.76 |
| Sodium Gluconate/Hydraulic Cement-Based Reactive Powder, wt. % | 0.30 | 0.30 | 0.35 |
| Color Pigment/Hydraulic Cement-Based Reactive Powder, wt. % | 0.00 | 0.00 | 2.27 |
| Water/Hydraulic Cement-Based Powder Reactive Powder Wt. Ratio | 0.91 | 0.91 | 0.91 |

Slurry Slump and Setting Behavior

TABLE 5.2 shows slurry slump (demonstrating mix workability) and setting behavior of the compositions investigated in Example 5. TABLE 5.2 shows the measured diameter of slump patties of this example. It can be observed the measured slump of all mixes investigated in this example were equal or greater than 7 inches thus demonstrating excellent workability and flow properties.

TABLE 5.2 also shows the initial and final setting times of the mixture compositions investigated in this example. It can be observed that the setting times of the mixture compositions of invention were practically unaffected by the amount of lithium carbonate in the composition.

Figure 3:
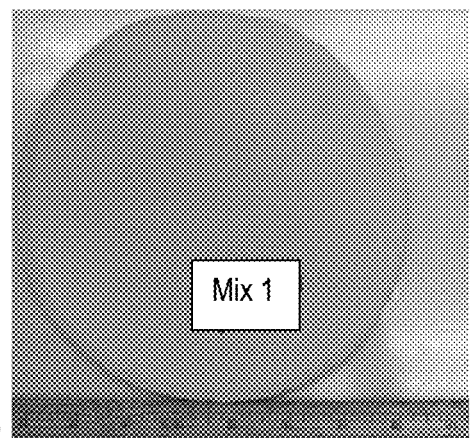
FIGS. 3, 4 and 5 show photographs of slump patties for Mixes 1, 2, and 3, respectively, of the compositions investigated in Example 5.
Figure 4:
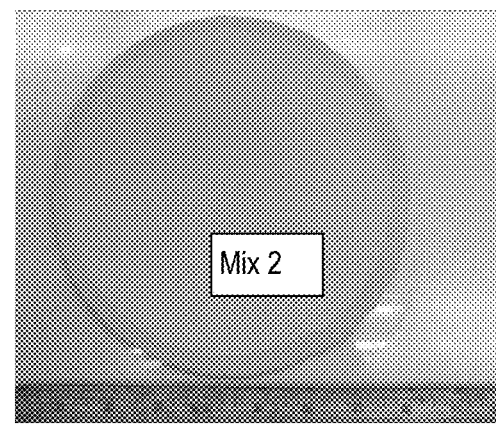
Figure 5:
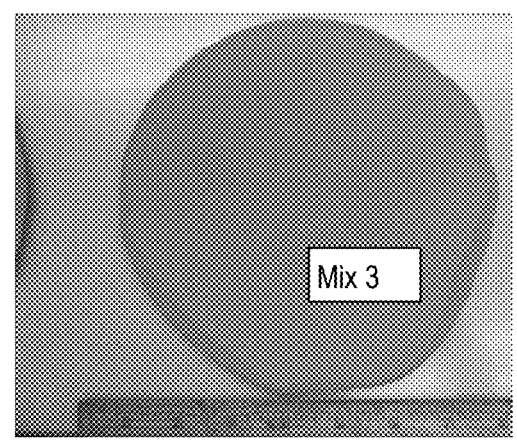

FIGS. 3, 4, and 5 shows show photographs of slump patties for Mixes 1, 2, and 3, respectively, of the compositions investigated in Example 5. The photographs of the slump patties show all three mixes demonstrated good working and flow properties.

TABLE 5.2

Workability (Slump - 2 inch Diameter × 1 inch tall cylinder) and Setting Time (Vicat)

| Mix # | Slump (inches) | Initial Set (mins) | Final Set (mins) |
|---|---|---|---|
| 1 | 7 9/16 | 42 | 46 |
| 2 | 7 1/4 | 45 | 49 |
| 3 | 7-0 | 43 | 48 |

Compressive Strength Behavior

TABLE 5.3 shows the early age (2-hour and 4-hour) and ultimate (28-Day) compressive strength behavior of the cementitious compositions investigated in this example. For the mixes investigated, the 2-hour compressive strength was in excess of 1500 psi and the 4-hour compressive strength was in excess of 2000 psi. Furthermore, the 28-Day compressive strength of the mixes investigated was in excess of 4500 psi. For several practical applications it is desirable to have an early age compressive strength in excess of 1500 psi. The compositions disclosed herein that allow this feature to be achieved in 2-hours are considered to be the preferred compositions of the present invention.

TABLE 5.3

| | Compressive Strength (psi) | | |
|---|---|---|---|
| Mix # | 2 hr | 4 hr | 28 days |
| 1 | 1774 | 2255 | 5232 |
| 2 | 1714 | 2227 | 5322 |
| 3 | 1752 | 2297 | 4676 |

Self-Healing Behavior

Self-healing behavior of compositions of this example was investigated using the ASTM C1708-13 standard. All mixes showed a minimum self-healing time of 30 minutes. A longer self-healing time is useful in many practical applications since it allows users a longer time window to work with the material to achieve a desirable installation and finish.

Linear Movement

Figure 5A:
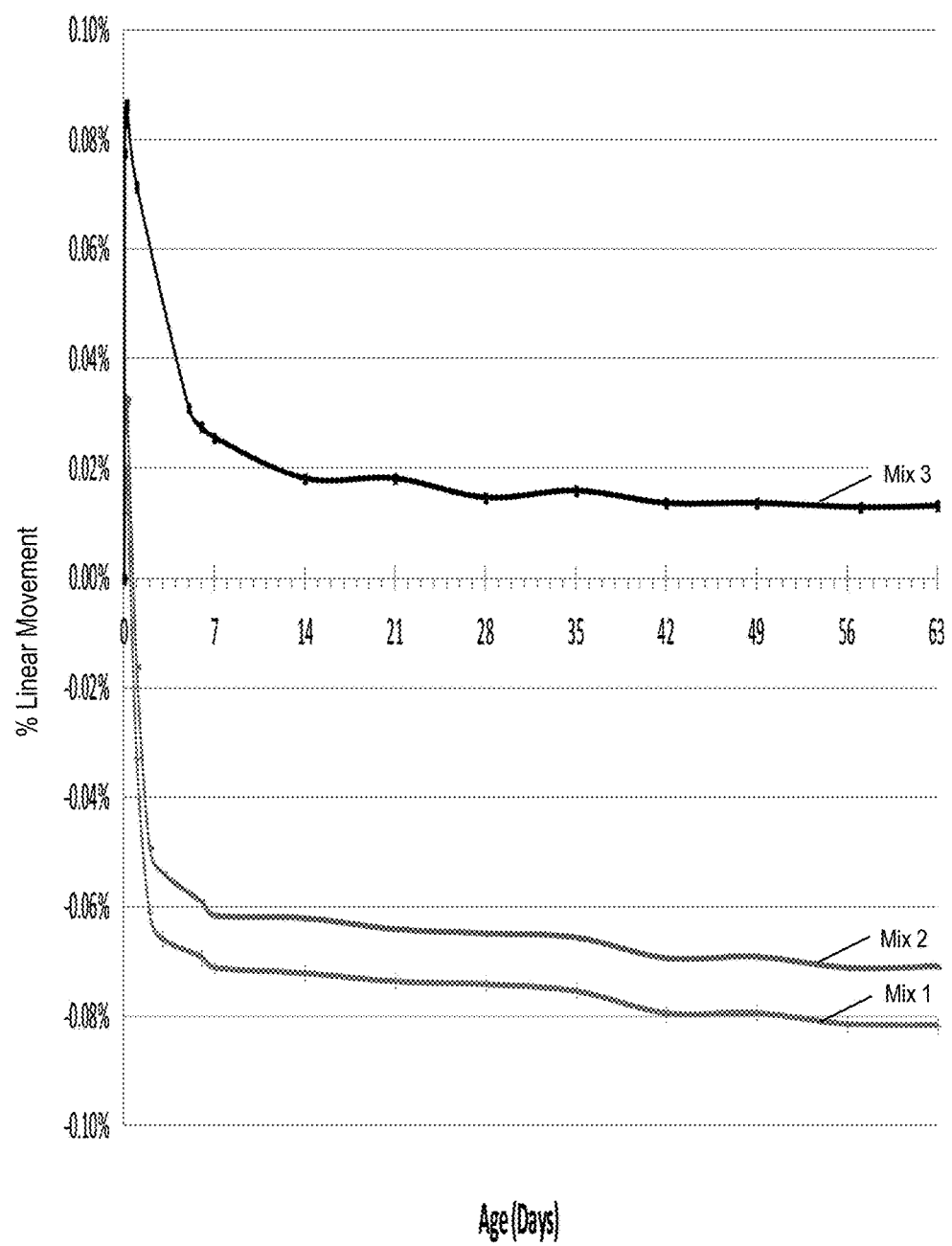
FIG. 5A is a plot showing linear movement (drying shrinkage) of mixture compositions investigated in Example 5.

FIG. 5A is a plot showing Linear movement (drying shrinkage) behavior of mixture compositions investigated in Example 5. The testing was conducted per ASTM C1708-13 with an exception that the prismatic samples were demolded at the time of initial set, wherein the initial specimen length measurement taken right after specimen demolding. The specimen length measurements were continued until the age of 56 days. This shows Mix 1 and Mix 2 shrank with an ultimate shrinkage ranging between 0.06% and 0.08%. This also shows the ultimate shrinkage decreased with increase in lithium carbonate content. On the other hand, Mix 3 saw a resultant expansion compared to the specimen original length. Influence of lithium carbonate dosage on shrinkage reduction and expansion is an unexpected finding of the present invention. This example teaches dimensional movement characteristics of the compositions of invention may be tailored by using appropriate lithium carbonate dosage. In the present state-of-the-art on calcium aluminate cements, it is known that lithium carbonate acts as a chemical accelerator to speed-up the reaction of calcium aluminates to achieve a rapid set and rapid strength. Furthermore, the present state-of-the-art does not teach influence of lithium carbonate dosage on dimensional movement of compositions comprising aluminate cements. As unexpectedly found in this example, a higher lithium carbonate dosage led to an increase in material expansion thereby helping to reduce overall material shrinkage and dimensional movement. Moreover, contrary to what is well known in the present state-of-the-art, the setting behavior and compressive strength development of the compositions of this invention surprisingly were not found to be affected by the amount of lithium carbonate present in the formulation. Without submitting to any theory, it is postulated that complex interactions taking place between hydraulic cement-based reactive powder, inorganic flow control agent and metal-based dimensional stabilizing agent in presence of water usage levels as disclosed in this invention are responsible for the unexpected results observed and described in this example.

Example 6

Influence of High Lithium Carbonate Dosage on Dimensional Movement of Compositions Containing Fly Ash This example shows influence of high lithium carbonate addition rate on fresh and hardened properties of aluminate cement compositions comprising calcium sulfoaluminate cement, calcium aluminate cement, Portland cement, and calcium sulfate. TABLE 6.1 shows the mixture compositions investigated in this example. All mixture compositions were extended with fly ash. Lithium carbonate was added at dosage rate of 2.31 wt. % of the hydraulic cement-based reactive powder in all three mixes investigated. The amount of water added in the three mixes was varied with Mix 1 having a w/cm ratio of 0.972, Mix 2 having a w/cm ratio of 0.904, and Mix 3 having a w/cm ratio of 0.833. The superplasticizer used in these mixes was MELFLUX 6681 F from BASF. The viscosity enhancing admixture in these mixes was STARVIS 3003F from BASF.

TABLE 6.1

Compositions investigated in Example 6

| Raw Material | Mix 1 | Mix 2 | Mix 3 |
| --- | --- | --- | --- |
| Calcium Sulfoaluminate Cement, pbw | 50.5 | 50.5 | 50.5 |
| Calcium Aluminate Cement, pbw | 13.2 | 13.2 | 13.2 |
| Calcium Sulfate Dihydrate, pbw | 25.3 | 25.3 | 25.3 |
| Portland Cement, pbw | 11.0 | 11.0 | 11.0 |
| Total Hydraulic Cement-Based Reactive Powder, pbw | 100 | 100 | 100 |
| Fly Ash/Hydraulic Cement-Based Reactive Powder Wt. Ratio | 1.10 | 1.10 | 1.10 |
| Sand/Hydraulic Cement-Based Reactive Powder Wt. Ratio | 1.15 | 1.15 | 1.15 |
| Lithium Carbonate/Hydraulic Cement-Based Reactive Powder, wt. % | 2.31 | 2.31 | 2.31 |
| Citric Acid/Hydraulic Cement-Based Reactive Powder, wt. % | 0.17 | 0.17 | 0.17 |
| AXILAT RH100 XP/Hydraulic Cement-Based Reactive Powder, wt. % | 0.13 | 0.13 | 0.13 |
| Superplasticizer/Hydraulic Cement-Based Reactive Powder, wt. % | 1.05 | 1.05 | 1.05 |
| Viscosity Enhancing Admixture/Hydraulic Cement-Based Reactive Powder, wt. % | 0.32 | 0.32 | 0.32 |
| Defoamer/Hydraulic Cement-Based Reactive Powder, wt. % | 0.76 | 0.76 | 0.76 |
| Sodium Gluconate/Hydraulic Cement-Based Reactive Powder, wt. % | 0.36 | 0.36 | 0.36 |
| Color Pigment/Hydraulic Cement-Based Reactive Powder, wt. % | 3.15 | 3.15 | 3.15 |
| Water/Hydraulic Cement-Based Powder Reactive Powder Wt. Ratio | 0.972 | 0.903 | 0.833 |

Slurry Slump and Setting Behavior

TABLE 6.2 shows slurry slump (demonstrating mix workability) and setting behavior of the compositions investigated in Example 6. Table 6.2 shows the measured diameter of slump patties of this example. It can be observed the measured slump of all mixes investigated in this example were equal or greater than 6" (15.24 cm) thus demonstrating excellent workability and flow properties.

TABLE 6.2 also shows the initial and final setting times of the mixture compositions investigated in this example. It can be observed that the setting times of the mixture compositions of invention decreased slightly with decrease in water to cementitious reactive powder ratio of the material.

Figure 6:
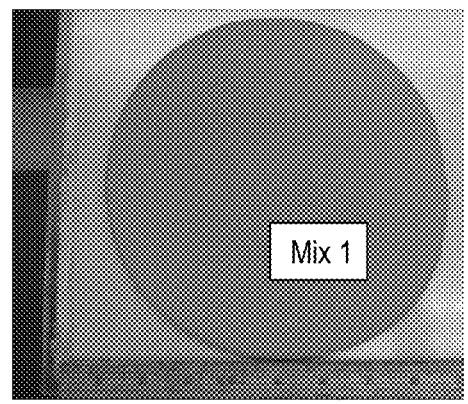
FIGS. 6, 6A, and 6B show photographs of slump patties for the compositions of Mixes 1, 2 and 3, respectively, investigated in Example 6.
Figure 6A:
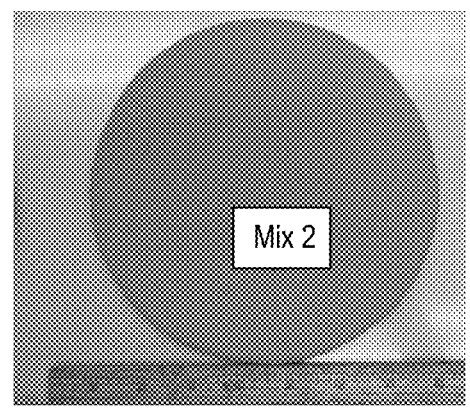
Figure 6B:
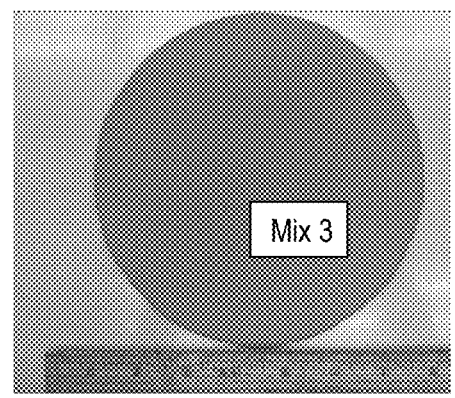

FIG. 6, FIG. 6A and FIG. 6B show photographs of slump patties for the compositions of Mixes 1, 2 and 3, respectively, of the invention in Example 6. The photographs of the slump patties show all three mixes demonstrated good working and flow properties.

TABLE 6.2

Workability (Slump - 2" Diameter × 1" tall cylinder) and Setting Time (Vicat)

| Mix # | Slump (inches) | Initial Set (mins) | Final Set (mins) |
| --- | --- | --- | --- |
| 1 | 7.75 | 43 | 48 |
| 2 | 7.25 | 41 | 45 |
| 3 | 6.75 | 39 | 43 |

Self-Healing Behavior

Self-healing behavior of the compositions of this example was investigated using the ASTM C1708-13 standard. All mixes demonstrated a minimum self-healing time of 30 minutes. A longer self-healing time is useful in many practical applications since it allows users a sufficiently long time window to work with the material to achieve a desirable installation and finish.

Compressive Strength Behavior

TABLE 6.3 shows the early age (2-hour and 4-hour) and ultimate (28-Day) compressive strength behavior of the cementitious compositions investigated in this example. This shows for the mixes investigated, the 2-hour compressive strength was in excess of 1500 psi and the 4-hour compressive strength was in excess of 2000 psi. Furthermore, the 28-Day compressive strength of the mixes investigated was in excess of 4500 psi. For several practical applications it is desirable to have an early age compressive strength in excess of 1500 psi. The compositions disclosed herein that allow this feature to be achieved in 2-hours are considered to be the preferred compositions of the present invention.

TABLE 6.3

| Mix # | Compressive Strength (psi) | | | |
| --- | --- | --- | --- | --- |
| | 2 hr | 4 hr | 24 hr | 28 days |
| 1 | 1566 | 2119 | 2746 | 4109 |
| 2 | 1836 | 2453 | 3193 | 4426 |
| 3 | 2178 | 2878 | 3835 | 4971 |

Linear Movement

FIG. 6C shows the linear movement (drying shrinkage) behavior of the compositions of invention investigated in this example. The testing was conducted per ASTM C1708-13 with an exception that the prismatic samples were demolded at the time of initial set with the initial length measurement taken at the instant of specimen demolding. The specimen length measurements were continued until the age of 56 days. This shows all three compositions expanded within the first few hours of casting followed by a gradual shrinking until the age of 56 days. All three compositions demonstrated a net expansion compared to the initial measured length at the time of initial set. The net expansion ranged from 0.01% to 0.03% for the three compositions investigated in this example. Influence of lithium carbonate dosage on shrinkage reduction and resultant expansion is an unexpected and unique finding of the present invention.

Example 7

Influence of High Lithium Carbonate Dosage on Dimensional Movement of Compositions Containing Coarse Grained Calcium Carbonate This example shows influence of high lithium carbonate addition rate on fresh and hardened properties of aluminate cement compositions comprising calcium sulfoaluminate cement, calcium aluminate cement, Portland cement, and calcium sulfate. TABLE 7.1 shows the three mixture compositions investigated in this example. All mixture compositions were extended with a coarse grained calcium carbonate mineral filler with 65 wt. % of particles passing through 325 Mesh. The amount of calcium carbonate was varied in the three mixes as shown in TABLE 7.1. Lithium carbonate was added at high dosage rates ranging between 1.70 and 2.31 wt. % of the hydraulic cement-based reactive powder in the three mixes. The superplasticizer used in these mixes was MELFLUX 6681 F from BASF. The viscosity enhancing admixture in these mixes was STARVIS 3003F from BASF.

TABLE 7.1

Compositions investigated in Example 7

| Raw Material | Mix 1 | Mix 2 | Mix 3 |
| --- | --- | --- | --- |
| Calcium Sulfoaluminate Cement, pbw | 50.5 | 50.5 | 50.5 |
| Calcium Aluminate Cement, pbw | 13.2 | 13.2 | 13.2 |
| Calcium Sulfate Dihydrate, pbw | 25.3 | 25.3 | 25.3 |
| Portland Cement, pbw | 11.0 | 11.0 | 11.0 |
| Total Hydraulic Cement-Based Reactive Powder, pbw | 100 | 100 | 100 |
| Calcium Carbonate/Hydraulic Cement-Based Reactive Powder Wt. Ratio | 1.10 | 0.82 | 0.55 |
| Sand/Hydraulic Cement-Based Reactive Powder Wt. Ratio | 1.15 | 1.00 | 0.85 |
| Lithium Carbonate/Hydraulic Cement-Based Reactive Powder, wt. % | 2.31 | 2.01 | 1.70 |
| Citric Acid/Hydraulic Cement-Based Reactive Powder, wt. % | 0.17 | 0.15 | 0.12 |
| AXILAT RH100 XP/Hydraulic Cement-Based Reactive Powder, wt. % | 0.13 | 0.11 | 0.09 |
| Superplasticizer/Hydraulic Cement-Based Reactive Powder, wt. % | 1.05 | 0.91 | 0.78 |
| Viscosity Enhancing Admixture/Hydraulic Cement-Based Reactive Powder, wt. % | 0.32 | 0.27 | 0.23 |
| Defoamer/Hydraulic Cement-Based Reactive Powder, wt. % | 0.76 | 0.66 | 0.56 |
| Sodium Gluconate/Hydraulic Cement-Based Reactive Powder, wt. % | 0.36 | 0.31 | 0.26 |
| Color Pigment/Hydraulic Cement-Based Reactive Powder, wt. % | 3.15 | 2.74 | 2.32 |
| Water/Hydraulic Cement-Based Powder Reactive Wt. Ratio | 0.972 | 0.784 | 0.666 |

Slurry Slump and Setting Behavior

TABLE 7.2 shows slurry slump (demonstrating mix workability) and setting behavior of the compositions investigated in Example 7. TABLE 7.2 shows the measured diameter of slump patties of this example. It can be observed the measured slump of all mixes investigated in this example were equal or greater than 6" thus demonstrating excellent workability and flow properties.

TABLE 7.2 also shows the initial and final setting times of the mixture compositions investigated in this example. It can be observed that all three mixes set very rapidly despite the amount of calcium carbonate in the composition.

Figure 7:
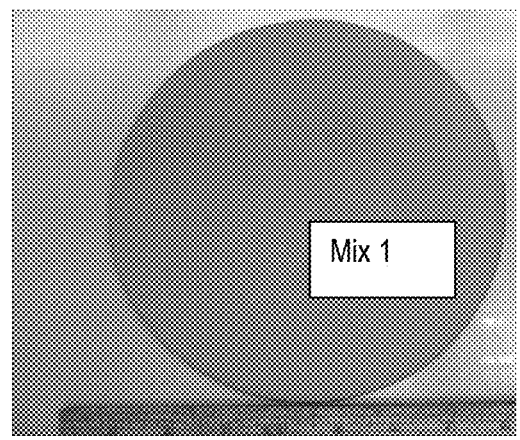
FIGS. 7, 7A, and 7B show photographs of slump patties for the compositions of Mixes 1, 2, and 3, respectively, investigated in Example 7.
Figure 7A:
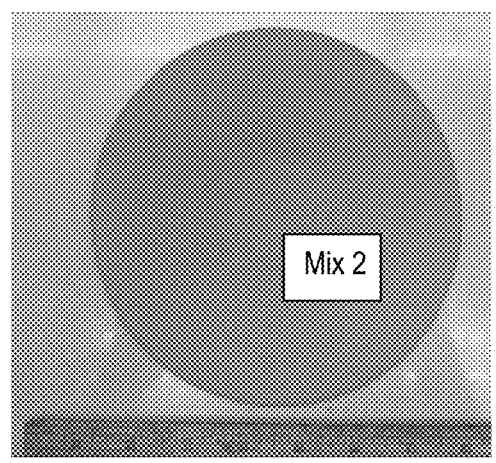
Figure 7B:
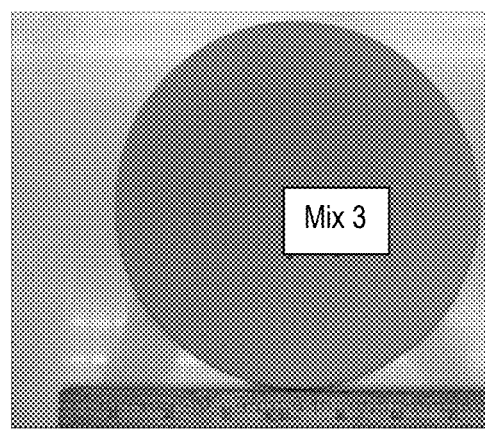

FIGS. 7, 7A, and 7B show photographs of slump patties for the compositions of Mixes 1, 2, and 3, respectively, investigated in Example 7. From the photographs of the slump patties it can be observed all three mixes had good workability and flow properties.

TABLE 7.2

Workability (Slump-2" Diameter × 1" tall cylinder) and Setting Time (Vicat)

| Mix # | Slump (inches) | Initial Set (mins) | Final Set (mins) |
| --- | --- | --- | --- |
| 1 | 7-1/16" | 42 | 47 |
| 2 | 6-3/4" | 36 | 40 |
| 3 | 6-9/16" | 30 | 33 |

Self-Desiccation Behavior

Approximately ¼" (0.635 cm) thick layer of slurry was poured in a shallow plastic tray to observe self-desiccation and surface drying characteristics of the material. Self-desiccation time was characterized as the time when the top surface of the poured underlayment slab changed its observable wet surface appearance to a hardened surface sufficiently dry to permit applying flooring adhesives and floor coverings (such as carpet and other resilient floor coverings) without negatively affecting the short- and long-term bond between the floor covering and poured underlayment. Self-desiccation time generally occurred after achieving final setting time of the material. Self-desiccation time for Mix 1 of this example was characterized as 90 minutes. Mix 2 Self-desiccation time was characterized as 72 minutes. Mix 3 Self-desiccation time was characterized as 60 minutes.

Self-Healing Behavior

Self-healing behavior of the compositions of this example was investigated using the ASTM C1708-13 standard. All mixes demonstrated a minimum self-healing time of 22.5 minutes. A longer self-healing time is useful in many practical applications since it allows users a sufficiently long time window to work with the material to achieve a desirable installation and finish.

Compressive Strength Behavior

TABLE 7.3 shows the early age (2-hour and 4-hour) and ultimate (28-Day) compressive strength behavior of the cementitious compositions investigated in this example. For the mixes investigated, the 2-hour compressive strength was in excess of 1450 psi and the 4-hour compressive strength was in excess of 1950 psi. For several practical applications it is desirable to have an early age compressive strength in excess of 1500 psi. The compositions disclosed herein which allow this feature to be achieved in 2-hours are considered as the preferred compositions of the present invention.

TABLE 7.3

Compressive Strength (psi)

| Mix # | 2 hour | 4 hour | 24 hour |
| --- | --- | --- | --- |
| 1 | 1478 | 1969 | 2746 |
| 2 | 1802 | 2318 | 3193 |
| 3 | 2127 | 2641 | 3835 |

Linear Movement

FIG. 7C shows the linear movement behavior of the compositions of invention investigated in this example. The testing was conducted per ASTM C1708-13 with an exception that the prismatic samples were demolded at the time of initial set with the initial length measurement taken at the instant of specimen demolding. The specimen length measurements were continued on a periodic basis after the initial measurement. This shows all three compositions expanded within the first few hours of casting followed by a gradual shrinking. All three compositions demonstrated a net expansion compared to the initial measured length at the time of initial set. It can be concluded that the compositions of present invention containing coarse grained calcium carbonate and high amounts of lithium carbonate show resultant expansion compared to the initial length at the time of initial set. It should be noted that influence of lithium carbonate dosage on shrinkage reduction and resultant expansion is an unexpected and unique finding of the present invention.

Example 8

Properties of Aluminous Cement Compositions Comprising Only One Type of Aluminous Cement This example demonstrates performance of aluminous cementitious compositions, TABLE 8.1, comprising either calcium sulfoaluminate cement or calcium aluminate cement. Mixes 1 through 3 show compositions comprising calcium sulfoaluminate cement as the only aluminous cement in the mixture. Mixes 4 through 6 show compositions comprising calcium aluminate cement as the only aluminous cement in the mixture. In addition, the amount of calcium sulfate in the mixture compositions was varied to determine its influence of the overall performance. All mixture compositions were extended with calcium carbonate mineral filler, HUBERCARB M200, having a median particle size of 15 microns. The superplasticizer used in both mixes was CASTAMENT FS20 from BASF. This example used Ciment Fondu calcium aluminate cement available from Kerneos Inc.

FIGS. 8A (showing Mix 1), 8B (showing Mix 2), 8C (showing Mix 3), 8D (showing Mix 4), 8E (showing Mix 5), 8F (showing Mix 6) shows photographs of slump patties for the compositions investigated in Example 8. From the photographs, it can be observed that all slump patties were quite viscous. Furthermore, it can be noticed that the slump patties for Mixes 4 through 6 comprising calcium aluminate cement developed cracking within the first few hours after they were poured.

TABLE 8.2

| Workability (Slump-2" Diameter × 1" tall cylinder) | |
| --- | --- |
| Mix # | Slump (inches) |
| 1 | 2" |
| 2 | 2-1/16" |
| 3 | 2-1/16" |
| 4 | 4-5/16" |
| 5 | 4-1/4" |
| 6 | 4-1/16" |

Self-Healing Behavior

Self-healing behavior of the compositions investigated in this example was characterized using the ASTM C1708-13 standard. All compositions displayed extremely poor self-healing behavior and failed at the very instant of initial pour. Mixes 1 through 3 were so viscous that they could not be poured in the trays for conducting the self-healing test.

Linear Movement

Figure 8G:
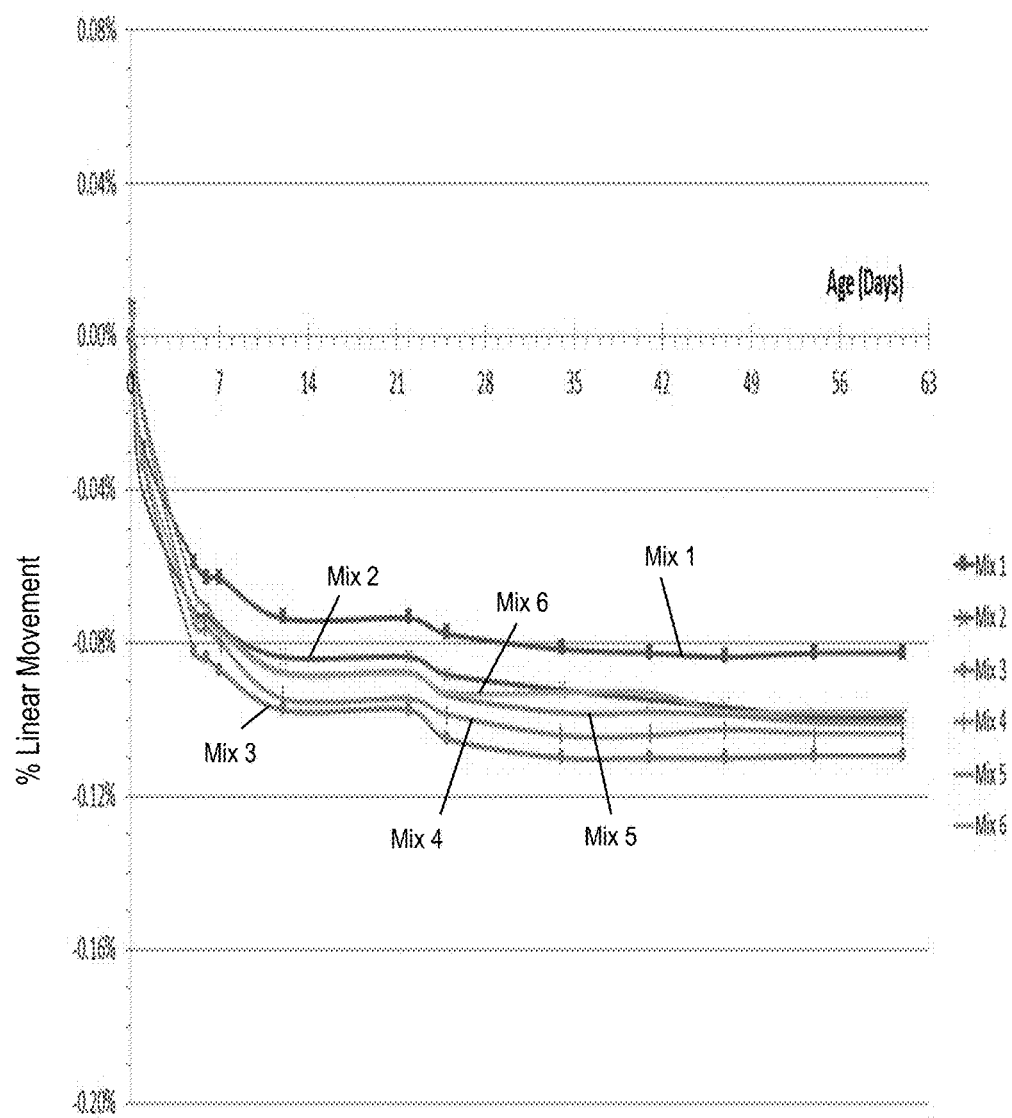
FIG. 8G shows the linear movement behavior of the compositions of invention investigated in Example 8.

FIG. 8G shows the linear movement behavior of the compositions of invention investigated in Example 8. The

TABLE 8.1

| Compositions investigated in Example 8 | | | | | | |
| --- | --- | --- | --- | --- | --- | --- |
| Raw Material | Mix 1 | Mix 2 | Mix 3 | Mix 4 | Mix 5 | Mix 6 |
| Calcium Sulfoaluminate Cement, pbw | 62.5 | 58.8 | 55.6 | 0.0 | 0.0 | 0.0 |
| Calcium Aluminate Cement, pbw | 0.0 | 0.0 | 0.0 | 62.5 | 58.8 | 55.6 |
| Calcium Sulfate Hemihydrate, pbw | 18.8 | 23.5 | 27.8 | 18.8 | 23.5 | 27.8 |
| Portland Cement, pbw | 18.8 | 17.6 | 16.7 | 18.8 | 17.6 | 16.7 |
| Total Hydraulic Cement-Based Reactive Powder, pbw | 100 | 100 | 100 | 100 | 100 | 100 |
| Calcium Carbonate/Hydraulic Cement-Based Reactive Powder Wt. Ratio | 1.0 | 1.0 | 1.0 | 1.0 | 1.0 | 1.0 |
| Sand/Hydraulic Cement-Based Reactive Powder Wt. Ratio | 1.0 | 1.0 | 1.0 | 1.0 | 1.0 | 1.0 |
| Lithium Carbonate/Hydraulic Cement-Based Reactive Powder, wt. % | 0.25 | 0.25 | 0.25 | 0.25 | 0.25 | 0.25 |
| Citric Acid/Hydraulic Cement-Based Reactive Powder, wt. % | 0.75 | 0.75 | 0.75 | 0.75 | 0.75 | 0.75 |
| AXILAT RH100 XP/Hydraulic Cement-Based Reactive Powder, wt. % | 0.02 | 0.02 | 0.02 | 0.02 | 0.02 | 0.02 |
| Superplasticizer/Hydraulic Cement-Based Reactive Powder, wt. % | 0.50 | 0.50 | 0.50 | 0.50 | 0.50 | 0.50 |
| Defoamer/Hydraulic Cement-Based Reactive Powder, wt. % | 0.25 | 0.25 | 0.25 | 0.25 | 0.25 | 0.25 |
| Water/Hydraulic Cement-Based Reactive Powder Wt. Ratio | 0.65 | 0.65 | 0.65 | 0.65 | 0.65 | 0.65 |

Slurry Slump Behavior

TABLE 8.2 shows slurry slump (demonstrating mix workability) diameter of the compositions investigated in Example 8. It can be observed that all patties had a relatively small diameter indicating that the material was quite viscous having poor workability and flow properties. It should be noted that materials having good workability and flow properties typically produce a slump patty diameter greater than 6 inches in this test.

testing of linear movement behavior was conducted per ASTM C1708-13 with an exception that the prismatic samples were demolded at the time of initial set, wherein the initial specimen length measurement was taken right after specimen demolding. The specimen length measurements were continued until the age of about 56 days. FIG. 8G shows none of the compositions demonstrated expansion. All mixes demonstrated net shrinkage, wherein the magnitude of ultimate shrinkage ranged from about 0.08% to 0.12%. This extent of shrinkage is not desirable in many practical applications because of the potential of material cracking and debonding from the applied substrates.

Example 9

Properties of Aluminous Cement Compositions in Absence of Portland Cement

This example demonstrates properties of aluminous compositions in absence of Portland cement. The three mixes investigated in this example contained only calcium aluminate cement and calcium sulfate as the cementitious materials and no Portland cement, TABLE 9.1. Three different levels of water/cementitious reactive powder ratios were also investigated in absence of Portland cement in the mixture. All mixture compositions were extended with calcium carbonate mineral filler, HUBERCARB M200, having a median particle size of 15 microns. Superplasticizer in both mixes was BASF CASTAMENT FS20.

TABLE 9.1

| Compositions investigated in Example 9 | | | |
|---|---|---|---|
| Raw Material | Mix 1 | Mix 2 | Mix 3 |
| Calcium Sulfoaluminate Cement, pbw | 0.0 | 0.0 | 0.0 |
| Calcium Aluminate Cement, pbw | 66.7 | 66.7 | 66.7 |
| Calcium Sulfate Hemihydrate, pbw | 33.3 | 33.3 | 33.3 |
| Portland Cement, pbw | 0.0 | 0.0 | 0.0 |
| Total Hydraulic Cement-Based Reactive Powder, pbw | 100 | 100 | 100 |
| Calcium Carbonate/Hydraulic Cement-Based Reactive Powder Wt. Ratio | 0.75 | 0.75 | 0.75 |
| Sand/Hydraulic Cement-Based Reactive Powder Wt. Ratio | 0.75 | 0.75 | 0.75 |
| Lithium Carbonate/Hydraulic Cement-Based Reactive Powder,wt. % | 0.25 | 0.25 | 0.25 |
| Citric Acid/Hydraulic Cement-Based Reactive Powder, wt. % | 0.50 | 0.50 | 0.50 |
| AXILAT RH100 CP/Hydraulic Cement-Based Reactive Powder, | 0.02 | 0.02 | 0.02 |
| Superplasticizer/Hydraulic Cement-Based Reactive Powder, wt. % | 0.50 | 0.50 | 0.50 |
| Defoamer/Hydraulic Cement-Based Reactive Powder, wt % | 0.25 | 0.25 | 0.25 |
| Water/Hydraulic Cement-Based Reactive Powder Wt. Ratio | 0.80 | 0.70 | 0.60 |

Setting Behavior

TABLE 9.2 shows the initial and final setting times of the mixes investigated in this example. It can be observed that all three mixes had a relatively long setting time with the final setting time exceeding 90 minutes in all cases.

TABLE 9.2

| Setting Time (Vicat) | | |
|---|---|---|
| Mix # | Initial Set (mins) | Final Set (mins) |
| 1 | 89 | 107 |
| 2 | 85 | 99 |
| 3 | 93 | 108 |

Self-Healing Behavior

Self-healing behavior of the compositions investigated in this example was measured using the ASTM C1708-13 standard. All three mixes displayed extremely poor self-healing behavior and failed at the very instant of initial pour.

Linear Movement

Figure 9:
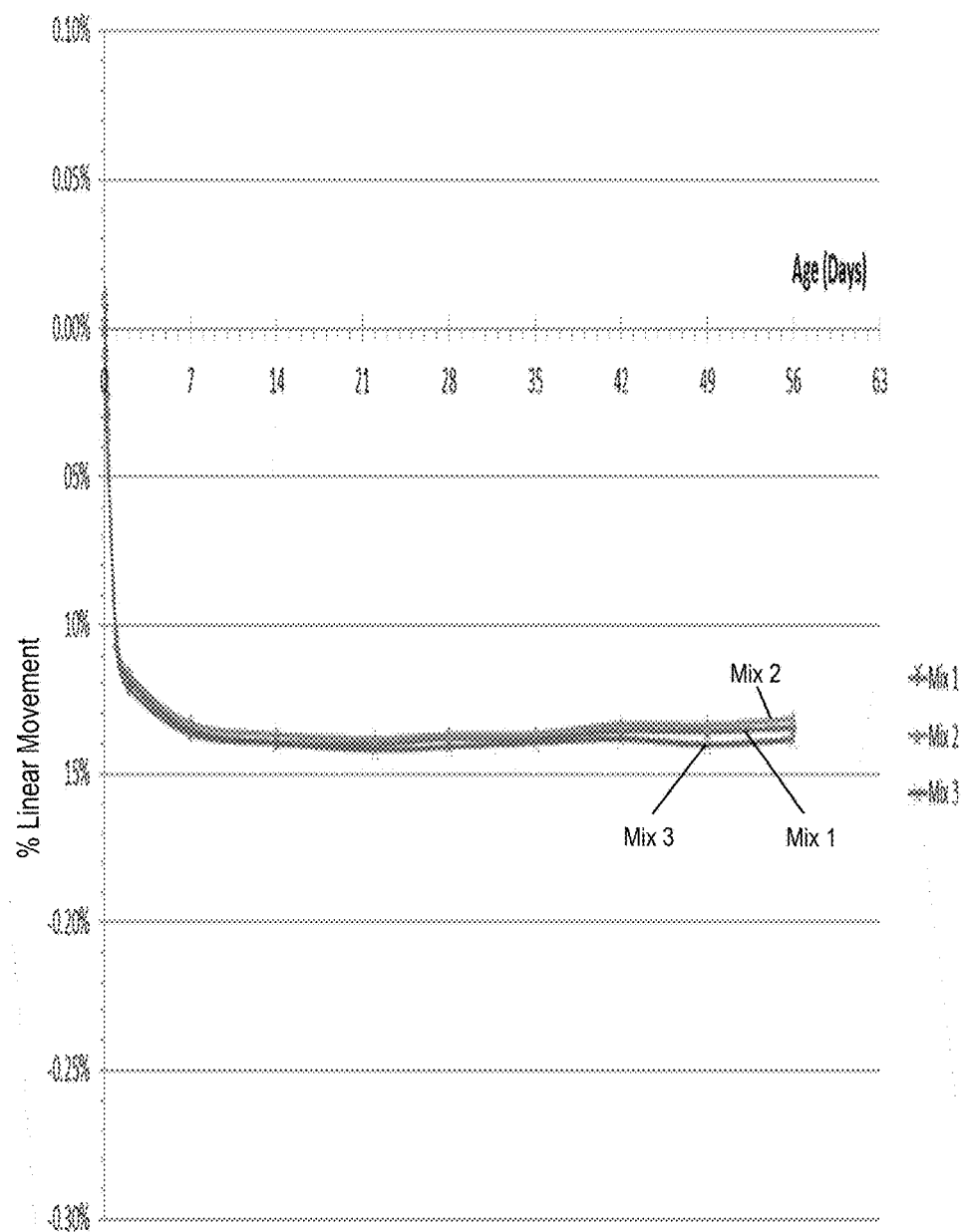
FIG. 9 demonstrates the linear movement behavior of the compositions of invention investigated in Example 9.

FIG. 9 demonstrates the linear movement behavior of the compositions of invention investigated in Example 9. The testing of linear movement behavior was conducted per ASTM C1708-13 with an exception that the prismatic samples were demolded at the time of initial set, wherein the initial specimen length measurement taken right after specimen demolding. The specimen length measurements were continued until the age of 56 days. None of the compositions demonstrated long-term expansive behavior. All mixes demonstrated a net shrinkage, wherein the magnitude of ultimate shrinkage ranged about 0.13%. This extent of shrinkage is unacceptable in many practical applications because of the potential of material cracking and debonding from the applied substrates. This shows an absence of Portland cement is detrimental.

Example 10

Properties of Aluminous Cement Compositions Comprising High Amount of Portland Cement This example shows influence of high amount of Portland cement in aluminous cement compositions, TABLE 10.1. All six mixes in this example contained Portland cement at 76.9 wt. % of the total hydraulic cement-based reactive powder. Mixes 1 through 3 comprised calcium sulfoaluminate cement as the only aluminous cement in the composition. Mixes 4 through 6 comprised calcium aluminate cement as the only aluminous cement in the composition. The superplasticizer in all mixes was BASF MELFLUX 6681 F.

TABLE 10.1

| Compositions investigated in Example 10 | | | | | | |
|---|---|---|---|---|---|---|
| Raw Material | Mix 1 | Mix 2 | Mix 3 | Mix 4 | Mix 5 | Mix 6 |
| Calcium Sulfoaluminate Cement, pbw | 15.4 | 15.4 | 15.4 | 0.0 | 0.0 | 0.0 |
| Calcium Aluminate Cement, pbw | 0.0 | 0.0 | 0.0 | 15.4 | 15.4 | 15.4 |

TABLE 10.1-continued

Compositions investigated in Example 10

| Raw Material | Mix 1 | Mix 2 | Mix 3 | Mix 4 | Mix 5 | Mix 6 |
|---|---|---|---|---|---|---|
| Calcium Sulfate Dihydrate, pbw | 7.7 | 7.7 | 7.7 | 7.7 | 7.7 | 7.7 |
| Portland Cement, pbw | 76.9 | 76.9 | 76.9 | 76.9 | 76.9 | 76.9 |
| Total Hydraulic Cement-Based Reactive Powder, pbw | 100 | 100 | 100 | 100 | 100 | 100 |
| Fly Ash/Hydraulic Cement-Based Reactive Powder Wt. Ratio | 0.23 | 0.15 | 0.08 | 0.23 | 0.15 | 0.08 |
| Sand/Hydraulic Cement-Based Reactive Powder Wt. Ratio | 1.85 | 1.73 | 1.62 | 1.85 | 1.73 | 1.62 |
| Lithium Carbonate/Hydraulic Cement-Based Reactive Powder, wt. % | 0.31 | 0.29 | 0.27 | 0.31 | 0.29 | 0.27 |
| Citric Acid/Hydraulic Cement-Based Reactive Powder, wt. % | 0.15 | 0.14 | 0.13 | 0.15 | 0.14 | 0.13 |
| AXILAT RH100 XP/Hydraulic Cement-Based Reactive Powder, wt. % | 0.062 | 0.058 | 0.054 | 0.062 | 0.058 | 0.054 |
| Superplasticizer/Hydraulic Cement-Based Reactive Powder, wt. % | 0.31 | 0.29 | 0.27 | 0.31 | 0.29 | 0.27 |
| Defoamer/Hydraulic Cement-Based Reactive Powder, wt. % | 0.31 | 0.29 | 0.27 | 0.31 | 0.29 | 0.27 |
| Sodium Gluconate/Hydraulic Cement-Based Reactive Powder, wt. % | 0.12 | 0.12 | 0.11 | 0.12 | 0.12 | 0.11 |
| Color Pigment/Hydraulic Cement-Based Reactive Powder, wt. % | 1.23 | 1.15 | 1.08 | 1.23 | 1.15 | 1.08 |
| Water/Hydraulic Cement-Based Reactive Powder Wt. Ratio | 0.74 | 0.74 | 0.73 | 0.89 | 0.85 | 0.65 |

Slurry Slump Behavior

TABLE 10.2 shows slurry slump (demonstrating mix workability) diameter of the compositions investigated in Example 10. All patties had a relatively small diameter indicating that the material was quite viscous having poor workability and flow properties. It should be noted materials with good workability and flow properties typically produce a slump patty having a diameter greater than 6 inches in this test.

TABLE 10.2

Workability (Slump-2" Diameter × 1" tall cylinder)

| Mix # | Slump (inches) |
|---|---|
| 1 | 2-1/4" |
| 2 | 2-3/8" |
| 3 | 2-1/4" |
| 4 | 5-13/16" |
| 5 | 5-3/8" |
| 6 | 4-3/4" |

Setting Behavior

TABLE 10.3 shows the initial and final setting times of the mixture compositions investigated in this example comprising a high amount of Portland cement. It can be observed that all six mixture compositions had a relatively long setting time with final setting time exceeding 120 minutes for Mixes 1 through 3 and exceeding 360 minutes for Mixes 4 through 6. Thus, it can be concluded that the aluminous cement mixture compositions comprising high amount of Portland cement are relatively slow setting and are not advantageous in applications where rapid setting is desirable.

TABLE 10.3

| | Setting Time (Vicat) | |
|---|---|---|
| Mix # | Initial Set (mins) | Final Set (mins) |
| 1 | 65 | 107 |
| 2 | 66 | 99 |
| 3 | 59 | 108 |
| 4 | 348 | >360 |
| 5 | 349 | >360 |
| 6 | 340 | >360 |

Compressive Strength Behavior

TABLE 10.4 shows the early age (4-hour and 24-hour) and ultimate (28-Day) compressive strength behavior of the cementitious compositions investigated in this example. It can be observed that all mixture compositions investigated developed strength extremely slowly. For Mixes 1 through 3 comprising calcium sulfoaluminate cement as the only aluminous cement in the composition, the 4-hour compressive strengths were lower than 400 psi and the 24-hour strengths were lower than 675 psi. Further, for Mixes 4 through 6 comprising calcium aluminate cement as the only aluminous cement in the composition, the 4-hour compressive strengths could not be measured because of their extremely slow setting behavior, while their 24-hour strengths were extremely low, less than 425 psi. These results demonstrate that aluminous cement compositions comprising higher amounts of Portland cement and lower amounts of aluminous cements harden at a very slow rate and develop extremely low compressive strength at early ages. Thus, such cementitious compositions are not desirable where rapid strength development is desired at early ages. Further, the ultimate (28-day) compressive strengths of these mixes were also relatively low, ranging around 2400 psi to 3500 psi only.

TABLE 10.4

| | Compressive Strength (psi) | | |
|---|---|---|---|
| Mix # | 4 hour | 24 hour | 28 days |
| 1 | 376 | 662 | 3512 |
| 2 | 308 | 554 | 3157 |
| 3 | 290 | 532 | 2951 |
| 4 | Unmeasurable due to slow set | 174 | 2856 |
| 5 | Unmeasurable due to slow set | 250 | 2402 |
| 6 | Unmeasurable due to slow set | 416 | 2466 |

This data shows having too much Portland cement is detrimental.

Example 11

Properties of Aluminous Cement Compositions Comprising Lithium Based Salts as Dimensional Movement Stabilizing Agent This example shows performance of Table 11.1 aluminous cement compositions of the present invention having lithium based salts as a dimensional movement stabilizing agent. Mix 1 included lithium carbonate, Mixes 2 through 6 included lithium sulfate, as dimensional movement stabilizing agents. Superplasticizer in all mixes was BASF MELFLUX 6681 F.

TABLE 11.1

| Compositions investigated in Example 11 | | | | | | |
|---|---|---|---|---|---|---|
| Raw Material | Mix 1 | Mix 2 | Mix 3 | Mix 4 | Mix 5 | Mix 6 |
| Calcium Sulfoaluminate Cement, pbw | 54.3 | 54.3 | 54.3 | 54.3 | 54.3 | 54.3 |
| Calcium Aluminate Cement, pbw | 13.0 | 13.0 | 13.0 | 13.0 | 13.0 | 13.0 |
| Calcium Sulfate Dihydrate, pbw | 21.7 | 21.7 | 21.7 | 21.7 | 21.7 | 21.7 |
| Portland Cement, pbw | 10.9 | 10.9 | 10.9 | 10.9 | 10.9 | 10.9 |
| Total Hydraulic Cement-Based Reactive Powder, pbw | 100 | 100 | 100 | 100 | 100 | 100 |
| Calcium Carbonate/Hydraulic Cement-Based Reactive Powder Wt. Ratio | 0.65 | 0.65 | 0.65 | 0.65 | 0.65 | 0.65 |
| Sand/Hydraulic Cement-Based Reactive Powder Wt. Ratio | 0.91 | 0.91 | 0.91 | 0.91 | 0.91 | 0.91 |
| Lithium Carbonate/Hydraulic Cement-Based Reactive Powder, wt. % | 1.82 | 0.00 | 0.00 | 0.00 | 0.00 | 0.00 |
| Lithium Sulfate/Hydraulic Cement-Based Reactive Powder, wt. % | 0.00 | 0.83 | 1.24 | 1.82 | 2.07 | 2.48 |
| Citric Acid/Hydraulic Cement-Based Reactive Powder, wt. % | 0.20 | 0.20 | 0.20 | 0.20 | 0.20 | 0.20 |
| AXILAT RH100 XP/Hydraulic Cement-Based Reactive Powder, wt. % | 0.074 | 0.074 | 0.074 | 0.074 | 0.074 | 0.074 |
| Superplasticizer/Hydraulic Cement-Based Reactive Powder, wt. % | 0.83 | 0.83 | 0.83 | 0.83 | 0.83 | 0.83 |
| Defoamer/Hydraulic Cement-Based Reactive Powder, wt. % | 0.60 | 0.60 | 0.60 | 0.60 | 0.60 | 0.60 |
| Sodium Gluconate/Hydraulic Cement-Based Reactive Powder, wt. % | 0.31 | 0.31 | 0.31 | 0.31 | 0.31 | 0.31 |
| Pigment/Hydraulic Cement-Based Reactive Powder, wt. % | 1.65 | 1.65 | 1.65 | 1.65 | 1.65 | 1.65 |
| Water/Hydraulic Cement-Based Reactive Powder Wt. Ratio | 0.71 | 0.71 | 0.71 | 0.71 | 0.71 | 0.71 |

Slurry Slump Behavior

TABLE 11.2 shows slurry slump (demonstrating mix workability) diameter of the Example 11 compositions. All patties had a relatively large diameter demonstrating good workability and flow behavior. Materials with good workability and flow properties typically produce a slump patty having a diameter greater than 6 inches (15.24 cm) in this test.

TABLE 11.2

| Workability (Slump-2" Diameter × 1" tall cylinder) | |
|---|---|
| Mix # | Slump (inches) |
| 1 | 7-7/16" |
| 2 | 7-7/16" |
| 3 | 7-5/16" |
| 4 | 7-1/4" |
| 5 | 7-1/4" |
| 6 | 7-3/16" |

Setting Behavior

TABLE 11.3 shows the initial and final setting times of the mixture compositions investigated in this example. All six mixture compositions were extremely fast setting with their final setting times being less than 40 minutes. All mixture compositions comprising lithium sulfate had a final setting time of less than 30 minutes. All mixes comprising lithium sulfate demonstrated an extremely rapid self-desiccating behavior with a self-desiccation time of less than one hour.

TABLE 11.3

| Setting Time (Vicat) | | |
|---|---|---|
| Mix # | Initial Set (mins) | Final Set (mins) |
| 1 | 34 | 39 |
| 2 | 23 | 27 |

TABLE 11.3-continued

| Setting Time (Vicat) | | |
|---|---|---|
| Mix # | Initial Set (mins) | Final Set (mins) |
| 3 | 21 | 23 |
| 4 | 18 | 20 |
| 5 | 17 | 19 |
| 6 | 16 | 19 |

Compressive Strength Behavior

TABLE 11.4 shows the compressive strength behavior of the cementitious compositions investigated in this example. All mixture compositions were extremely rapid hardening. It is noteworthy that the two hour (2-hour) compressive strength for all mixture compositions exceeded 2200 psi, while the twenty-four hour (24-hour) compressive strength for all mixture compositions exceeded 3200 psi.

TABLE 11.4

| Compressive Strength (psi) | | |
|---|---|---|
| Mix # | 2-hour | 24-hour |
| 1 | 2209 | 3508 |
| 2 | 2418 | 3473 |
| 3 | 2480 | 3436 |
| 4 | 2366 | 3334 |
| 5 | 2323 | 3357 |
| 6 | 2227 | 3261 |

Linear Movement

Figure 10:
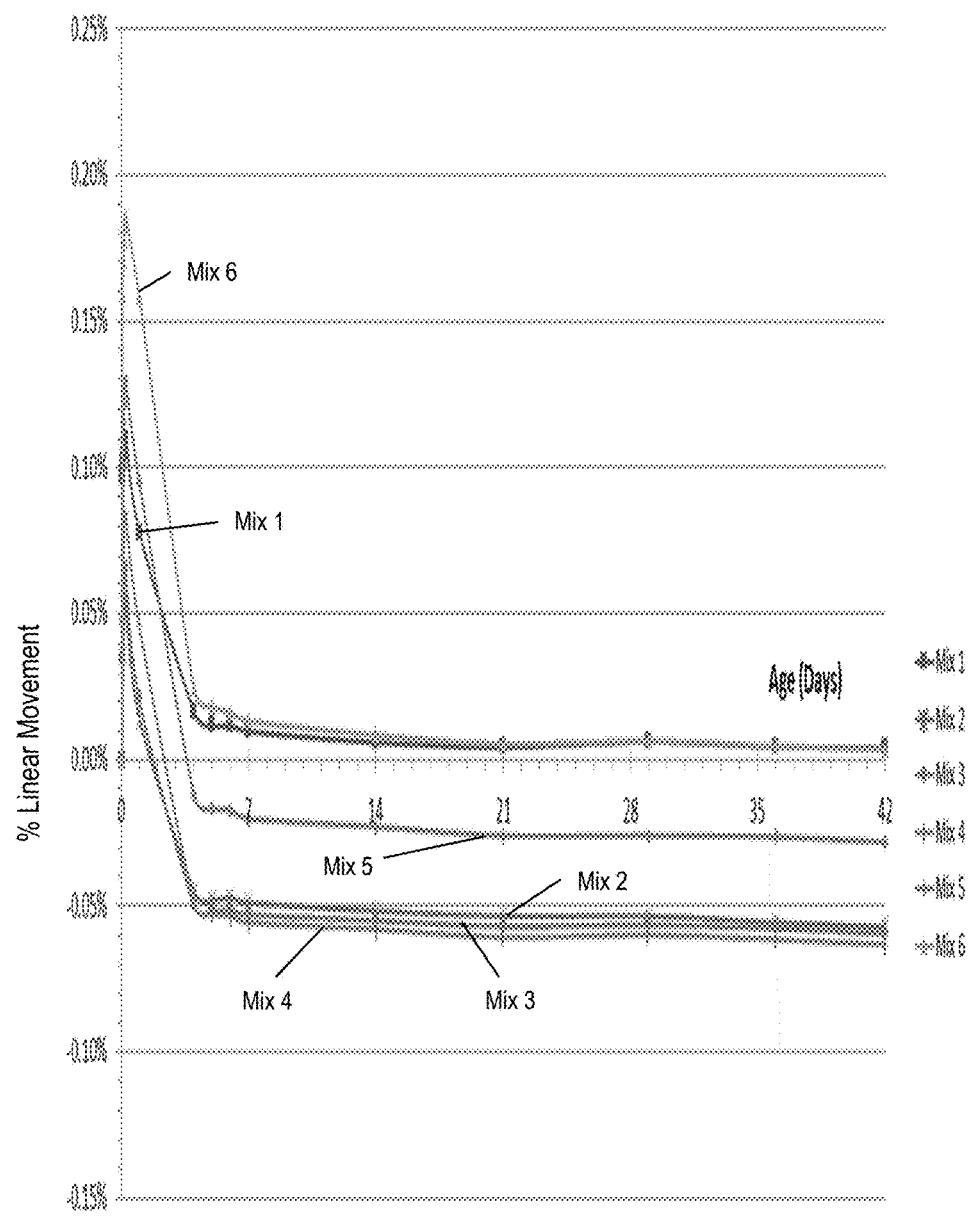
FIG. 10 shows the linear movement behavior of the compositions of invention investigated in Example 11.

FIG. 10 shows the linear movement behavior of the compositions of invention investigated in Example 11. The testing of linear movement behavior was conducted per ASTM C1708-13 with an exception that the prismatic samples were demolded at the time of initial set, wherein the initial specimen length measurement was taken right after specimen demolding. The specimen length measurements were continued until the age of 42 days. It can be observed that the expansive characteristics of the material increased with an increase in the amount of lithium salt in the composition. Couple of mixture compositions demonstrated a net expansion even at the age of 42 days. Compositions with overall low dimensional movement and shrinkage, as displayed in this example, are particularly useful from the view point of resistance to cracking and debonding.

Example 12

Properties of Aluminous Cement Compositions Comprising Different Types of Calcium Sulfates This example demonstrates properties of aluminous cement mixture compositions of this invention comprising different types of calcium sulfates—calcium sulfate dihydrate, calcium sulfate hemihydrate, and anhydrous calcium sulfate. TABLE 12.1 shows the mixture compositions investigated in this example. Mix 1 contained calcium sulfate dihydrate, Mix 2 contained calcium sulfate hemihydrate, while Mix 3 contained anhydrous calcium sulfate. Superplasticizer in all mixes was BASF MELFLUX 6681 F.

TABLE 12.1

| Compositions investigated in Example 12 | | | |
|---|---|---|---|
| Raw Material | Mix 1 | Mix 2 | Mix 3 |
| Calcium Sulfoaluminate Cement, pbw | 36.8 | 36.8 | 36.8 |
| Calcium Aluminate Cement, pbw | 13.2 | 13.2 | 13.2 |
| Calcium Sulfate Dihydrate, pbw | 18.4 | 0.0 | 0.0 |
| Calcium Sulfate Hemihydrate, pbw | 0.0 | 18.4 | 0.0 |
| Calcium Sulfate Anhydrous, pbw | 0.0 | 0.0 | 18.4 |
| Portland Cement, pbw | 31.6 | 31.6 | 31.6 |
| Total Hydraulic Cement-Based Reactive Powder, pbw | 100 | 100 | 100 |
| Calcium Carbonate/Hydraulic Cement-Based Reactive Powder Wt. Ratio | 1.15 | 1.15 | 1.15 |
| Sand/Hydraulic Cement-Based Reactive Powder Wt. Ratio | 2.75 | 2.75 | 2.75 |
| Lithium Carbonate/Hydraulic Cement-Based Reactive Powder, wt. % | 0.69 | 0.69 | 0.69 |
| Citric Acid/Hydraulic Cement-Based Reactive Powder, wt. % | 0.25 | 0.25 | 0.25 |
| AXILAT RH100 XP/Hydraulic Cement-Based Reactive Powder, wt % | 0.083 | 0.083 | 0.083 |
| Superplasticizer/Hydraulic Cement-Based Reactive Powder, wt. % | 0.41 | 0.41 | 0.41 |
| Defoamer/Hydraulic Cement-Based Reactive Powder, wt. % | 0.50 | 0.50 | 0.50 |
| Sodium Gluconate/Hydraulic Cement-Based Reactive Powder, wt. % | 0.28 | 0.28 | 0.28 |
| Color Pigment/Hydraulic Cement-Based Reactive Powder, wt. % | 1.38 | 1.38 | 1.38 |
| Water/Hydraulic Cement-Based Reactive Powder Wt. Ratio | 0.98 | 0.98 | 0.98 |

Slurry Slump Behavior

TABLE 12.2 shows slurry slump (demonstrating mix workability) diameter of the compositions investigated in Example 12. All patties had a relatively large diameter demonstrating good workability and flow behavior. It should be noted that materials with good workability and flow properties typically produce a slump patty having a diameter greater than 6 inches (15.24 cm) in this test.

TABLE 12.2

| Workability (Slump-2" Diameter x 1" tall cylinder) | |
|---|---|
| Mix # | Slump (inches) |
| 1 | 6-5/8" |
| 2 | 6-1/2" |
| 3 | 6-7/16" |

Setting Behavior

TABLE 12.3 shows the initial and final setting times of the mixture compositions investigated in this example. All six mixture compositions with different types of calcium sulfates achieved a rapid setting behavior. Compositions with calcium sulfate dihydrate and anhydrous calcium sulfate were particularly fast setting having final setting times equal to or less than 60 minutes. Furthermore, all compositions investigated in this example also displayed an extremely rapid self-desiccating behavior. For Mix 1 and Mix 3, the surface of the poured material dried in less than one and a half hour after the pour, while the same for Mix 2 occurred in less than two hours after the pour.

TABLE 12.3

Setting Time (Vicat)

| Mix # | Initial Set (mins) | Final Set (mins) |
|---|---|---|
| 1 | 55 | 59 |
| 2 | 92 | 103 |
| 3 | 52 | 58 |

Compressive Strength Behavior

TABLE 12.4 shows the early age (4-hour and 24-hour) and ultimate (28-Day) compressive strength behavior of the cementitious compositions investigated in this example. All mixes investigated demonstrated rapid strength development at early ages. It is noteworthy that the 4-hour compressive strength for all mixes exceeded 1600 psi, while the 24-hour compressive strength for all mixes exceeded 2200 psi. The 28-day compressive strength for all mixes exceeded 3500 psi. Thus, it can be concluded that the aluminous cement compositions of this invention comprising different types of calcium sulfates produce are capable of producing an extremely rapid hardening and early age strength development.

TABLE 12.4

Compressive Strength (psi)

| Mix # | 4 hour | 24 hour | 28 days |
|---|---|---|---|
| 1 | 1659 | 2276 | 3658 |
| 2 | 1603 | 2274 | 3672 |
| 3 | 1658 | 2497 | 4343 |

Linear Movement

Figure 11:
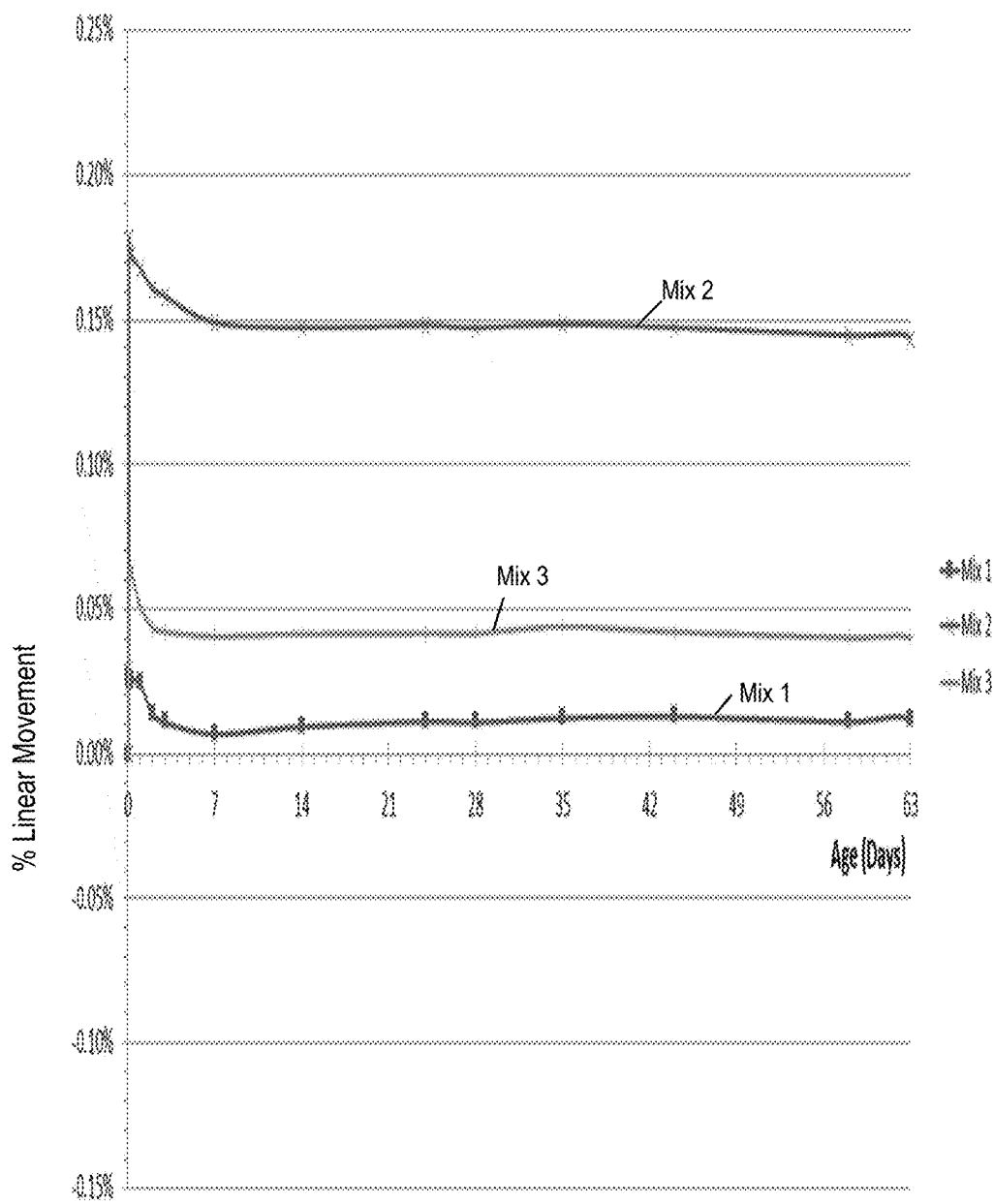
FIG. 11 shows the linear movement behavior of the compositions of invention investigated in Example 12.

FIG. 11 shows the linear movement behavior of the compositions of invention investigated in Example 12. The testing of linear movement behavior was conducted per ASTM C1708-13 with an exception that the prismatic samples were demolded at the time of initial set, wherein the initial specimen length measurement was taken right after specimen demolding. The specimen length measurements were continued until the age of 63 days. It is noteworthy that all mixture compositions of this invention investigated in this example demonstrated expansive characteristics all the way up to the age of 63 days. Compositions with low dimensional movement and expansive characteristics, as displayed in this example, are desirable from the view point of resistance to cracking and overall mechanical stability.

Although we have described the preferred embodiments for implementing our invention, it will be understood by those skilled in the art to which this disclosure is directed that modifications and additions may be made to our invention without departing from its scope.

What is claimed is:

1. A cementitious composition comprising a reaction product of a mixture of:
   a hydraulic cement-based reactive powder comprising:
      an aluminate cement selected from at least one member of the group consisting of calcium aluminate cement and calcium sulfoaluminate cement in an amount of 30-75 parts by weight per 100 parts by weight of the hydraulic cement-based reactive powder,
      Portland cement in an amount of 5-35 parts by weight per 100 parts by weight of the hydraulic cement-based reactive powder, and
      a calcium sulfate selected from the group consisting of calcium sulfate dihydrate, calcium sulfate hemihydrate, anhydrous calcium sulfate and mixtures thereof, the calcium sulfate in an amount of 20-40 parts by weight per 100 parts by weight of the hydraulic cement-based reactive powder;
   an inorganic flow control agent in a weight ratio of inorganic flow control agent to hydraulic cement-based reactive powder of 0.5:1 to 2.0:1, wherein the inorganic flow control comprises at least one member selected from the group consisting of fly ash and calcium carbonate and wherein average particle size of the calcium carbonate ranges from about 10 to 150 microns;
   a metal-based dimensional movement stabilizing agent in an amount equal to 1.0 to 4.0 weight percent of the hydraulic cement-based reactive powder, wherein the metal-based dimensional movement stabilizing agent comprises a lithium compound selected from at least one member of the group of lithium salt and lithium base, wherein the lithium salt is at least one member of the group of lithium carbonate, lithium sulfate, lithium nitrate, lithium nitrite, and lithium silicate, wherein the base is lithium hydroxide;
   a filler in a weight ratio of filler to hydraulic cement-based reactive powder of 0.5:1 to 3.5:1; and
   water in a weight ratio of water to hydraulic cement-based reactive powder of 0.6:1 to 1.3:1.

2. The composition of claim 1,
   wherein the hydraulic cement-based reactive powder comprises:
   30-70 parts by weight aluminate cement per 100 parts by weight of the hydraulic cement-based reactive powder;
   7.5-25 parts by weight Portland cement per 100 parts by weight of the hydraulic cement-based reactive powder;
   25 to 35 parts by weight calcium sulfate per 100 parts by weight of the hydraulic cement-based reactive powder;
   wherein
   the weight ratio of the inorganic flow control agent to hydraulic cement-based reactive powder equals 0.75:1 to 1.5:1;
   the amount of the metal-based dimensional movement stabilizing agent equals 1.5 to 3.5 weight percent of the hydraulic cement-based reactive powder;
   the weight ratio of filler to hydraulic cement-based reactive powder equals 1.0:1 to 2.5:1; and
   the weight ratio of water to hydraulic cement-based reactive powder is 0.7:1 to 1.2:1.

3. The composition of claim 1, further comprising:
   an organic rheology modifier in an amount equal to 0.02 to 1 wt. % of the hydraulic cement-based reactive powder;
   an inorganic viscosity enhancing agent in an amount equal to 0 to 1 wt. % of the hydraulic cement-based reactive powder;

a superplasticizer in an amount equal to 0.3 to 3.5 wt. % of the hydraulic cement-based reactive powder;

a defoamer in an amount equal to 0 to 2.0 wt. % of the hydraulic cement-based reactive powder;

a set retarding agent in an amount equal to 0 to 2.0 wt. % of the hydraulic cement-based reactive powder;

a color pigment in an amount equal to 0 to 8.0 wt. % of the hydraulic cement-based reactive powder;

an air entraining agent in an amount equal to 0 to 1.0 wt. % of the hydraulic cement-based reactive powder;

an organic film forming polymer in an amount equal to 0 to 15.0 wt. % of the hydraulic cement-based reactive powder; and a pozzolan other than fly ash in a weight ratio of pozzolan to hydraulic cement-based reactive powder of 0 to 1.

4. The composition of claim 2, further comprising:

an organic rheology modifier in an amount equal to 0.06 to 0.50 wt. % of the hydraulic cement-based reactive powder;

an inorganic viscosity enhancing agent in an amount equal to 0 to 0.50 wt. % of the hydraulic cement-based reactive powder;

a superplasticizer in an amount equal to 0.50 to 1.50 wt. % of the hydraulic cement-based reactive powder;

a defoamer in an amount equal to 0.50 to 1.00 wt. % of the hydraulic cement-based reactive powder;

a set retarding agent in an amount equal to 0.20 to 1.00 wt. % of the hydraulic cement-based reactive powder;

a color pigment in an amount equal to 0 to 4.00 wt. % of the hydraulic cement-based reactive powder;

an air entraining agent in an amount equal to 0 to 0.25 wt. % of the hydraulic cement-based reactive powder;

an organic film forming polymer in an amount equal to 0 to 5.00 wt. % of the hydraulic cement-based reactive powder; and a pozzolan other than fly ash in a weight ratio of pozzolan other than fly ash to hydraulic cement-based reactive powder of 0:1 to 1:1.

5. The composition of claim 1, further comprising at least one retarder selected from the group consisting of citric acid and sodium gluconate.

6. The composition of claim 1, wherein the inorganic flow control agent is fly ash in the absence of calcium carbonate.

7. The composition of claim 1, wherein the mixture has an absence of alkali metal hydroxide.

8. The composition of claim 1, wherein the mixture has an absence of glass.

9. A method comprising:

making a mixture by mixing the composition of claim 1 comprising:

the hydraulic cement-based reactive powder comprising:

the aluminate cement, the Portland cement, and the calcium sulfate;

the inorganic flow control agent;

the metal-based dimensional movement stabilizing agent;

the filler; and the water;

reacting the mixture; and allowing the mixture to set.

10. The method of claim 9, wherein the mixture has an absence of alkali metal hydroxide and has an absence of alkali metal salt other than lithium carbonate.

11. A cementitious composition comprising a reaction product of a mixture of:

a hydraulic cement-based reactive powder comprising:

an aluminate cement selected from at least one member of the group consisting of calcium aluminate cement and calcium sulfoaluminate cement in an amount of 25-80 parts by weight per 100 parts by weight of the hydraulic cement-based reactive powder, Portland cement in an amount of 2.5-45 parts by weight per 100 parts by weight of the hydraulic cement-based reactive powder, and a calcium sulfate selected from the group consisting of calcium sulfate dihydrate, calcium sulfate hemihydrate, anhydrous calcium sulfate and mixtures thereof, the calcium sulfate in an amount of 15-45 parts by weight per 100 parts by weight of the hydraulic cement-based reactive powder;

an inorganic flow control agent in a weight ratio of inorganic flow control agent to hydraulic cement-based reactive powder of 0.25:1 to 3.0:1, wherein the inorganic flow control comprises at least one member selected from the group consisting of fly ash and calcium carbonate and wherein average particle size of the calcium carbonate ranges from about 10 to 150 microns;

a metal-based dimensional movement stabilizing agent in an amount equal to 0 to 5.0 weight percent of the hydraulic cement-based reactive powder, wherein the metal-based dimensional movement stabilizing agent comprises a lithium compound selected from at least one member of the group of lithium salt and lithium base, wherein the lithium salt is at least one member of the group of lithium carbonate, lithium sulfate, lithium nitrate, lithium nitrite, and lithium silicate, wherein the base is lithium hydroxide;

a filler in a weight ratio of filler to hydraulic cement-based reactive powder of 0:1 to 5.0:1; and water in a weight ratio of water to hydraulic cement-based reactive powder of 0.5:1 to 1.4:1;

wherein the hydraulic cement-based reactive powder comprises: 25-75 parts by weight calcium sulfoaluminate cement per 100 parts by weight of the hydraulic cement-based reactive powder; and 2.5-45 parts by weight calcium aluminate cement per 100 parts by weight of the hydraulic cement-based reactive powder.

12. The composition of claim 11, wherein the hydraulic cement-based reactive powder comprises: 30-70 parts by weight calcium sulfoaluminate cement per 100 parts by weight of the hydraulic cement-based reactive powder; and 5-40 parts by weight calcium aluminate cement per 100 parts by weight of the hydraulic cement-based reactive powder.

13. The composition of claim 12, wherein the hydraulic cement-based reactive powder comprises: 35-65 parts by weight calcium sulfoaluminate cement per 100 parts by weight of the hydraulic cement-based reactive powder; and 10-35 parts by weight calcium aluminate cement per 100 parts by weight of the hydraulic cement-based reactive powder.

14. The composition of claim 11, further comprising:

an organic rheology modifier in an amount equal to 0.04 to 0.75 wt. % of the hydraulic cement-based reactive powder;

an inorganic viscosity enhancing agent in an amount equal to 0 to 0.75 wt. % of the hydraulic cement-based reactive powder;

a superplasticizer in an amount equal to 0.40 to 2.50 wt. % of the hydraulic cement-based reactive powder;

a defoamer in an amount equal to 0.25 to 1.50 wt. % of the hydraulic cement-based reactive powder;

a set retarding agent in an amount equal to 0.10 to 1.50 wt. % of the hydraulic cement-based reactive powder;

a color pigment in an amount equal to 0 to 6.00 wt. % of the hydraulic cement-based reactive powder;

an air entraining agent in an amount equal to 0 to 0.50 wt. % of the hydraulic cement-based reactive powder;

an organic film forming polymer in an amount equal to 0 to 10.00 wt. % of the hydraulic cement-based reactive powder; and a pozzolan other than fly ash in a weight ratio of pozzolan other than fly ash to hydraulic cement-based reactive powder of 0:1 to 1:1.

15. The composition of claim 13, wherein the organic rheology modifier comprises biopolymer.

16. A method comprising:
making a mixture by mixing the composition of claim 11 comprising:
the hydraulic cement-based reactive powder comprising:
the aluminate cement,
the Portland cement, and
the calcium sulfate;
the inorganic flow control agent;
the metal-based dimensional movement stabilizing agent;
the filler; and
the water;
reacting the mixture; and
allowing the mixture to set.

17. A cementitious composition comprising a reaction product of a mixture of:
a hydraulic cement-based reactive powder comprising:
an aluminate cement selected from at least one member of the group consisting of calcium aluminate cement and calcium sulfoaluminate cement in an amount of 25-80 parts by weight per 100 parts by weight of the hydraulic cement-based reactive powder,
Portland cement in an amount of 2.5-45 parts by weight per 100 parts by weight of the hydraulic cement-based reactive powder, and
a calcium sulfate selected from the group consisting of calcium sulfate dihydrate, calcium sulfate hemihydrate, anhydrous calcium sulfate and mixtures thereof, the calcium sulfate in an amount of 15-45 parts by weight per 100 parts by weight of hydraulic cement-based reactive powder;
an inorganic flow control agent in a weight ratio of inorganic flow control agent to hydraulic cement-based reactive powder of 0.25:1 to 3.0:1, wherein the inorganic flow control agent is calcium carbonate in the absence of fly ash and wherein average particle size of the calcium carbonate ranges from about 10 to 150 microns;
a metal-based dimensional movement stabilizing agent in an amount equal to 0 to 5.0 weight percent of the hydraulic cement-based reactive powder, wherein the metal-based dimensional movement stabilizing agent comprises a lithium compound selected from at least one member of the group of lithium salt and lithium base, wherein the lithium salt is at least one member of the group of lithium carbonate, lithium sulfate, lithium nitrate, lithium nitrite, and lithium silicate, wherein the base is lithium hydroxide;
a filler in a weight ratio of filler to hydraulic cement-based reactive powder of 0:1 to 5.0:1; and
water in a weight ratio of water to hydraulic cement-based reactive powder of 0.5:1 to 1.4:1.

18. The composition of claim 17, wherein the filler is at least one member selected from the group consisting of as fine aggregate, coarse aggregate, inorganic mineral fillers, and lightweight fillers,
wherein the fine aggregate comprises sand having a mean particle size of 0.1 mm to about 3 mm;
wherein the coarse aggregate comprises an inorganic rock material with an average particle size at least 4.75 mm;
wherein the lightweight filler has a specific gravity of less than about 1.5;
wherein the inorganic mineral filler is at least one member selected from the group consisting of ground clay, shale, slate, mica and talc;
wherein the fillers are not pozzolans or thermally activated aluminosilicate minerals.

19. The composition of claim 17, wherein the mixture has an absence of alkali metal hydroxide and has an absence of alkali metal salt other than lithium carbonate.

20. A method comprising:
making a mixture by mixing the composition of claim 17 comprising:
the hydraulic cement-based reactive powder comprising:
the aluminate cement,
the Portland cement, and
the calcium sulfate;
the inorganic flow control agent;
the metal-based dimensional movement stabilizing agent;
the filler; and
the water;
reacting the mixture; and
allowing the mixture to set.

21. A cementitious composition comprising a reaction product of a mixture of:
a hydraulic cement-based reactive powder comprising:
an aluminate cement selected from at least one member of the group consisting of calcium aluminate cement and calcium sulfoaluminate cement in an amount of 25-80 parts by weight per 100 parts by weight of the hydraulic cement-based reactive powder,
Portland cement in an amount of 2.5-45 parts by weight per 100 parts by weight of the hydraulic cement-based reactive powder, and
a calcium sulfate selected from the group consisting of calcium sulfate dihydrate, calcium sulfate hemihydrate, anhydrous calcium sulfate and mixtures thereof, the calcium sulfate in an amount of 15-45 parts by weight per 100 parts by weight of the hydraulic cement-based reactive powder;
an inorganic flow control agent in a weight ratio of inorganic flow control agent to hydraulic cement-based reactive powder of 0.25:1 to 3.0:1, wherein the inorganic flow control comprises at least one member selected from the group consisting of fly ash and calcium carbonate and wherein average particle size of the calcium carbonate ranges from about 10 to 150 microns;
a metal-based dimensional movement stabilizing agent in an amount equal to 0 to 5.0 weight percent of the hydraulic cement-based reactive powder, wherein the metal-based dimensional movement stabilizing agent comprises a lithium compound selected from at least one member of the group of lithium salt and lithium base, wherein the lithium salt is at least one member of the group of lithium carbonate, lithium sulfate, lithium nitrate, lithium nitrite, and lithium silicate, wherein the base is lithium hydroxide;

a filler in a weight ratio of filler to hydraulic cement-based reactive powder of 0:1 to 5.0:1; and water in a weight ratio of water to hydraulic cement-based reactive powder of 0.5:1 to 1.4:1;

wherein the mixture has an absence of alkali metal citrate.

22. A method comprising:

making a mixture by mixing the composition of claim 21 comprising:

the hydraulic cement-based reactive powder comprising:
 the aluminate cement,
 the Portland cement, and
 the calcium sulfate;

the inorganic flow control agent;

the metal-based dimensional movement stabilizing agent;

the filler; and the water;

reacting the mixture; and allowing the mixture to set.

* * * * *